US008780082B2

(12) United States Patent
Bernstein

(10) Patent No.: US 8,780,082 B2
(45) Date of Patent: Jul. 15, 2014

(54) TOUCH SCREEN DEVICE, METHOD, AND GRAPHICAL USER INTERFACE FOR MOVING ON-SCREEN OBJECTS WITHOUT USING A CURSOR

(71) Applicant: Apple Inc., Cupertino, CA (US)

(72) Inventor: Jeffrey Traer Bernstein, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/647,376

(22) Filed: Oct. 8, 2012

(65) Prior Publication Data
US 2013/0027303 A1 Jan. 31, 2013

Related U.S. Application Data

(62) Division of application No. 12/242,868, filed on Sep. 30, 2008, now Pat. No. 8,284,170.

(51) Int. Cl.
*G06F 3/045* (2006.01)

(52) U.S. Cl.
USPC .......................................................... 345/174

(58) Field of Classification Search
CPC . G06F 3/0354; G06F 3/0425; G06F 3/04883; G06F 2203/04808
USPC ......... 345/156–179, 211, 212, 589, 630, 684; 715/763–769, 702, 784, 821; 463/16, 463/30, 31, 36, 43
See application file for complete search history.

(56) References Cited

U.S. PATENT DOCUMENTS 5,488,204 A 1/1996 Mead et al.
5,825,352 A 10/1998 Bisset et al.
5,835,079 A 11/1998 Shieh
6,040,824 A 3/2000 Maekawa et al.
6,154,194 A 11/2000 Singh
(Continued)

FOREIGN PATENT DOCUMENTS

EP 0 822 529 A1 2/1998
EP 1 517 228 A2 3/2005
(Continued)

OTHER PUBLICATIONS

Agarawala et al., "BumpTop, Rethink Your Desktop," http://bunptop.com/, Nov. 2008, 3 pages.
(Continued)

*Primary Examiner* — Prabodh M Dharia
(74) *Attorney, Agent, or Firm* — Morrison & Foerster LLP

(57) ABSTRACT

An electronic device with a touch screen display: simultaneously detects a plurality of finger contacts on the touch screen display; and while the plurality of finger contacts are concurrently maintained on the touch screen display, performs respective operations for each respective finger contact in the plurality of detected finger contacts, the respective operations including: creating a respective touch area for the respective finger contact; determining if the respective touch area overlaps a respective object at portions other than a representative point of the touch area; connecting the respective object with the respective touch area if the respective object is determined to overlap the respective touch area; after connecting the respective object with the respective touch area, detecting movement of the respective finger contact on the touch screen display; and moving the respective object connected with the respective touch area in accordance with the determined movement of the respective touch area.

16 Claims, 47 Drawing Sheets

(56) References Cited

U.S. PATENT DOCUMENTS

| | | | |
|---|---|---|---|
| 6,259,436 | B1 | 7/2001 | Moon et al. |
| 6,278,443 | B1 | 8/2001 | Amro et al. |
| 6,285,374 | B1 | 9/2001 | Falcon |
| 6,295,052 | B1 | 9/2001 | Kato et al. |
| 6,529,210 | B1 | 3/2003 | Rees |
| 6,590,568 | B1 | 7/2003 | Astala et al. |
| 6,926,609 | B2 | 8/2005 | Martin |
| 7,013,435 | B2 | 3/2006 | Gallo et al. |
| 7,216,305 | B1 | 5/2007 | Jaeger |
| 7,249,327 | B2 | 7/2007 | Nelson et al. |
| 7,275,994 | B2 | 10/2007 | Eck et al. |
| 7,394,459 | B2 * | 7/2008 | Bathiche et al. ............. 345/175 |
| 7,519,223 | B2 * | 4/2009 | Dehlin et al. ................. 382/203 |
| 7,576,725 | B2 * | 8/2009 | Bathiche et al. ............. 345/156 |
| 7,602,378 | B2 | 10/2009 | Kocienda et al. |
| 7,952,566 | B2 | 5/2011 | Poupyrev et al. |
| 8,014,760 | B2 * | 9/2011 | Forstall et al. ............ 455/412.2 |
| 2001/0028369 | A1 | 10/2001 | Gallo et al. |
| 2003/0016252 | A1 | 1/2003 | Noy et al. |
| 2003/0184525 | A1 | 10/2003 | Tsai |
| 2004/0027398 | A1 | 2/2004 | Jaeger |
| 2004/0034801 | A1 | 2/2004 | Jaeger |
| 2004/0119744 | A1 | 6/2004 | Chan |
| 2004/0176170 | A1 | 9/2004 | Eck et al. |
| 2005/0071761 | A1 | 3/2005 | Kontio |
| 2006/0022956 | A1 | 2/2006 | Lengeling et al. |
| 2006/0026521 | A1 | 2/2006 | Hotelling et al. |
| 2006/0050062 | A1 | 3/2006 | Ozawa et al. |
| 2006/0092170 | A1 * | 5/2006 | Bathiche et al. ............. 345/589 |
| 2006/0097991 | A1 | 5/2006 | Hotelling et al. |
| 2006/0132460 | A1 | 6/2006 | Kolmykov-Zotov et al. |
| 2006/0132660 | A1 | 6/2006 | Kurumisawa |
| 2006/0136845 | A1 | 6/2006 | Rimas-Ribikauskas |
| 2006/0156249 | A1 | 7/2006 | Blythe et al. |
| 2007/0066394 | A1 | 3/2007 | Ikeda et al. |
| 2007/0072680 | A1 | 3/2007 | Ikeda et al. |
| 2007/0097096 | A1 | 5/2007 | Rosenberg |
| 2007/0121534 | A1 | 5/2007 | James et al. |
| 2007/0177803 | A1 | 8/2007 | Elias et al. |
| 2007/0242041 | A1 | 10/2007 | Kuroume et al. |
| 2007/0262964 | A1 | 11/2007 | Zotov et al. |
| 2007/0265082 | A1 | 11/2007 | Shimura et al. |
| 2008/0012835 | A1 * | 1/2008 | Rimon et al. ................. 345/173 |
| 2008/0018616 | A1 | 1/2008 | Lampell et al. |
| 2008/0024459 | A1 | 1/2008 | Poupyrev et al. |
| 2008/0039125 | A1 | 2/2008 | Fan et al. |
| 2008/0094326 | A1 * | 4/2008 | Yamaki et al. .................. 345/87 |
| 2008/0104544 | A1 | 5/2008 | Collins et al. |
| 2008/0165160 | A1 | 7/2008 | Kocienda et al. |
| 2008/0229256 | A1 | 9/2008 | Shibaike |
| 2008/0238886 | A1 | 10/2008 | Bengtsson et al. |
| 2008/0259039 | A1 | 10/2008 | Kocienda et al. |
| 2009/0079699 | A1 | 3/2009 | Sun |
| 2009/0109182 | A1 | 4/2009 | Fyke et al. |
| 2009/0146957 | A1 * | 6/2009 | Lee et al. ...................... 345/168 |
| 2009/0262086 | A1 | 10/2009 | Chen |
| 2010/0193258 | A1 * | 8/2010 | Simmons et al. .......... 178/18.06 |
| 2011/0210931 | A1 | 9/2011 | Shai |

FOREIGN PATENT DOCUMENTS

| | | |
|---|---|---|
| EP | 1 674 976 A2 | 6/2006 |
| GB | 2 347 200 A | 8/2000 |
| GB | 2 351 639 A | 1/2001 |
| WO | WO 00/16186 A2 | 3/2000 |
| WO | WO 00/38042 A1 | 6/2000 |
| WO | WO 2006/020304 A2 | 2/2006 |
| WO | WO 2006/020305 A2 | 2/2006 |
| WO | WO 2007/121557 | 11/2007 |

OTHER PUBLICATIONS

Anandx, "BumpTop 3D Desktop Prototype—www.bumptop.com," Jun. 21, 2006, http://www.youtube.com/watch?v=M0ODskdEPnQ, 3 pages.

Apple iPhone School, "Tetris! 1.2," Mar. 31, 2008, http://www.appleiphoneschool.com/2008/02/25/tetris-12/, 8 pages.

Beaudouin-Lafon, M., "Novel Interaction Techniques for Overlapping Windows," UIST '01, Nov. 2001, Orlando FL, 2 pages.

Benko et al., "Precise Selection Techniques for Multi-Touch Screens," CHI 2006, Apr. 22-27, 2006, 10 pages.

Bentendo, "Microsoft/Mitsubishi Two Sided Touch Screen Game Console???," Aug. 30, 2007, http://bentendo64.blogspot.com/2007/08/microsoftmitsubishi-two-sided-touch.html, 4 pages.

Buxton, W., "Living in Augmented Reality: Ubiquitous Media and Reactive Environments," Video-Mediated Communication, Part III, 1997, http://www.billbuxton.com/augmentedReality.html.

Buxton, W. et al., "Multi-Touch Systems that I have Known and Loved," Jan. 12, 2007, 14 pages, http://www.billbuxton.com/multitouchOverview.html.

Christensen, B., "Air Hockey Table Made From iPhone," Technovelgy.com, downloaded Apr. 18, 2008, http://www.technoveigy.com/ct/Science-Fiction-News.asp?NewsNum=1314, 3 page.

Code Retard, "Tetris Touch—Tetris on the iPhone, TRIS Review," Code Retard, printed Apr. 30, 2008, 7 pages, http://www.coderetard.com/2008/03/18/tetris-touch-tetris-on-the-iphone-tris-review/.

Denoue et al., "A Fast, Interactive 3D Paper-flier Metaphor for Digital Bullein Boards," Proceedings of the 16th Annual ACM Symposium on User Interface Software and Technology, Vancouver Canada Nov. 2003, 4 pages.

Fitzmaurice G.et al., "Brick:Laying the Foundations for Graspable User Interfaces." published in the Proceedings of CHI 1995, May 7-11, 2001, ACM Press, © 1995 ACM, pp. 1-8.

Han, J.Y., "Multi-Touch Interaction Research," Jan. 2006, 4 pages, http://mri.nyu.edu/~jhan/ftirtouch/.

Han, J., "Perceptive Pixel," Jan. 2007, http://www.perceptivepixel.com/, 1 page.

IBM, "Visual for Multiple-Icon Drag Movement," IBM Technical Disclosure Bulletin, vol. 37, No. 9, Sep. 1994, 2 pages.

iPhone Hacks, "iPhone Software/Hardware Hack: LocoGPS—GPS Add-on for the iPhone," 41 pages, Dec. 25, 2007, http://www.iphonehacks.com/iphone_applications/index.

Malik, S. et al., "Visual Touchpad: A Two-handed Gestural Input Device," ICMI'04, Oct. 13-15, 2004, 8 pages.

Moscovich et al., "Multi-finger Cursor Techniques," GI '06 Proceedings of Graphics Interface 2006. Jun. 2006, Quebec City, Quebec, Canada, 7 pages.

PocketGear.com, "Air Hockey Challenge 1.1," Mar. 26, 2008, http://66.179.161.27/software_detail.asp?id=23170 1 page.

Rekimoto, J, "SmartSkin: An Infrastructure for Freehand Manipulation on Interactive Surfaces," CHI 2002, Apr. 20-25, 2002, 8 pages.

Vogel et al., "Shift: A Technique for Operating Pen-Based Interfaces Using Touch," CHI 2007, Apr. 28-May 3, 2007, 10 pages.

Wikipedia, "Tetris DS," Wikipedia, the free encyclopedia, printed Apr. 30, 2008, 4 pages.

Wu, M. et al., "Gesture Registration, Relaxation, and Reuse for Multi-Point Direct-Touch Surfaces," Mitsubishi Electric Research Laboratories, Oct. 2005, 9 pages.

Wu, et al., "Multi-Finger and Whole Hand Gestural Interaction Techniques for Multi-User Tabletop Displays," UIST '03, Nov. 5-7, 2003, Vancouver, BC, Canada, © ACM 2003, 10 pages.

YouTube, "iPhysics 0.3 on iPod Touch," Nov. 26, 2007, http://youtube.com/watch?v=aQUWnVyXtns&eurl==http://www.phones.../apple-iphone-gets-amazing-iphysics-game-not-to-be-missed-video/.

Invitation to Pay Additional Fees dated Apr. 7, 2010, received in International Application No. PCT/US2009/054668, which corresponds to U.S. Appl. No. 12/242,868, 5 pages (Bernstein).

International Search Report and Written Opinion dated Dec. 23, 2010, received in International Application No. PCT/US2009/054668, which corresponds to U.S. Appl. No. 12/242,868, 18 pages (Bernstein).

International Preliminary Report on Patentability dated Apr. 14, 2011, received in International Application No. PCT/US2009/054668, which corresponds to U.S. Appl. No. 12/242,868, 13 pages (Bernstein).

(56) References Cited

OTHER PUBLICATIONS

Office Action dated Sep. 30, 2011, received in U.S. Appl. No. 12/242,868, 10 pages (Bernstein).
Final Office Action dated Mar. 21, 2012, received in U.S. Appl. No. 12/242,686, 14 pages (Bernstein).

Notice of Allowance dated Jun. 14, 2012, received in U.S. Appl. No. 12/242,868, 13 pages (Bernstein).

Moscovich, T., "Contact Area Interaction with Sliding Widgets," UIST'09, Oct. 4-7, 2009, Victoria, BC, Canada, 10 pages.

* cited by examiner

TOUCH SCREEN DEVICE, METHOD, AND GRAPHICAL USER INTERFACE FOR MOVING ON-SCREEN OBJECTS WITHOUT USING A CURSOR

RELATED APPLICATIONS

This application is divisional of U.S. application Ser. No. 12/242,868, filed Sep. 30, 2008, which is incorporated by reference herein in its entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; and (10) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to electronic devices with touch screen displays, and more particularly, to electronic devices that use one or more finger contacts to move on-screen objects without using a cursor to move the objects.

BACKGROUND

The use of touch screen displays as input devices for computers and other electronic devices has increased significantly in recent years. Some touch screen displays permit direct finger manipulation of on-screen objects in a manner that resembles manipulation of physical objects in the physical world, rather than requiring indirect manipulation of on-screen objects (e.g., via a cursor). In general, touch screen interfaces that closely emulate the physical world provide a more transparent and intuitive experience to a user because the user can simply use the touch screen interface based on their understanding of the physical world.

But existing touch screen interfaces with direct finger manipulation of on-screen objects have limitations in their abilities to emulate interaction with real world objects. For example, touch screen interfaces typically convert a finger contact on the touch screen into a single point (e.g., the centroid of the detected finger contact) and then use this point to interact with objects on the touch screen. If the single point does not overlap with an on-screen object, even though other parts of the finger contact do overlap with the object, then the object may not be selected for manipulation by the user. Thus, more precise positioning of the finger contact is needed to interact with an object, which in turn obscures more of the object during manipulation. In addition, with each finger contact converted to a single point, at least two fingers are required to rotate an object.

Accordingly, there is a need for electronic devices with more transparent and intuitive user interfaces for moving on-screen objects in accordance with finger contacts and movements on a touch screen display without using a cursor to move the objects. Such interfaces increase the effectiveness, efficiency, and user satisfaction with electronic devices with touch screen displays.

SUMMARY

The above deficiencies and other problems associated with user interfaces for electronic devices with touch screen displays are reduced or eliminated by the disclosed devices. In some embodiments, the device is portable. In some embodiments, the device has a touch-sensitive display (also known as a "touch screen" or "touch screen display") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include game playing, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments, a computer-implemented method is performed at an electronic device with a touch screen display. The computer-implemented method includes: displaying a plurality of objects on the touch screen display; detecting single finger contact on the touch screen display; creating a touch area that corresponds to the single finger contact on the touch screen display; determining a representative point within the touch area; and determining if the touch area overlaps an object in the plurality of objects displayed on the touch screen display. Determining if the touch area overlaps the object includes determining if one or more portions of the touch area other than the representative point overlap the object. The computer-implemented method further includes connecting the object with the touch area if the touch area is determined to overlap the object. Connecting the object with the touch area maintains the overlap of the object and the touch area. The computer-implemented method further includes: after connecting the object with the touch area, detecting movement of the single finger contact on the touch screen display; determining movement of the touch area that corresponds to movement of the single finger contact on the touch screen display; and moving the object connected with the touch area in accordance with the determined movement of the touch area.

In accordance with some embodiments, a computing device includes a touch screen display, one or more processors, memory, and one or more programs. The one or more programs are stored in the memory and configured to be executed by the one or more processors. The one or more programs include instructions for: displaying a plurality of objects on the touch screen display; detecting a single finger contact on the touch screen display; creating a touch area that corresponds to the single finger contact on the touch screen display; determining a representative point within the touch area; and determining if the touch area overlaps an object in the plurality of objects displayed on the touch screen display. Determining if the touch area overlaps the object includes determining if one or more portions of the touch area other than the representative point overlap the object. The one or more programs further include instructions for connecting the object with the touch area if the touch area is determined to overlap the object. Connecting the object with the touch area maintains the overlap of the object and the touch area. The one or more programs further include instructions for: after connecting the object with the touch area, detecting movement of the single finger contact on the touch screen display; determining movement of the touch area that corresponds to movement of the single finger contact on the touch screen display; and moving the object connected with the touch area in accordance with the determined movement of the touch area.

In accordance with some embodiments, a computer readable storage medium has stored therein instructions which when executed by a computing device with a touch screen display, cause the device to: display a plurality of objects on the touch screen display; detect a single finger contact on the touch screen display; create a touch area that corresponds to the single finger contact on the touch screen display; determine a representative point within the touch area; determine if the touch area overlaps an object in the plurality of objects displayed on the touch screen display, wherein determining if the touch area overlaps the object includes determining if one or more portions of the touch area other than the representative point overlap the object; connect the object with the touch area if the touch area is determined to overlap the object, wherein connecting the object with the touch area maintains the overlap of the object and the touch area; after connecting the object with the touch area, detect movement of the single finger contact on the touch screen display; determine movement of the touch area that corresponds to movement of the single finger contact on the touch screen display; and move the object connected with the touch area in accordance with the determined movement of the touch area.

In accordance with some embodiments, a graphical user interface on a computing device with a touch screen display includes a plurality of objects. The plurality of objects are displayed on the touch screen display. A single finger contact is detected on the touch screen display. A touch area is created that corresponds to the single finger contact on the touch screen display. A representative point is determined within the touch area. Whether the touch area overlaps an object in the plurality of objects displayed on the touch screen display is determined. The determination includes determining if one or more portions of the touch area other than the representative point overlap the object. The object is connected with the touch area if the touch area is determined to overlap the object. Connecting the object with the touch area maintains the overlap of the object and the touch area. After connecting the object with the touch area, movement of the single finger contact is detected on the touch screen display. Movement of the touch area is determined that corresponds to movement of the single finger contact on the touch screen display. The object connected with the touch area is moved in accordance with the determined movement of the touch area.

In accordance with some embodiments, a computing device includes: a touch screen display; means for displaying a plurality of objects on the touch screen display; means for detecting a single finger contact on the touch screen display; means for creating a touch area that corresponds to the single finger contact on the touch screen display; means for determining a representative point within the touch area; means for determining if the touch area overlaps an object in the plurality of objects displayed on the touch screen display, wherein determining if the touch area overlaps the object includes determining if one or more portions of the touch area other than the representative point overlap the object; means for connecting the object with the touch area if the touch area is determined to overlap the object, wherein connecting the object with the touch area maintains the overlap of the object and the touch area; means for after connecting the object with the touch area, detecting movement of the single finger contact on the touch screen display; means for determining movement of the touch area that corresponds to movement of the single finger contact on the touch screen display; and means for moving the object connected with the touch area in accordance with the determined movement of the touch area.

In accordance with some embodiments, a computer-implemented method is performed at an electronic device with a touch screen display. The computer-implemented method includes: displaying a plurality of objects on the touch screen display; detecting a single finger contact on the touch screen display; and creating a touch area that corresponds to the single finger contact on the touch screen display. The touch area includes a perimeter. The computer-implemented method further includes: determining a representative point within the touch area; for an object in the plurality of objects displayed on the touch screen display, determining if the representative point of the touch area overlaps the object; determining if the perimeter of the touch area overlaps the object; and determining if a portion of the touch area between the representative point of the touch area and the perimeter of the touch area overlaps the object; and connecting the object with the touch area if the touch area is determined to overlap the object. Connecting the object with the touch area maintains the overlap of the object and the touch area. The computer-implemented method further includes: after connecting the object with the touch area, detecting movement of the single finger contact on the touch screen display; determining movement of the touch area that corresponds to movement of the single finger contact on the touch screen display; and moving the object connected with the touch area in accordance with the determined movement of the touch area.

In accordance with some embodiments, a computing device includes: a touch screen display; one or more processors; memory; and one or more programs. The one or more programs are stored in the memory and configured to be executed by the one or more processors. The one or more programs include instructions for: displaying a plurality of objects on the touch screen display; detecting a single finger contact on the touch screen display; creating a touch area that corresponds to the single finger contact on the touch screen display, wherein the touch area includes a perimeter; determining a representative point within the touch area; for an object in the plurality of objects displayed on the touch screen display: determining if the representative point of the touch area overlaps the object; determining if the perimeter of the touch area overlaps the object; and determining if a portion of the touch area between the representative point of the touch area and the perimeter of the touch area overlaps the object; connecting the object with the touch area if the touch area is determined to overlap the object, wherein connecting the object with the touch area maintains the overlap of the object and the touch area; after connecting the object with the touch area, detecting movement of the single finger contact on the touch screen display; determining movement of the touch area that corresponds to movement of the single finger contact on the touch screen display; and moving the object connected with the touch area in accordance with the determined movement of the touch area.

In accordance with some embodiments, a computer readable storage medium has stored therein instructions, which when executed by a computing device with a touch screen display, cause the computing device to: display a plurality of objects on the touch screen display; detect a single finger contact on the touch screen display; create a touch area that corresponds to the single finger contact on the touch screen display, wherein the touch area includes a perimeter; determine a representative point within the touch area; for an object in the plurality of objects displayed on the touch screen display: determine if the representative point of the touch area overlaps the object; determine if the perimeter of the touch area overlaps the object; and determine if a portion of the touch area between the representative point of the touch area and the perimeter of the touch area overlaps the object; connect the object with the touch area if the touch area is determined to overlap the object, wherein connecting the object with the touch area maintains the overlap of the object and the touch area; after connecting the object with the touch area, detect movement of the single finger contact on the touch screen display; determine movement of the touch area that corresponds to movement of the single finger contact on the touch screen display; and move the object connected with the touch area in accordance with the determined movement of the touch area.

In accordance with some embodiments, a graphical user interface on a computing device with a touch screen display includes a plurality of objects. The plurality of objects are displayed on the touch screen display. A single finger contact is detected on the touch screen display. A touch area is created that corresponds to the single finger contact on the touch screen display. The touch area includes a perimeter. A representative point is determined within the touch area. For an object in the plurality of objects displayed on the touch screen display: whether the representative point of the touch area overlaps the object is determined; whether the perimeter of the touch area overlaps the object is determined; and whether a portion of the touch area between the representative point of the touch area and the perimeter of the touch area overlaps the object is determined. The object is connected with the touch area if the touch area is determined to overlap the object. Connecting the object with the touch area maintains the overlap of the object and the touch area. After connecting the object with the touch area, movement of the single finger contact is detected on the touch screen display. Movement of the touch area is determined that corresponds to movement of the single finger contact on the touch screen display. The object connected with the touch area is moved in accordance with the determined movement of the touch area.

In accordance with some embodiments, a portable electronic device includes: a touch screen display; means for displaying a plurality of objects on the touch screen display; means for detecting a single finger contact on the touch screen display; means for creating a touch area that corresponds to the single finger contact on the touch screen display, wherein the touch area includes a perimeter; means for determining a representative point within the touch area; for an object in the plurality of objects displayed on the touch screen display: means for determining if the representative point of the touch area overlaps the object; means for determining if the perimeter of the touch area overlaps the object; and means for determining if a portion of the touch area between the representative point of the touch area and the perimeter of the touch area overlaps the object; means for connecting the object with the touch area if the touch area is determined to overlap the object, wherein connecting the object with the touch area maintains the overlap of the object and the touch area; means for after connecting the object with the touch area, detecting movement of the single finger contact on the touch screen display; means for determining movement of the touch area that corresponds to movement of the single finger contact on the touch screen display; and means for moving the object connected with the touch area in accordance with the determined movement of the touch area.

In accordance with some embodiments, a computer-implemented method is performed at an electronic device with a touch screen display. The computer-implemented method includes: displaying a plurality of objects on the touch screen display; detecting a single finger contact on the touch screen display; creating a touch area that corresponds to the single finger contact on the touch screen display; determining if the touch area overlaps an object in the plurality of objects displayed on the touch screen display; connecting the object with the touch area if the touch area is determined to overlap the object; after connecting the object with the touch area, detecting rotation of the single finger contact on the touch screen display; determining rotation of the touch area that corresponds to rotation of the single finger contact on the touch screen display; and rotating the object connected with the touch area in accordance with the determined rotation of the touch area.

In accordance with some embodiments, a computing device includes: a touch screen display; one or more processors; memory; and one or more programs. The one or more programs are stored in the memory and configured to be executed by the one or more processors. The one or more programs include instructions for: displaying a plurality of objects on the touch screen display; detecting a single finger contact on the touch screen display; creating a touch area that corresponds to the single finger contact on the touch screen display; determining if the touch area overlaps an object in the plurality of objects displayed on the touch screen display; connecting the object with the touch area if the touch area is determined to overlap the object; after connecting the object with the touch area, detecting rotation of the single finger contact on the touch screen display; determining rotation of the touch area that corresponds to rotation of the single finger contact on the touch screen display; and rotating the object connected with the touch area in accordance with the determined rotation of the touch area.

In accordance with some embodiments, a computer readable storage medium has stored therein instructions, which when executed by a computing device with a touch screen display, cause the computing device to: display a plurality of objects on the touch screen display; detect a single finger contact on the touch screen display; create a touch area that corresponds to the single finger contact on the touch screen display; determine if the touch area overlaps an object in the plurality of objects displayed on the touch screen display; connect the object with the touch area if the touch area is determined to overlap the object; after connecting the object with the touch area, detect rotation of the single finger contact on the touch screen display; determine rotation of the touch area that corresponds to rotation of the single finger contact on the touch screen display; and rotate the object connected with the touch area in accordance with the determined rotation of the touch area.

In accordance with some embodiments, a graphical user interface on a computing device with a touch screen display includes a plurality of objects. The plurality of objects are displayed on the touch screen display. A single finger contact is detected on the touch screen display. A touch area is created that corresponds to the single finger contact on the touch screen display. Whether the touch area overlaps an object in the plurality of objects displayed on the touch screen display is determined. The object is connected with the touch area if the touch area is determined to overlap the object. After connecting the object with the touch area, rotation of the single finger contact is detected on the touch screen display. Rotation of the touch area is determined that corresponds to rotation of the single finger contact on the touch screen display. The object connected with the touch area is rotated in accordance with the determined rotation of the touch area.

In accordance with some embodiments, a portable electronic device includes: a touch screen display; means for displaying a plurality of objects on the touch screen display; means for detecting a single finger contact on the touch screen display; means for creating a touch area that corresponds to the single finger contact on the touch screen display; means for determining if the touch area overlaps an object in the plurality of objects displayed on the touch screen display; means for connecting the object with the touch area if the touch area is determined to overlap the object; means for after connecting the object with the touch area, detecting rotation of the single finger contact on the touch screen display; means for determining rotation of the touch area that corresponds to rotation of the single finger contact on the touch screen display; and means for rotating the object connected with the touch area in accordance with the determined rotation of the touch area.

In accordance with some embodiments, a computer-implemented method is performed at an electronic device with a touch screen display. The computer-implemented method includes: displaying a plurality of objects on the touch screen display; detecting a single finger contact on the touch screen display; creating a touch area that corresponds to the single finger contact on the touch screen display; detecting movement of the single finger contact on the touch screen display; determining movement of the touch area that corresponds to movement of the single finger contact on the touch screen display; while detecting movement of the single finger contact on the touch screen display, detecting intersection of the touch area with an object in the plurality of objects on the touch screen display; and, in response to detecting intersection of the touch area with the object, moving the object such that the object ceases to intersect the touch area.

In accordance with some embodiments, a computing device includes: a touch screen display; one or more processors; memory; and one or more programs. The one or more programs are stored in the memory and configured to be executed by the one or more processors. The one or more programs include: instructions for: displaying a plurality of objects on the touch screen display; detecting a single finger contact on the touch screen display; creating a touch area that corresponds to the single finger contact on the touch screen display; detecting movement of the single finger contact on the touch screen display; determining movement of the touch area that corresponds to movement of the single finger contact on the touch screen display; while detecting movement of the single finger contact on the touch screen display, detecting intersection of the touch area with an object in the plurality of objects on the touch screen display; and, in response to detecting intersection of the touch area with the object, moving the object such that the object ceases to intersect the touch area.

In accordance with some embodiments, a computer readable storage medium has stored therein instructions, which when executed by a computing device with a touch screen display, cause the computing device to: display a plurality of objects on the touch screen display; detect a single finger contact on the touch screen display; create a touch area that corresponds to the single finger contact on the touch screen display; detect movement of the single finger contact on the touch screen display; determine movement of the touch area that corresponds to movement of the single finger contact on the touch screen display; while detecting movement of the single finger contact on the touch screen display, detect intersection of the touch area with an object in the plurality of objects on the touch screen display; and, in response to detecting intersection of the touch area with the object, move the object such that the object ceases to intersect the touch area.

In accordance with some embodiments, a graphical user interface on a computing device with a touch screen display includes a plurality of objects. The plurality of objects are displayed on the touch screen display. A single finger contact is detected on the touch screen display. A touch area is created that corresponds to the single finger contact on the touch screen display. Movement of the single finger contact is detected on the touch screen display. Movement of the touch area is determined that corresponds to movement of the single finger contact on the touch screen display. While detecting movement of the single finger contact on the touch screen display, intersection of the touch area with an object in the plurality of objects on the touch screen display is detected. In response to detecting intersection of the touch area with the object, the object is moved such that the object ceases to intersect the touch area.

In accordance with some embodiments, a portable electronic device includes: a touch screen display; means for displaying a plurality of objects on the touch screen display; means for detecting a single finger contact on the touch screen display; means for creating a touch area that corresponds to the single finger contact on the touch screen display; means for detecting movement of the single finger contact on the touch screen display; means for determining movement of the touch area that corresponds to movement of the single finger contact on the touch screen display; means for while detecting movement of the single finger contact on the touch screen display, detecting intersection of the touch area with an object in the plurality of objects on the touch screen display; and means for, in response to detecting intersection of the touch area with the object, moving the object such that the object ceases to intersect the touch area.

In accordance with some embodiments, a computer-implemented method is performed at an electronic device with a touch screen display. The computer-implemented method includes: detecting a single finger contact on the touch screen display; creating a touch area that corresponds to the single finger contact on the touch screen display; determining if the touch area overlaps with a plurality of objects displayed on the touch screen display; and connecting the plurality of objects with the touch area if each object in the plurality of objects is determined to overlap the touch area. Connecting the plurality of objects with the touch area maintains the overlap between the touch area and each object in the plurality of objects. The computer-implemented method further includes: after connecting the plurality of objects with the touch area, detecting movement of the single finger contact on the touch screen display; determining movement of the touch area that corresponds to movement of the single finger contact on the touch screen display; and moving the plurality of objects connected with the touch area in accordance with the determined movement of the touch area.

In accordance with some embodiments, a computing device includes: a touch screen display; one or more processors; memory; and one or more programs. The one or more programs are stored in the memory and configured to be executed by the one or more processors. The one or more programs include instructions for: detecting a single finger contact on the touch screen display; creating a touch area that corresponds to the single finger contact on the touch screen display; determining if the touch area overlaps with a plurality of objects displayed on the touch screen display; connecting the plurality of objects with the touch area if each object in the plurality of objects is determined to overlap the touch area, wherein connecting the plurality of objects with the touch area maintains the overlap between the touch area and each object in the plurality of objects; after connecting the plurality of objects with the touch area, detecting movement of the single finger contact on the touch screen display; determining movement of the touch area that corresponds to movement of the single finger contact on the touch screen display; and moving the plurality of objects connected with the touch area in accordance with the determined movement of the touch area.

In accordance with some embodiments, a computer readable storage medium has stored therein instructions, which when executed by a computing device with a touch screen display, cause the computing device to: detect a single finger contact on the touch screen display; create a touch area that corresponds to the single finger contact on the touch screen display; determine if the touch area overlaps with a plurality of objects displayed on the touch screen display; connect the plurality of objects with the touch area if each object in the plurality of objects is determined to overlap the touch area, wherein connecting the plurality of objects with the touch area maintains the overlap between the touch area and each object in the plurality of objects; after connecting the plurality of objects with the touch area, detect movement of the single finger contact on the touch screen display; determine movement of the touch area that corresponds to movement of the single finger contact on the touch screen display; and move the plurality of objects connected with the touch area in accordance with the determined movement of the touch area.

In accordance with some embodiments, a graphical user interface on a computing device with a touch screen display includes a plurality of objects. A single finger contact is detected on the touch screen display. A touch area is created that corresponds to the single finger contact on the touch screen display. Whether the touch area overlaps with a plurality of objects displayed on the touch screen display is determined. The plurality of objects are connected with the touch area if each object in the plurality of objects is determined to overlap the touch area. Connecting the plurality of objects with the touch area maintains the overlap between the touch area and each object in the plurality of objects. After connecting the plurality of objects with the touch area, movement of the single finger contact is detected on the touch screen display. Movement of the touch area that corresponds to movement of the single finger contact on the touch screen display is determined. The plurality of objects connected with the touch area are moved in accordance with the determined movement of the touch area.

In accordance with some embodiments, a portable electronic device includes: a touch screen display; means for detecting a single finger contact on the touch screen display; means for creating a touch area that corresponds to the single finger contact on the touch screen display; means for determining if the touch area overlaps with a plurality of objects displayed on the touch screen display; means for connecting the plurality of objects with the touch area if each object in the plurality of objects is determined to overlap the touch area, wherein connecting the plurality of objects with the touch area maintains the overlap between the touch area and each object in the plurality of objects; means for after connecting the plurality of objects with the touch area, detecting movement of the single finger contact on the touch screen display; means for determining movement of the touch area that corresponds to movement of the single finger contact on the touch screen display; and means for moving the plurality of objects connected with the touch area in accordance with the determined movement of the touch area.

In accordance with some embodiments, a computer-implemented method is performed at an electronic device with a touch screen display. The computer-implemented method includes: displaying a plurality of objects on the touch screen display; and simultaneously detecting a plurality of finger contacts on the touch screen display. For each respective finger contact in the plurality of detected finger contacts, the method further includes: creating a respective touch area that corresponds to the respective finger contact on the touch screen display; determining a respective representative point within the respective touch area; determining if the respective touch area overlaps a respective object in the plurality of objects displayed on the touch screen display, wherein determining if the respective touch area overlaps the respective object includes determining if one or more portions of the respective touch area other than the respective representative point overlap the respective object; connecting the respective object with the respective touch area if the respective object is determined to overlap the respective touch area, wherein connecting the respective object with the respective touch area maintains the overlap of the respective object and the respective touch area; after connecting the respective object with the respective touch area, detecting movement of the respective finger contact on the touch screen display; determining movement of the respective touch area that corresponds to movement of the respective finger contact on the touch screen display; and moving the respective object connected with the respective touch area in accordance with the determined movement of the respective touch area.

In accordance with some embodiments, an computing device includes: a touch screen display; one or more processors; memory; and one or more programs. The one or more programs are stored in the memory and configured to be executed by the one or more processors. The one or more programs include instructions for: displaying a plurality of objects on the touch screen display; and simultaneously detecting a plurality of finger contacts on the touch screen display. For each respective finger contact in the plurality of detected finger contacts, the one or more programs further include instructions for: creating a respective touch area that corresponds to the respective finger contact on the touch screen display; determining a respective representative point within the respective touch area; determining if the respective touch area overlaps a respective object in the plurality of objects displayed on the touch screen display, wherein determining if the respective touch area overlaps the respective object includes determining if one or more portions of the respective touch area other than the respective representative point overlap the respective object; connecting the respective object with the respective touch area if the respective object is determined to overlap the respective touch area, wherein connecting the respective object with the respective touch area maintains the overlap of the respective object and the respective touch area; after connecting the respective object with the respective touch area, detecting movement of the respective finger contact on the touch screen display; determining movement of the respective touch area that corresponds to movement of the respective finger contact on the touch screen display; and moving the respective object connected with the respective touch area in accordance with the determined movement of the respective touch area.

In accordance with some embodiments, a computer readable storage medium has stored therein instructions, which when executed by a computing device with a touch screen display, cause the computing device to: display a plurality of objects on the touch screen display; and simultaneously detect a plurality of finger contacts on the touch screen display. For each respective finger contact in the plurality of detected finger contacts, the instructions further cause the computing device to: create a respective touch area that corresponds to the respective finger contact on the touch screen display; determine a respective representative point within the respective touch area; determine if the respective touch area overlaps a respective object in the plurality of objects displayed on the touch screen display, wherein determining if the respective touch area overlaps the respective object includes determining if one or more portions of the respective touch area other than the respective representative point overlap the respective object; connect the respective object with the respective touch area if the respective object is determined to overlap the respective touch area, wherein connecting the respective object with the respective touch area maintains the overlap of the respective object and the respective touch area; after connecting the respective object with the respective touch area, detect movement of the respective finger contact on the touch screen display; determine movement of the respective touch area that corresponds to movement of the respective finger contact on the touch screen display; and move the respective object connected with the respective touch area in accordance with the determined movement of the respective touch area.

In accordance with some embodiments, a graphical user interface on a computing device with a touch screen display includes a plurality of objects. The plurality of objects are displayed on the touch screen display. A plurality of finger contacts on the touch screen display are simultaneously detected. For each respective finger contact in the plurality of detected finger contacts: a respective touch area is created that corresponds to the respective finger contact on the touch screen display; a respective representative point within the respective touch area is determined; whether the respective touch area overlaps a respective object in the plurality of objects displayed on the touch screen display is determined, wherein the determination includes determining if one or more portions of the respective touch area other than the respective representative point overlap the respective object; the respective object is connected with the respective touch area if the respective object is determined to overlap the respective touch area, wherein connecting the respective object with the respective touch area maintains the overlap of the respective object and the respective touch area; after connecting the respective object with the respective touch area, movement of the respective finger contact is detected on the touch screen display; movement of the respective touch area is determined that corresponds to movement of the respective finger contact on the touch screen display; and the respective object connected with the respective touch area is moved in accordance with the determined movement of the respective touch area.

In accordance with some embodiments, a portable electronic device includes: a touch screen display; means for displaying a plurality of objects on the touch screen display; and means for simultaneously detecting a plurality of finger contacts on the touch screen display. For each respective finger contact in the plurality of detected finger contacts, the device further includes: means for creating a respective touch area that corresponds to the respective finger contact on the touch screen display; means for determining a respective representative point within the respective touch area; means for determining if the respective touch area overlaps a respective object in the plurality of objects displayed on the touch screen display, wherein the means for determining if the respective touch area overlaps the respective object includes means for determining if one or more portions of the respective touch area other than the respective representative point overlap the respective object; means for connecting the respective object with the respective touch area if the respective object is determined to overlap the respective touch area, wherein connecting the respective object with the respective touch area maintains the overlap of the respective object and the respective touch area; means for after connecting the respective object with the respective touch area, detecting movement of the respective finger contact on the touch screen display; means for determining movement of the respective touch area that corresponds to movement of the respective finger contact on the touch screen display; and means for moving the respective object connected with the respective touch area in accordance with the determined movement of the respective touch area.

In accordance with some embodiments, a computer-implemented method is performed at an electronic device with a touch screen display. The computer-implemented method includes: displaying a plurality of objects on the touch screen display; and detecting a hand edge contact on the touch screen display. The hand edge contact comprises a pinky finger edge contact and a palm edge contact. The computer-implemented method further includes: creating a touch area that corresponds to the hand edge contact on the touch screen display; detecting movement of the hand edge contact on the touch screen display; determining movement of the touch area that corresponds to movement of the hand edge contact on the touch screen display; while detecting movement of the hand edge contact on the touch screen display, detecting intersection of the touch area with an object in the plurality of objects on the touch screen display; and, in response to detecting intersection of the touch area with the object, moving the object such that the object ceases to intersect the touch area.

In accordance with some embodiments, a computing device includes: a touch screen display; one or more processors; memory; and one or more programs. The one or more programs are stored in the memory and configured to be executed by the one or more processors. The one or more programs include instructions for: displaying a plurality of objects on the touch screen display; detecting a hand edge contact on the touch screen display, wherein the hand edge contact comprises a pinky finger edge contact and a palm edge contact; creating a touch area that corresponds to the hand edge contact on the touch screen display; detecting movement of the hand edge contact on the touch screen display; determining movement of the touch area that corresponds to movement of the hand edge contact on the touch screen display; while detecting movement of the hand edge contact on the touch screen display, detecting intersection of the touch area with an object in the plurality of objects on the touch screen display; and, in response to detecting intersection of the touch area with the object, moving the object such that the object ceases to intersect the touch area.

In accordance with some embodiments, a computer readable storage medium has stored therein instructions, which when executed by a computing device with a touch screen display, cause the computing device to: display a plurality of objects on the touch screen display; detect a hand edge contact on the touch screen display, wherein the hand edge contact comprises a pinky finger edge contact and a palm edge contact; create a touch area that corresponds to the hand edge contact on the touch screen display; detect movement of the hand edge contact on the touch screen display; determine movement of the touch area that corresponds to movement of the hand edge contact on the touch screen display; while detecting movement of the hand edge contact on the touch screen display, detect intersection of the touch area with an object in the plurality of objects on the touch screen display; and, in response to detecting intersection of the touch area with the object, move the object such that the object ceases to intersect the touch area.

In accordance with some embodiments, a graphical user interface on a computing device with a touch screen display includes a plurality of objects. The plurality of objects are displayed on the touch screen display. A hand edge contact is detected on the touch screen display. The hand edge contact comprises a pinky finger edge contact and a palm edge contact. A touch area is created that corresponds to the hand edge contact on the touch screen display. Movement of the hand edge contact is detected on the touch screen display. Movement of the touch area is determined that corresponds to movement of the hand edge contact on the touch screen display. While detecting movement of the hand edge contact on the touch screen display, intersection of the touch area with an object in the plurality of objects on the touch screen display is detected. In response to detecting intersection of the touch area with the object, the object is moved such that the object ceases to intersect the touch area.

In accordance with some embodiments, a portable electronic device includes: a touch screen display; means for displaying a plurality of objects on the touch screen display; means for detecting a hand edge contact on the touch screen display, wherein the hand edge contact comprises a pinky finger edge contact and a palm edge contact; means for creating a touch area that corresponds to the hand edge contact on the touch screen display; means for detecting movement of the hand edge contact on the touch screen display; means for determining movement of the touch area that corresponds to movement of the hand edge contact on the touch screen display; means for while detecting movement of the hand edge contact on the touch screen display, detecting intersection of the touch area with an object in the plurality of objects on the touch screen display; and means for, in response to detecting intersection of the touch area with the object, moving the object such that the object ceases to intersect the touch area.

Thus, devices with touch screen displays are provided with more intuitive interfaces that use direct finger manipulation to contact, move, and interact with objects on the touch screen display, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
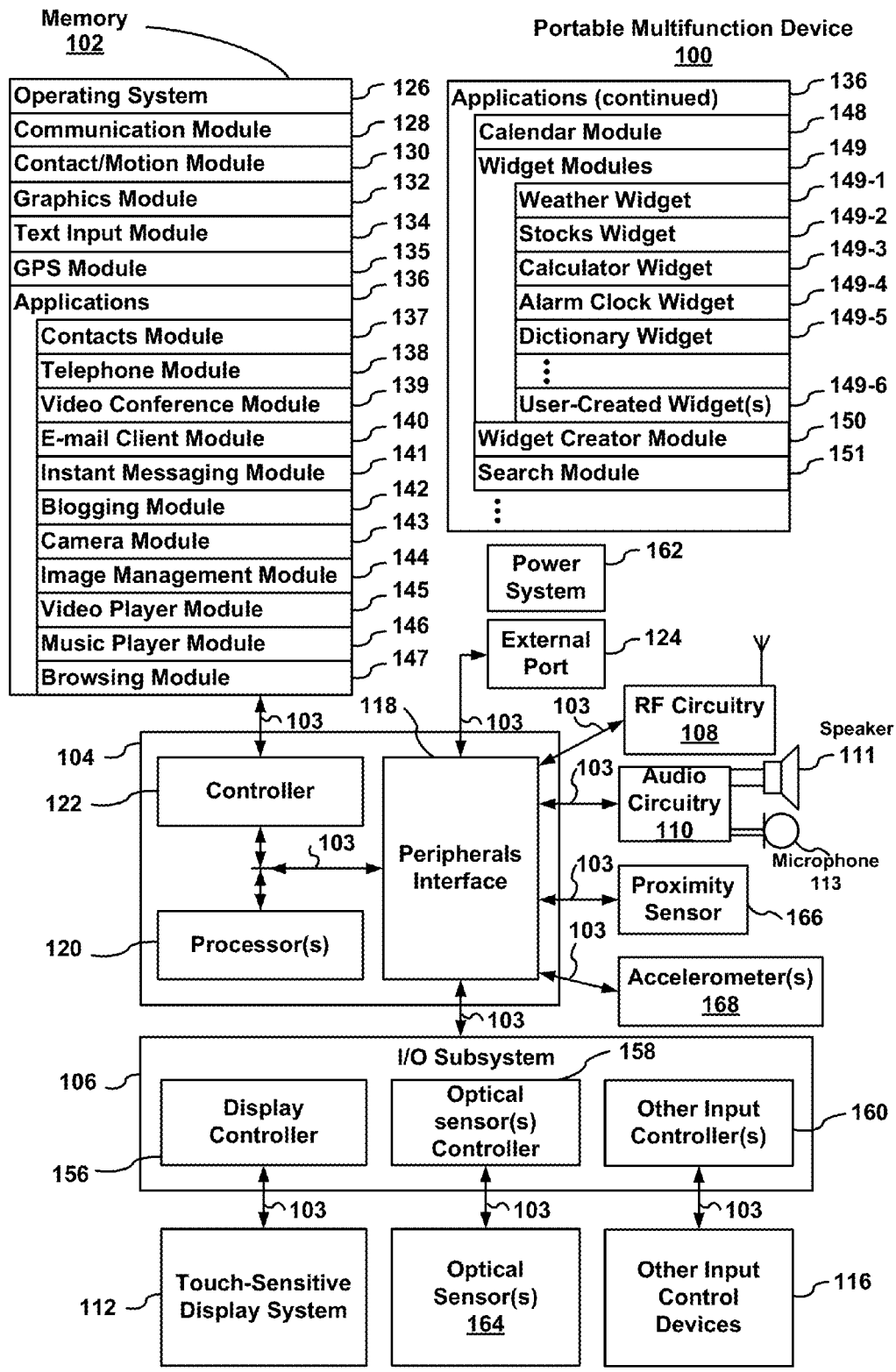
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of an electronic device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a gaming application, a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
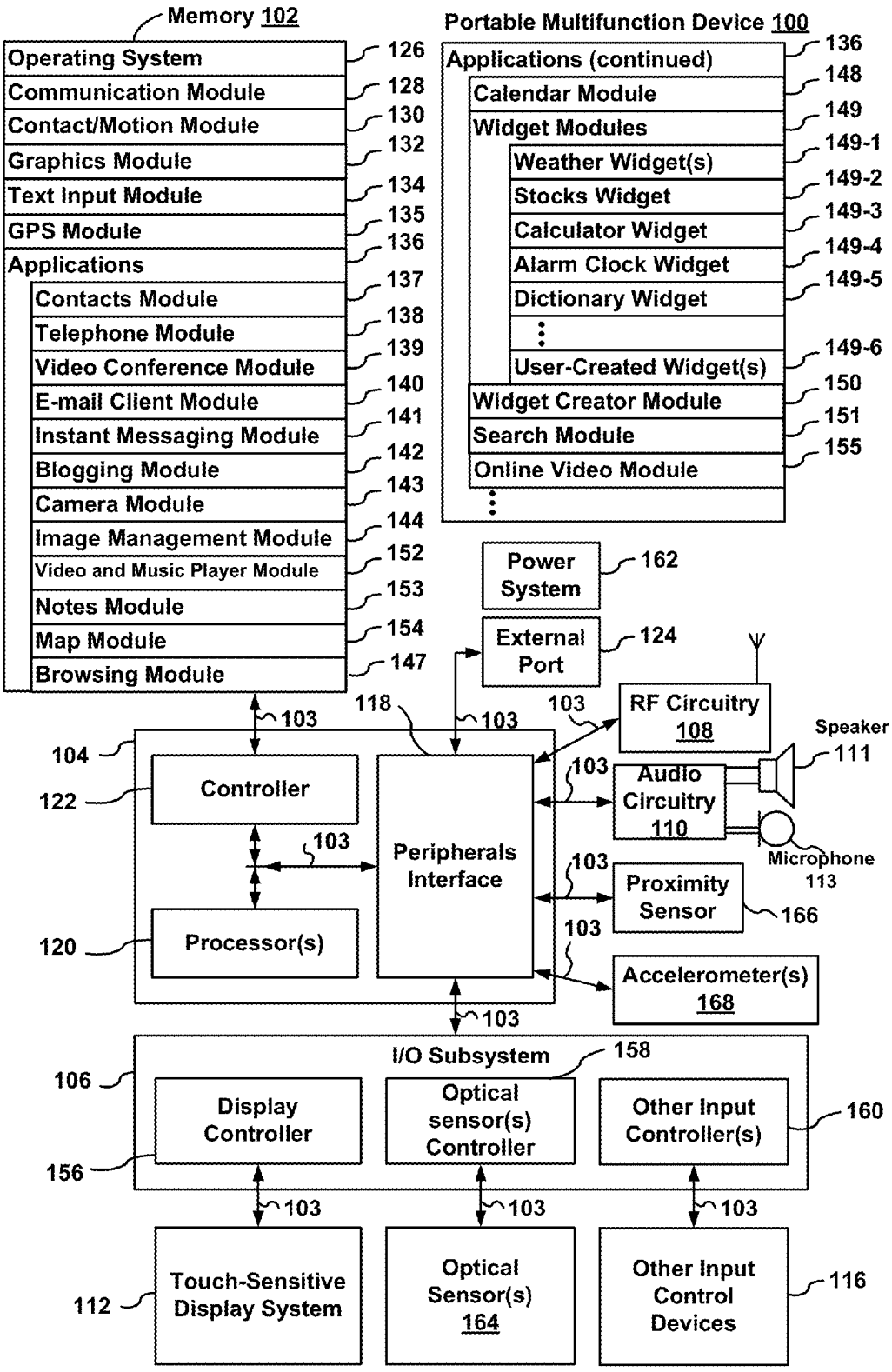

Attention is now directed towards embodiments of devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of capacitive touch sensing technologies now known or later developed, including but not limited to projected mutual capacitance touch sensing technologies, as well as other proximity sensor arrays or other elements for determining areas of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
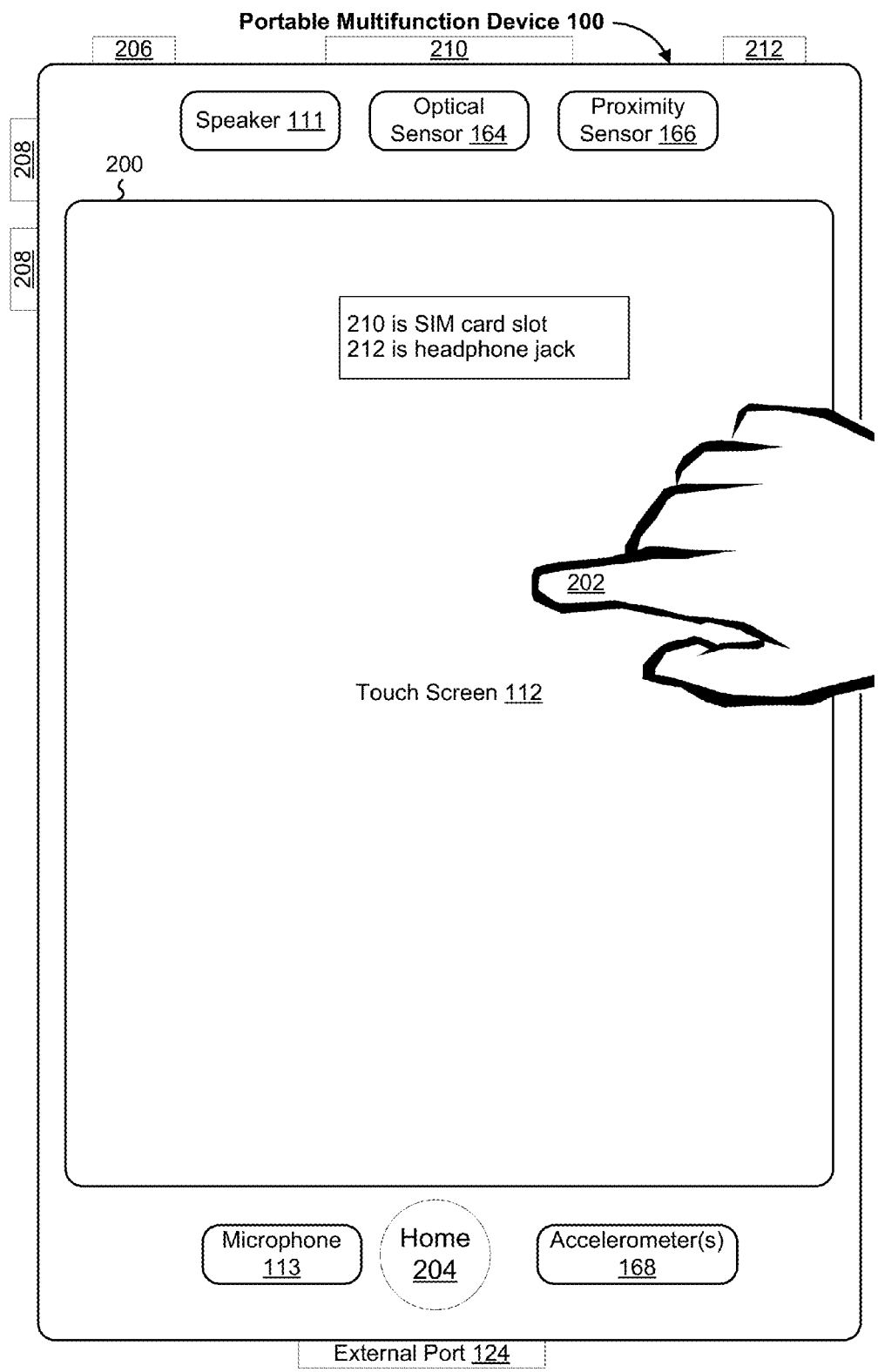
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
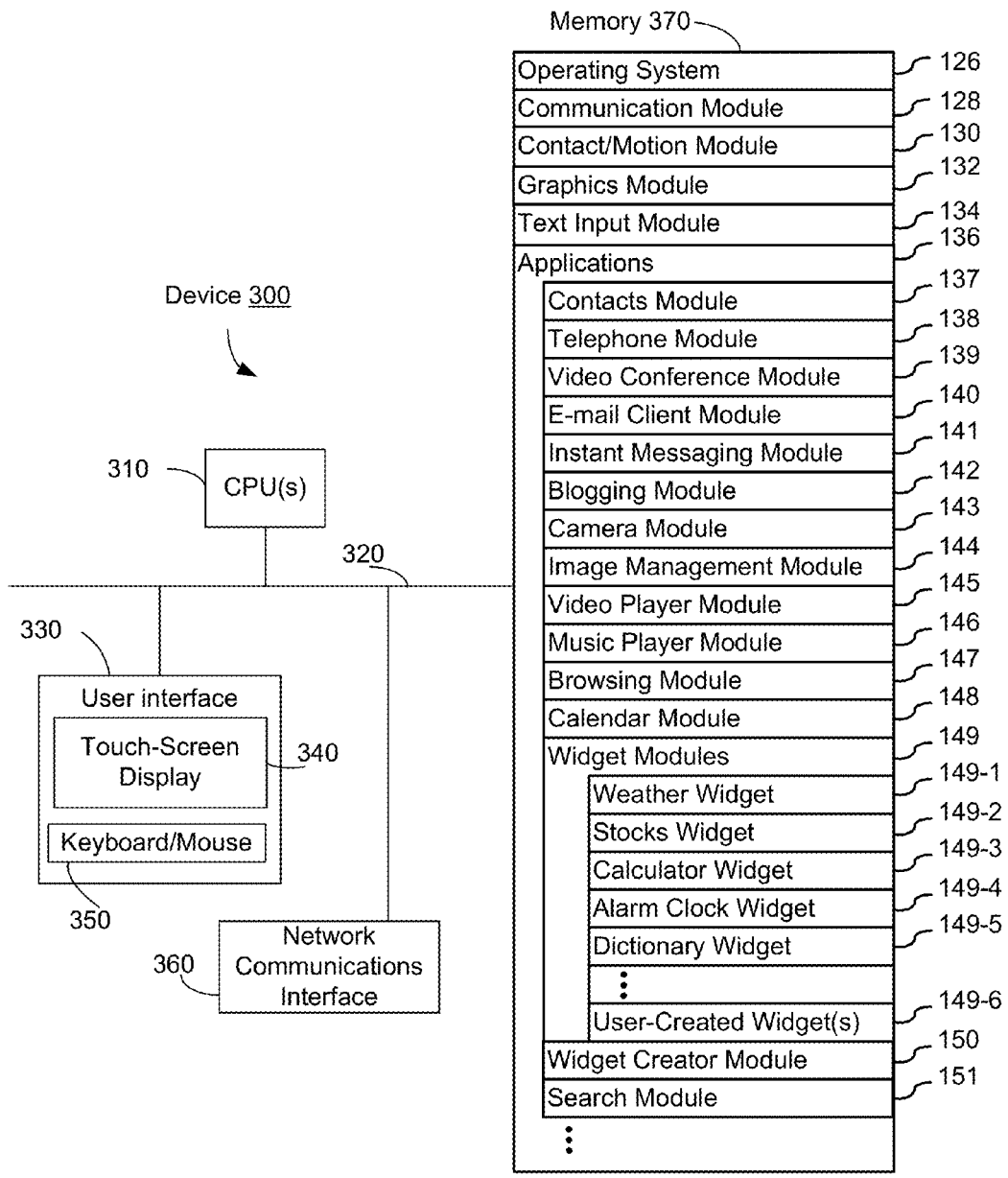
FIG. 3 is a block diagram of an exemplary electronic device with a touch screen display in accordance with some embodiments.

FIG. 3 is a block diagram of an exemplary electronic device with a touch screen display in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes a user interface 330 comprising a touch-screen display 340. The user interface 330 also may include a keyboard and/or mouse (or other pointing device) 350. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures (not shown) not present in the memory 102 of portable multifunction device 100.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
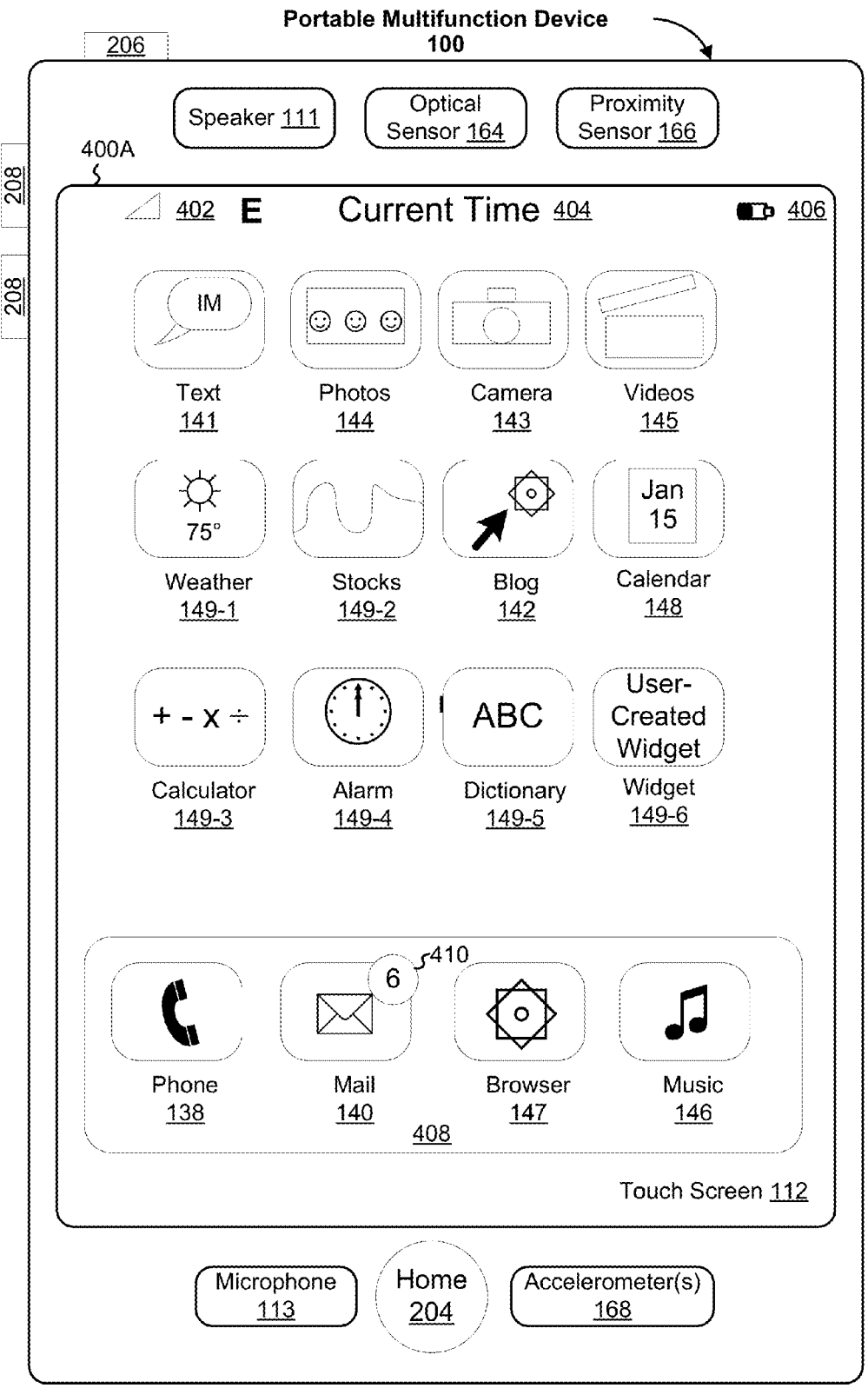
FIGS. 4A and 4B illustrate exemplary user interfaces for a menu of applications on a portable multifunction device in accordance with some embodiments.
Figure 4B:
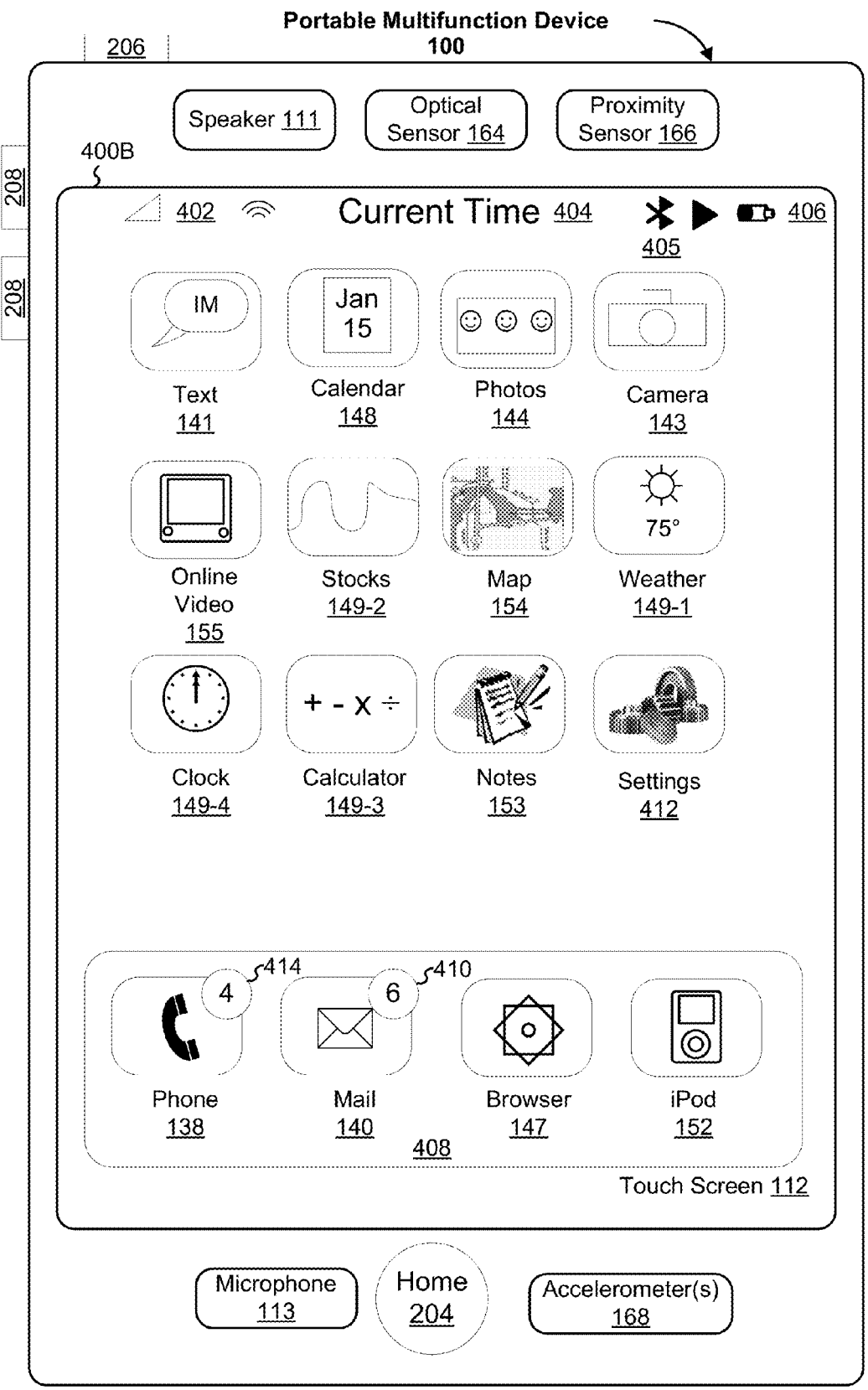

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple Computer, Inc.) module 152; and
  Online video module 155, also referred to as YouTube (trademark of Google, Inc.) module 155.

Attention is now directed towards embodiments of user interfaces ("UI") and associated processes that may be implemented on a computing device with a touch screen display, such as device 300 or portable multifunction device 100.

Figure 5A:
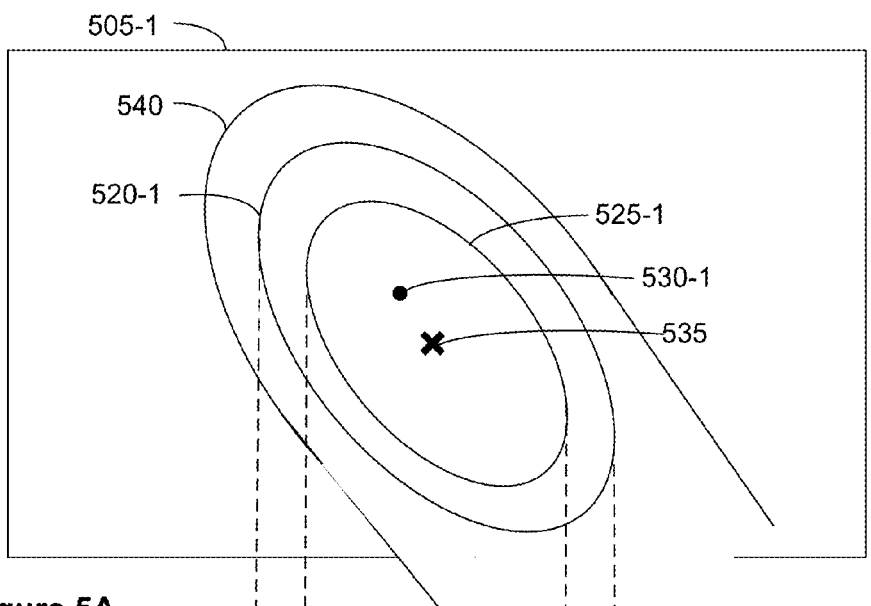
FIG. 5A illustrates an overhead view of an exemplary finger in contact with a touch screen display in accordance with some embodiments.

FIG. 5A illustrates an overhead view 500 of an exemplary finger in contact with a touch screen display in accordance with some embodiments. FIG. 5A shows finger 540 in contact 520-1 with a touch screen display 505-1. A touch area 525-1 created by the device that corresponds to the contact 520 is shown, along with a representative point 530-1 and a centroid 535 of the touch area. Note that the touch area 525 created by the device is typically not visible to a user. In other words, the touch area 525 models the finger contact 520, but the touch area 520 is typically not shown on the touch screen display 505.

Figure 5B:
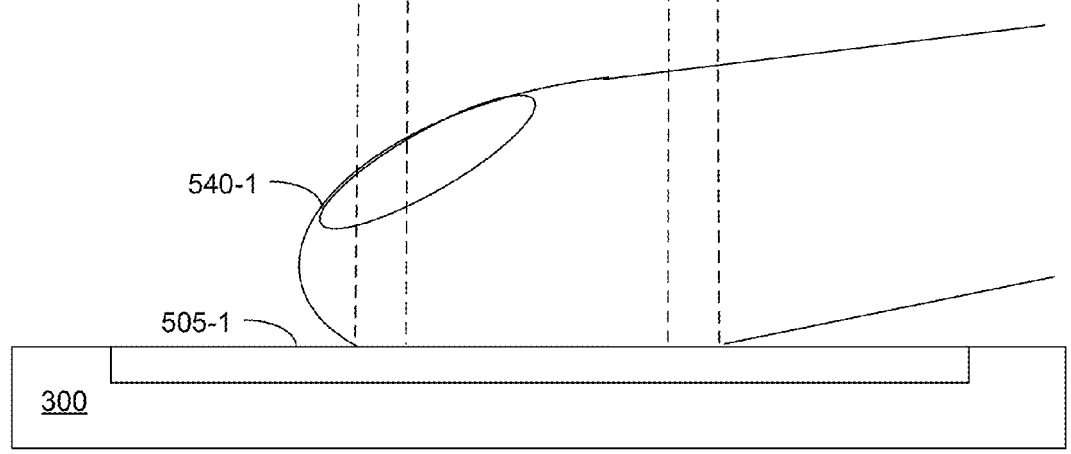
FIG. 5B illustrates a side view of the finger and the touch screen of FIG. 5A.

FIG. 5B illustrates a side view of the finger and the touch screen display of FIG. 5A. In FIG. 5B, dotted lines corresponding to the edges of finger contact 520-1 and touch area 525-1 in FIG. 5A are shown. In some embodiments, the created touch area 525-1 is smaller than the contact area 520-1 of the finger 540-1, as shown in FIGS. 5A and 5B. In some embodiments, the created touch area 525 is larger than the contact area 520 of the finger 540 (not shown).

Figure 5C:
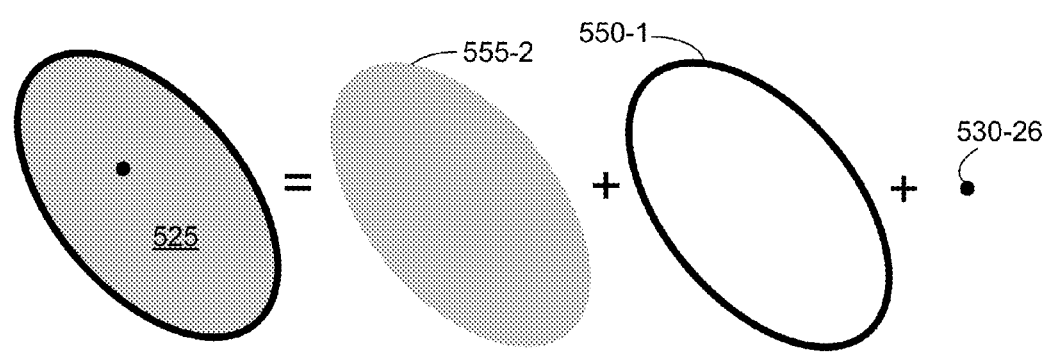
FIG. 5C illustrates the components of a touch area in accordance with some embodiments.

FIG. 5C illustrates the components of a touch area 525 in accordance with some embodiments. The touch area 525 is created in response to detecting a finger contact 520 with a touch screen display 510. The touch area 525 includes an area 555 with a perimeter 550 and a representative point 530. In some embodiments, the representative point is the centroid 535 (FIG. 5A) of the touch area. In some embodiments, the representative point 530 is offset from the centroid 535 of the touch area (e.g., as shown in FIG. 5A). The representative point may be offset from the centroid to compensate for parallax, persistent errors between desired and actual contact locations, or other finger placement errors.

Figure 5D:
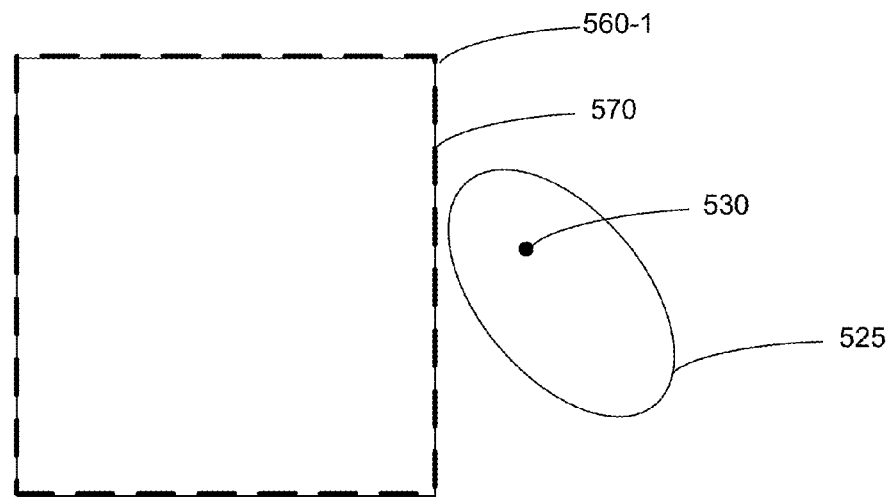
FIGS. 5D-5F illustrate hit regions for on-screen objects in accordance with some embodiments.
Figure 5E:
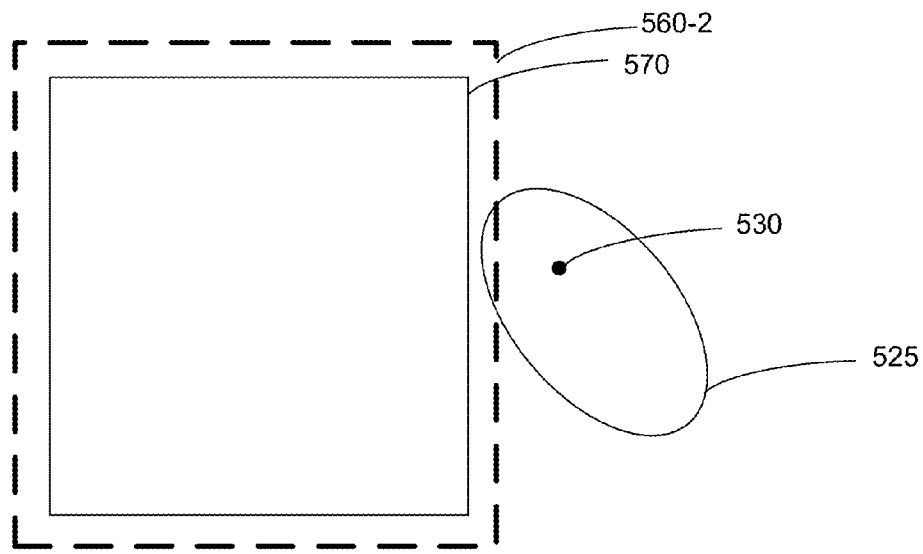
Figure 5F:
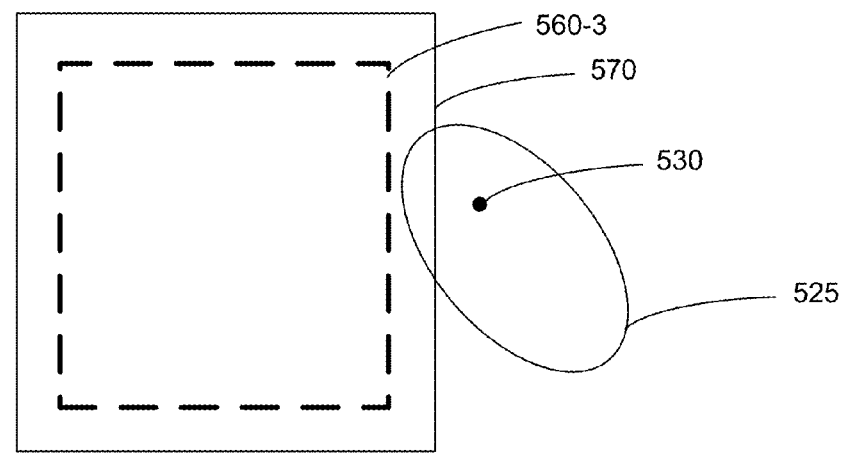

FIGS. 5D-5F illustrate hit regions 560 for on-screen objects in accordance with some embodiments. A touch area 525 is determined to overlap an object 570 if the touch area overlaps the object's hit region 560. Similarly, a touch area is determined to intersect an object if the touch area intersects the object's hit region. An object's hit region 560 is typically the same as the object 570 displayed on the touch screen. For example, in FIG. 5D, hit region 560-1 is the same as the on-screen object 570. In some embodiments, however, the hit region is larger (e.g., hit region 560-2, FIG. 5E) or smaller (e.g., hit region 560-3, FIG. 5F) than the object 570 displayed on the touch screen. A larger hit region (FIG. 5E) makes it easier for a touch area to overlap or intersect the object. Conversely, a smaller hit region (FIG. 5F) makes it harder for a touch area to overlap or intersect the object. As used in the specification and claims, phrases like "determining if the touch area overlaps an object" will be understood to mean "determining if the touch area overlaps an object's hit region," where the object's hit region may be the same as, larger than, or smaller than the on-screen object. For ease of illustration and explanation, an object's hit region 560 will be the same as the on-screen object (e.g., connected object 510 and unconnected object 600) in the Figures (except for FIGS. 5E and 5F).

Figure 6A:
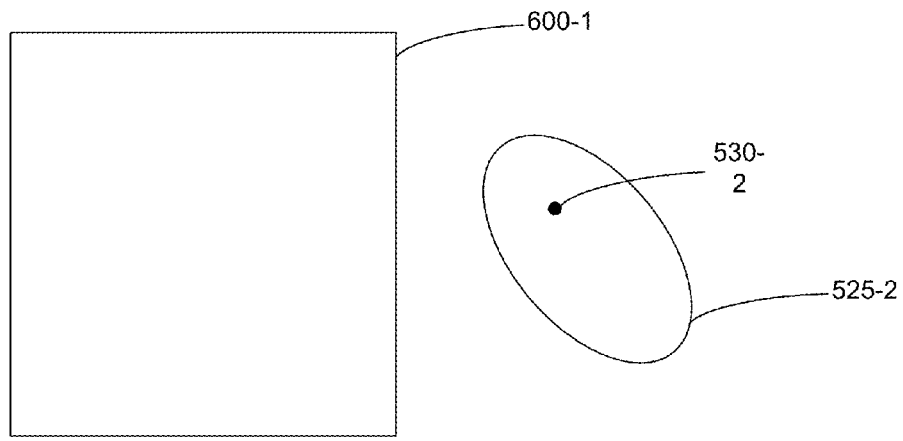
FIGS. 6A-6F illustrate various degrees and types of overlap of a touch area with an object displayed on the touch screen display in accordance with some embodiments.
Figure 6B:
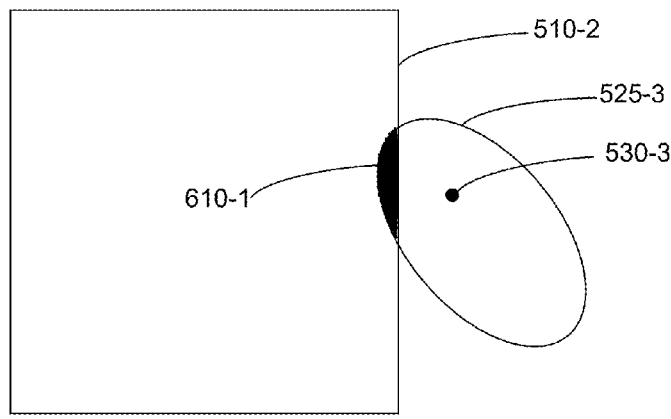
Figure 6C:
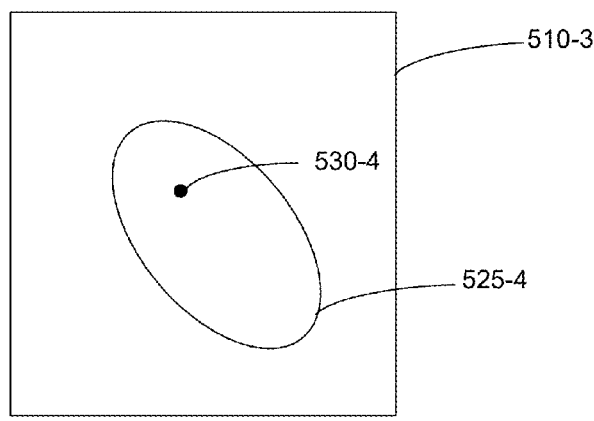
Figure 6D:
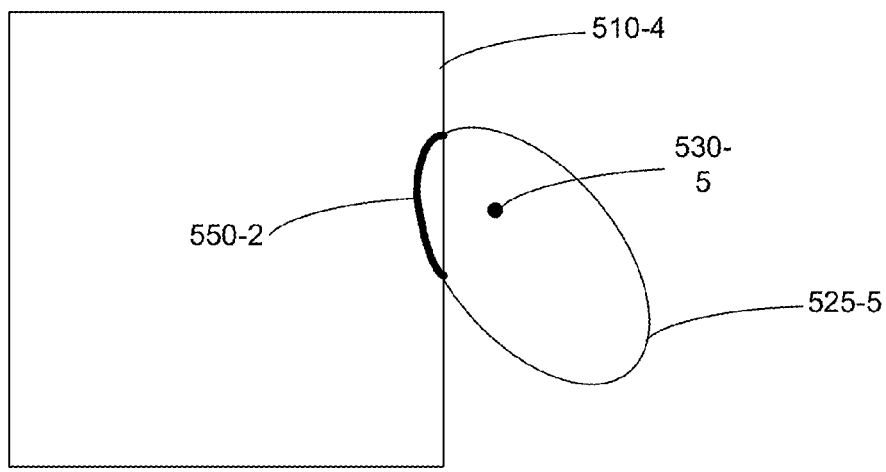
Figure 6E:
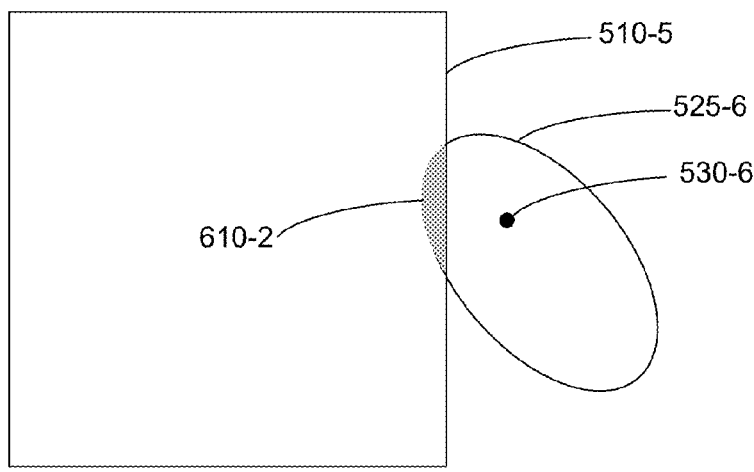
Figure 6F:
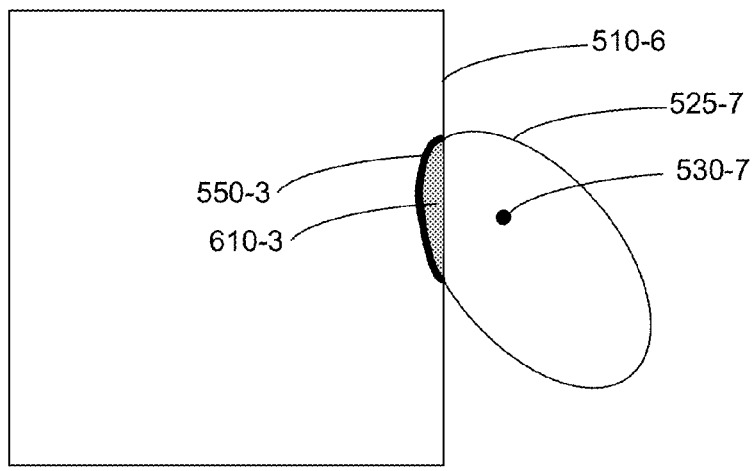

FIGS. 6A-6F illustrate various degrees and types of overlap of a touch area with an object displayed on the touch screen display in accordance with some embodiments. FIGS. 6A-6C show no overlap, partial overlap, and complete overlap, respectively, between a touch area 525 and an on-screen object. FIGS. 6D-6F illustrate different parts of the touch area 525 that may be analyzed to determine if the touch area overlaps the object, such as the perimeter of the touch area and/or an interior portion of the touch area.

Figure 7A:
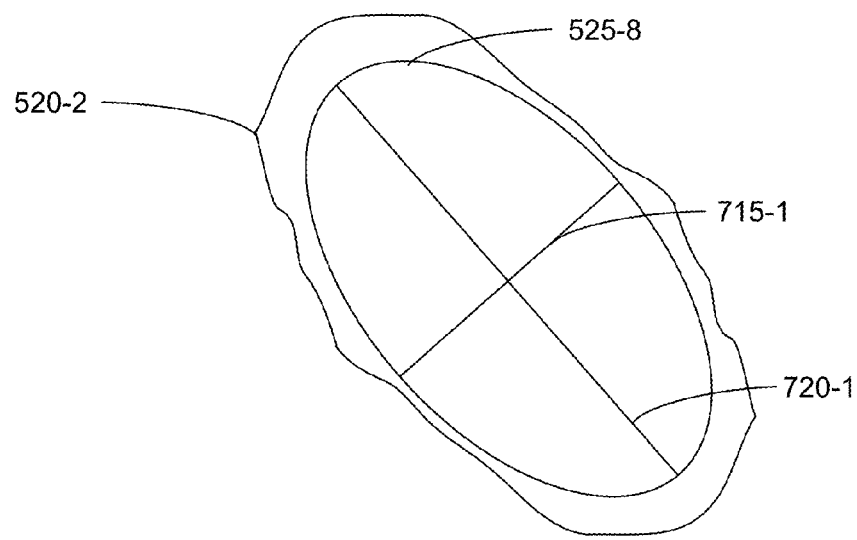
FIGS. 7A-7E illustrate touch areas created by modeling a single finger contact as a geometric object in accordance with some embodiments.
Figure 7B:
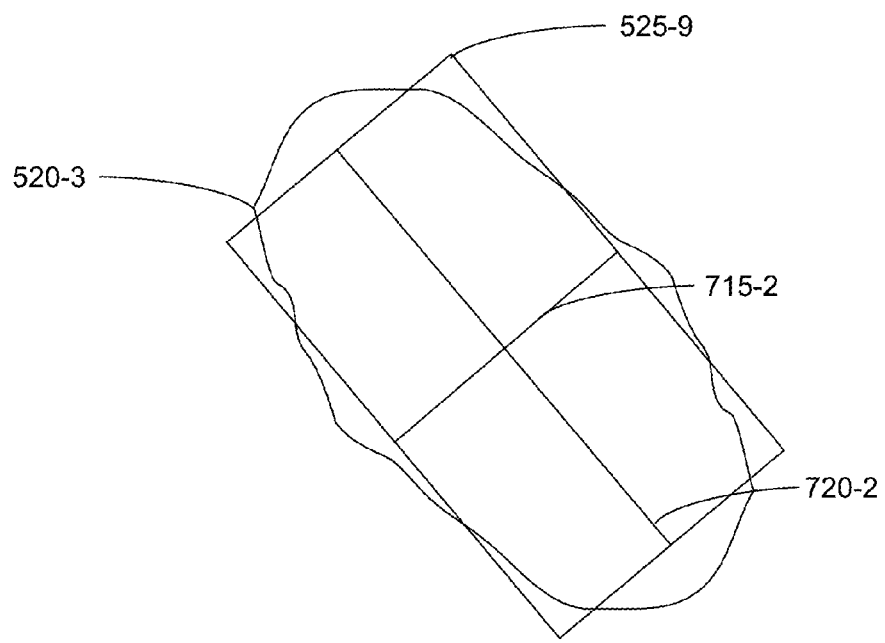
Figure 7C:
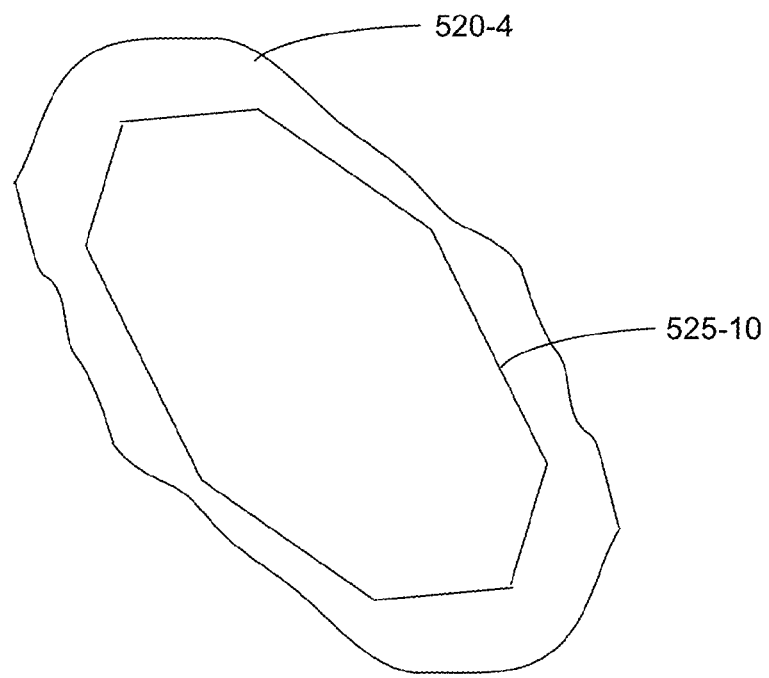
Figure 7D:
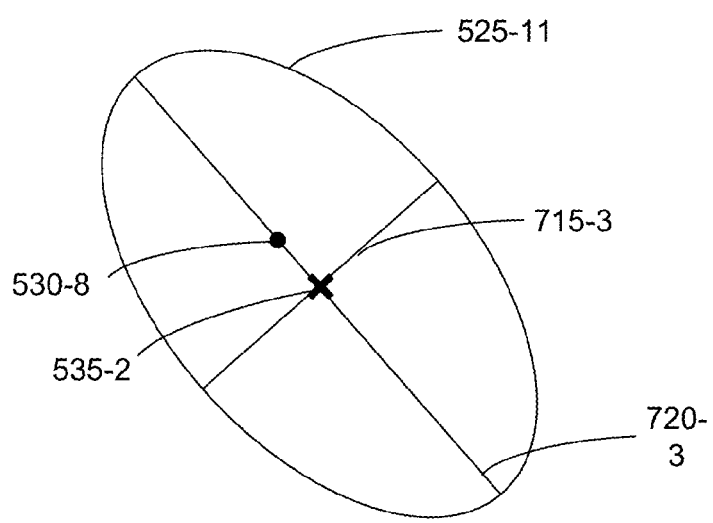
Figure 7E:
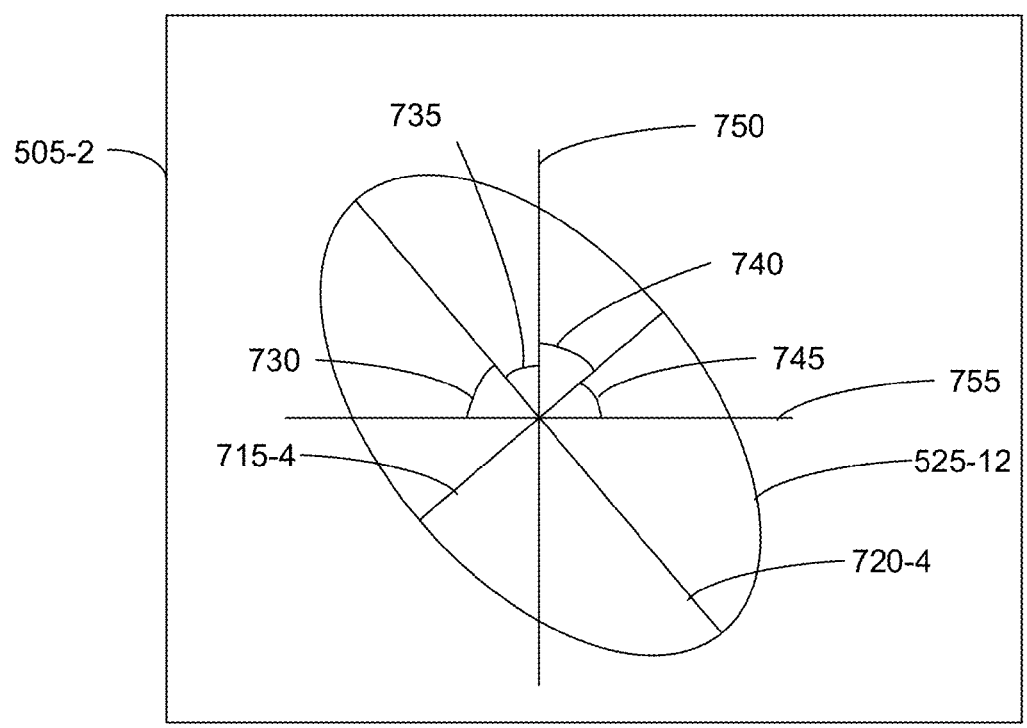

FIGS. 7A-7E illustrate touch areas created by modeling a single finger contact as a geometric object in accordance with some embodiments. The touch areas 525 are modeled as ellipses with major axis 720 and minor axis 715 in FIGS. 7A, 7D, and 7E. The touch areas 525 are modeled as polygons in FIGS. 7B and 7C. FIG. 7E also illustrates angles between an axis corresponding to the touch area 525 and an axis corresponding to the touch screen display 505-2 that may be determined and used to monitor rotation of the touch area. In turn, the determined rotation of the touch area may be used create corresponding rotations in objects connected to the touch area. Thus, information derived from a single finger contact may be used to control rotation of an on-screen object in a physically intuitive manner.

Figure 8A:
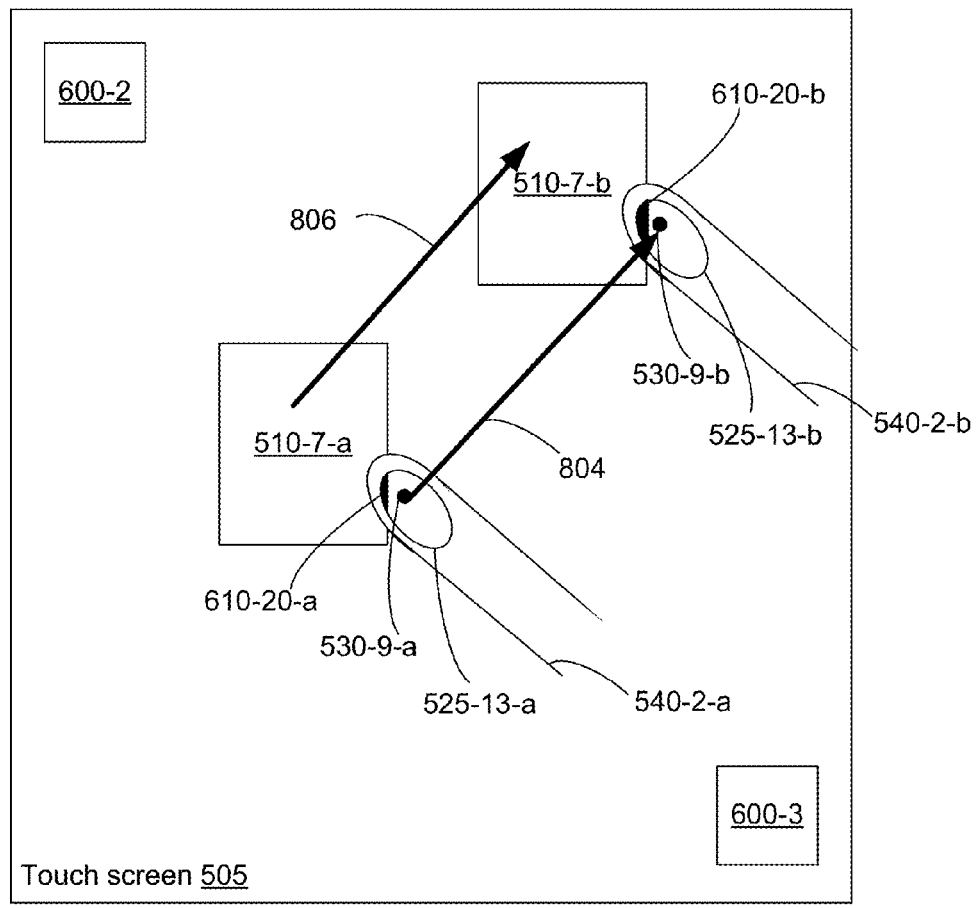
FIG. 8A illustrates translating an on-screen object in a graphical user interface on a touch screen display in accordance with some embodiments.
Figure 8B:
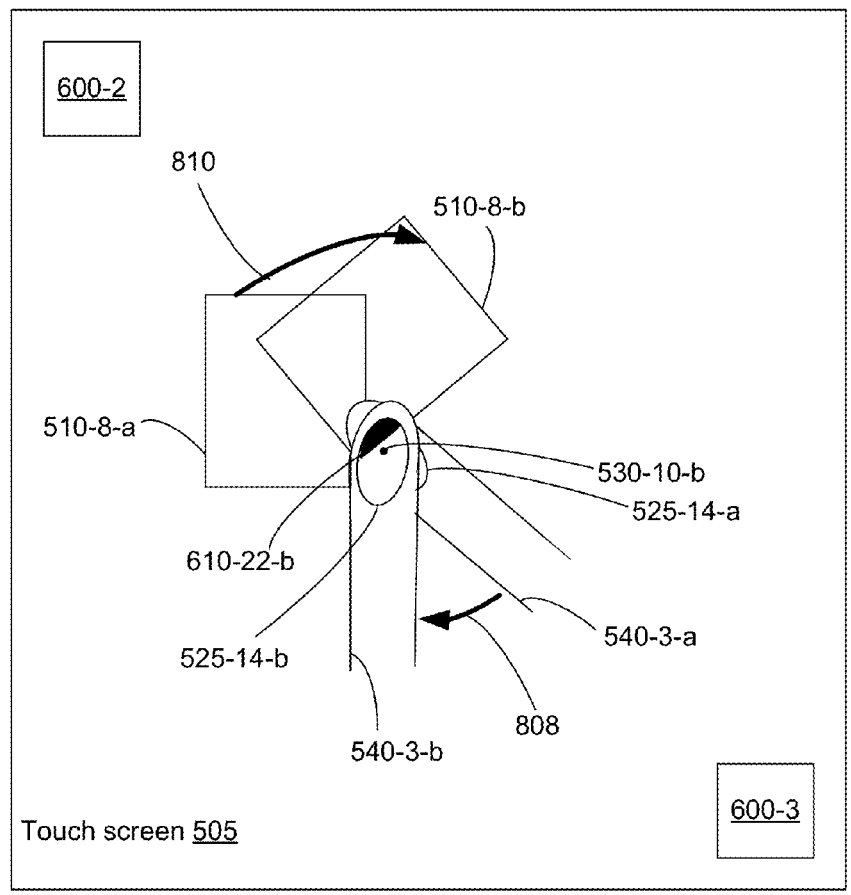
FIG. 8B illustrates rotating an on-screen object in a graphical user interface on a touch screen display in accordance with some embodiments.
Figure 8C:
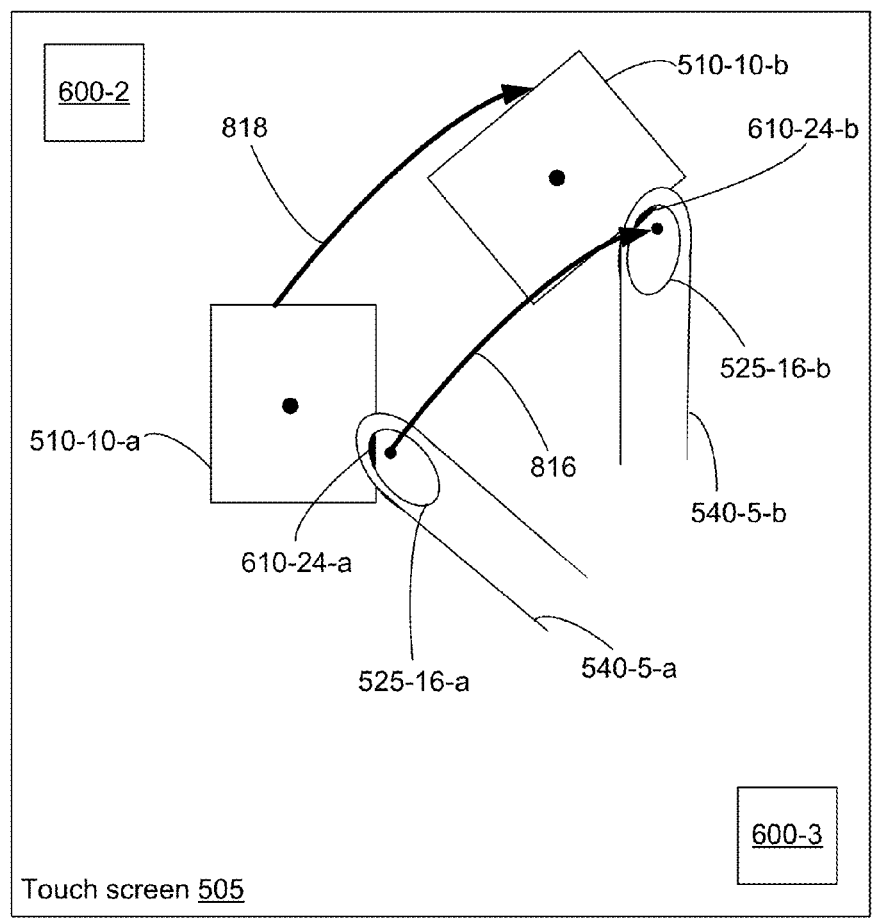
FIG. 8C illustrates simultaneously translating and rotating an on-screen object in a graphical user interface on a touch screen display in accordance with some embodiments.

FIGS. 8A-8C illustrate moving an on-screen object connected to a single finger touch area in accordance with movement of the touch area. Exemplary movements include translation (FIG. 8A); rotation about a point in the overlap region between the object and the touch area (FIG. 8B); and simultaneous translation and rotation of the object (FIG. 8C).

Figure 9A:
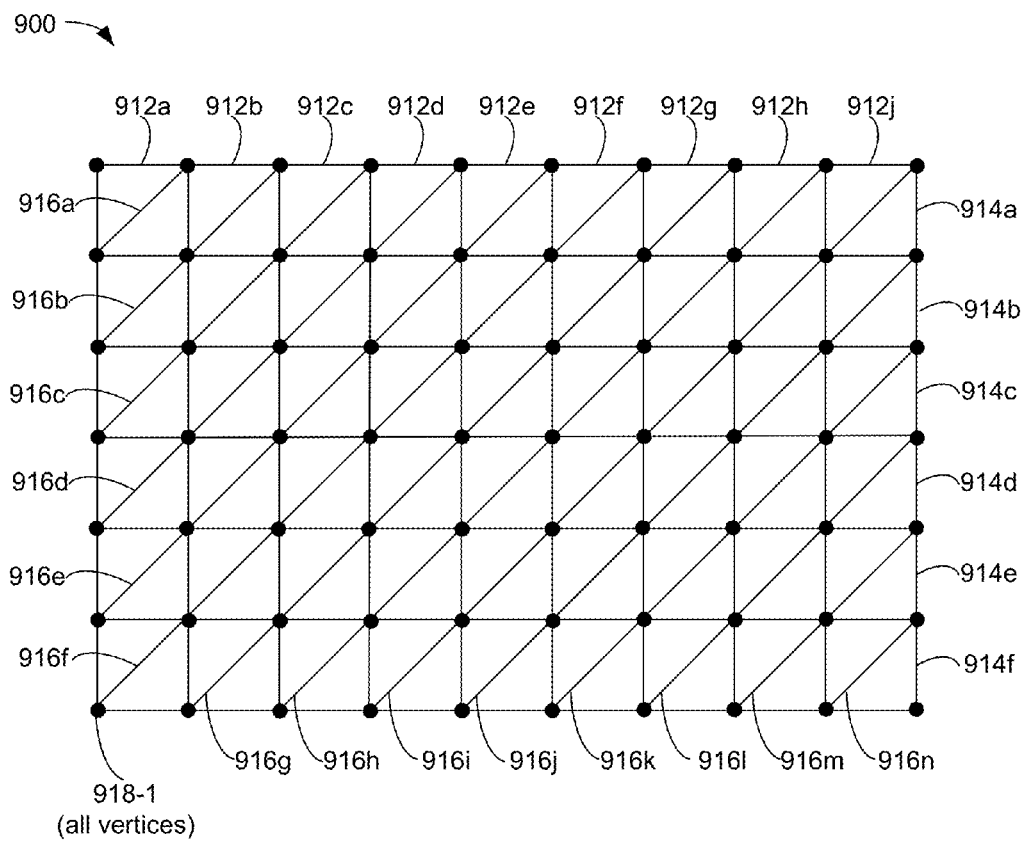
FIGS. 9A and 9B illustrate two-dimensional and simulated three-dimensional on-screen objects modeled as a set of vertices in accordance with some embodiments.
Figure 9B:
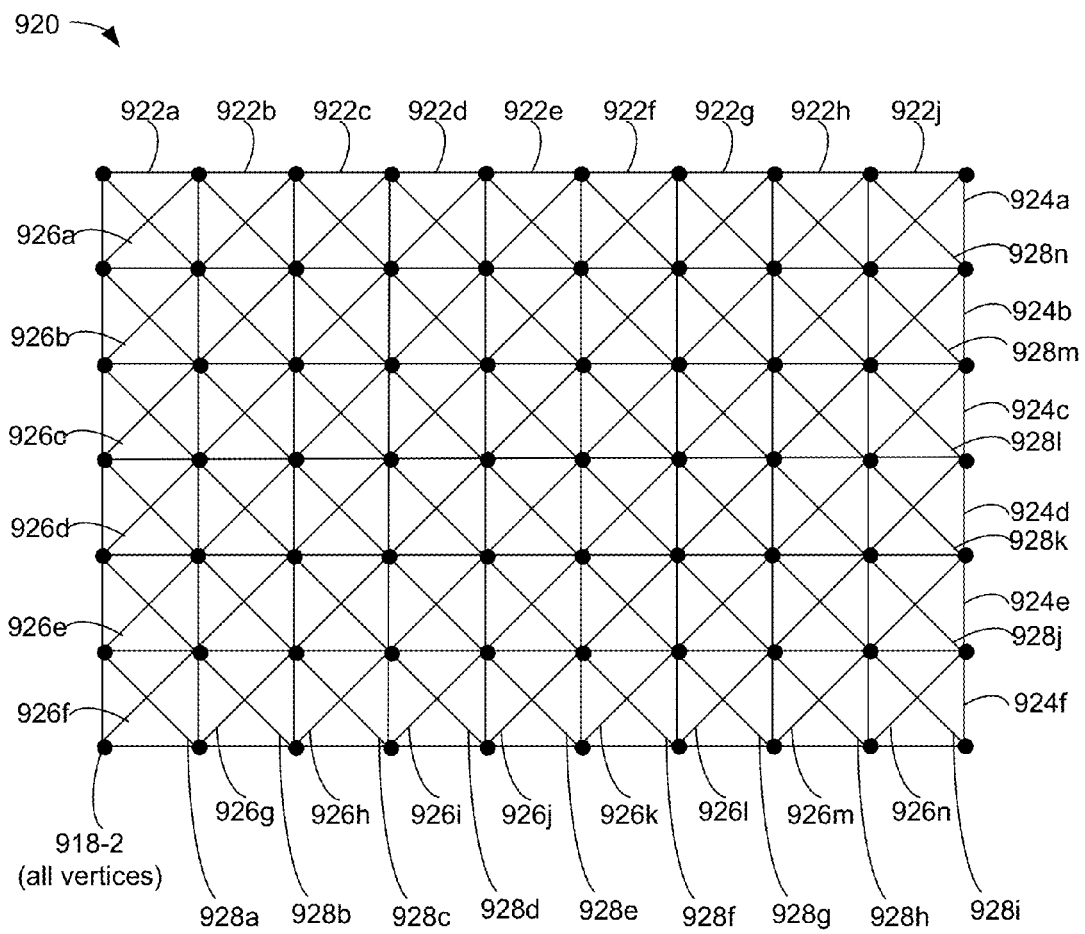

FIGS. 9A and 9B illustrate two-dimensional and simulated three-dimensional on-screen objects modeled as a set of vertices in accordance with some embodiments. The vertices may be arranged in rows (e.g., 914 *a-f*, FIG. 9A), columns (e.g., 912 *a-j*, FIG. 9A), and/or diagonals (e.g., 916 *a-n*, Figure A).

Figure 10A:
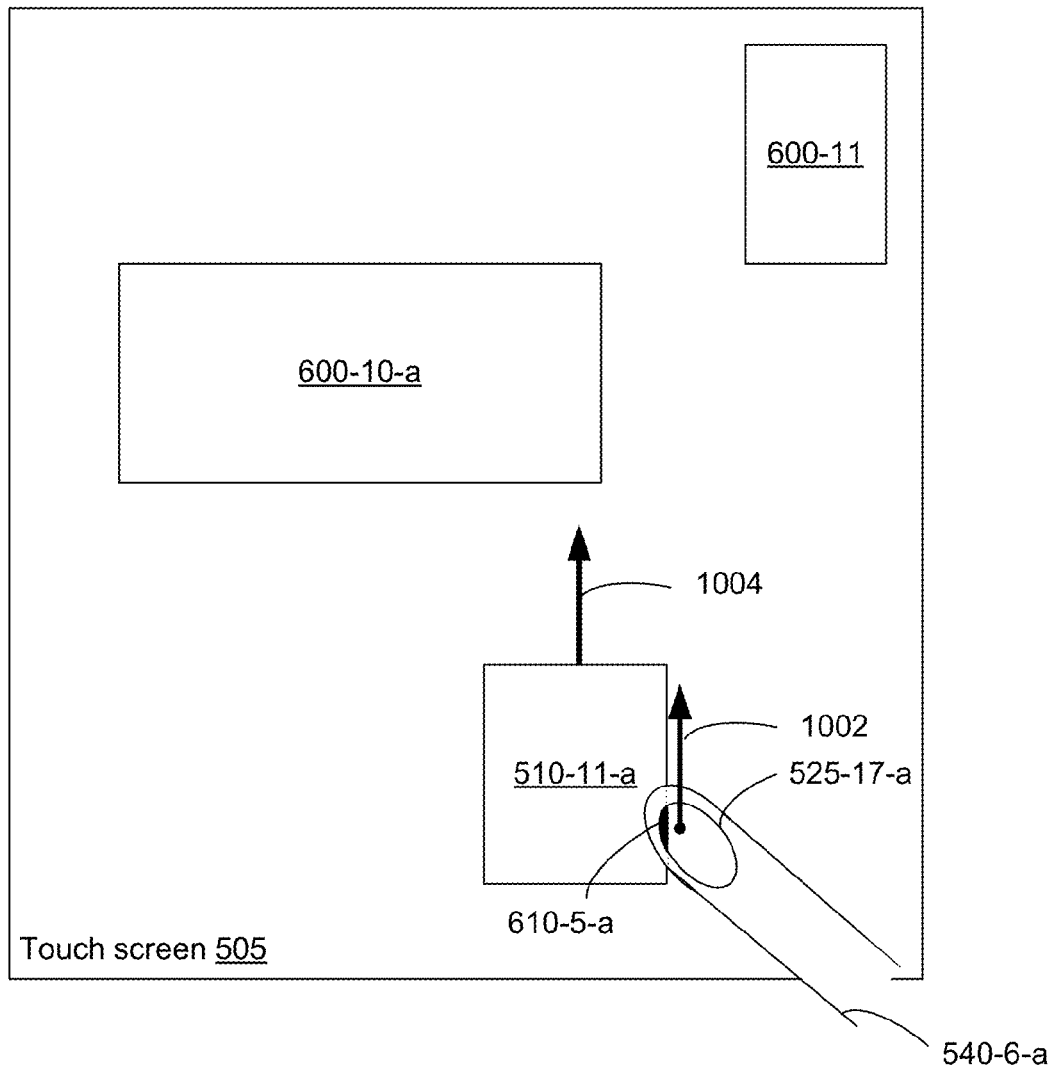
FIGS. 10A-10C illustrate moving an unconnected on-screen object in response to intersection with a connected on-screen object in a graphical user interface on a touch screen display in accordance with some embodiments.
Figure 10B:
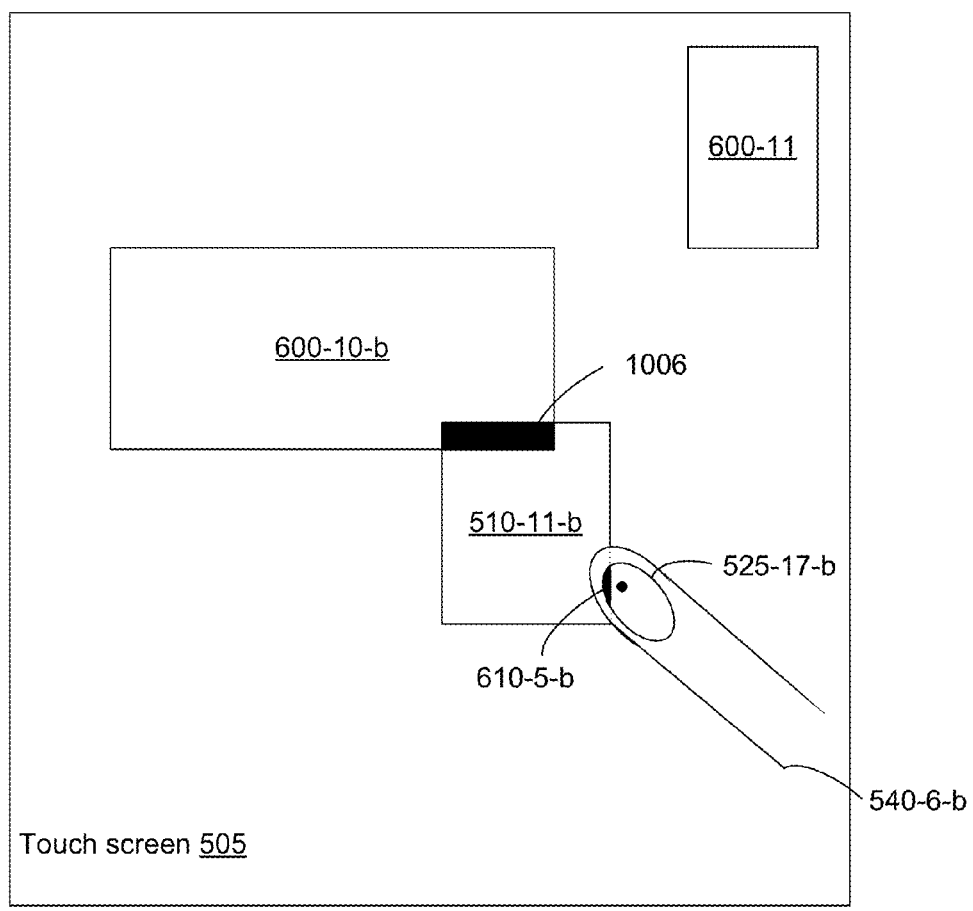
Figure 10C:
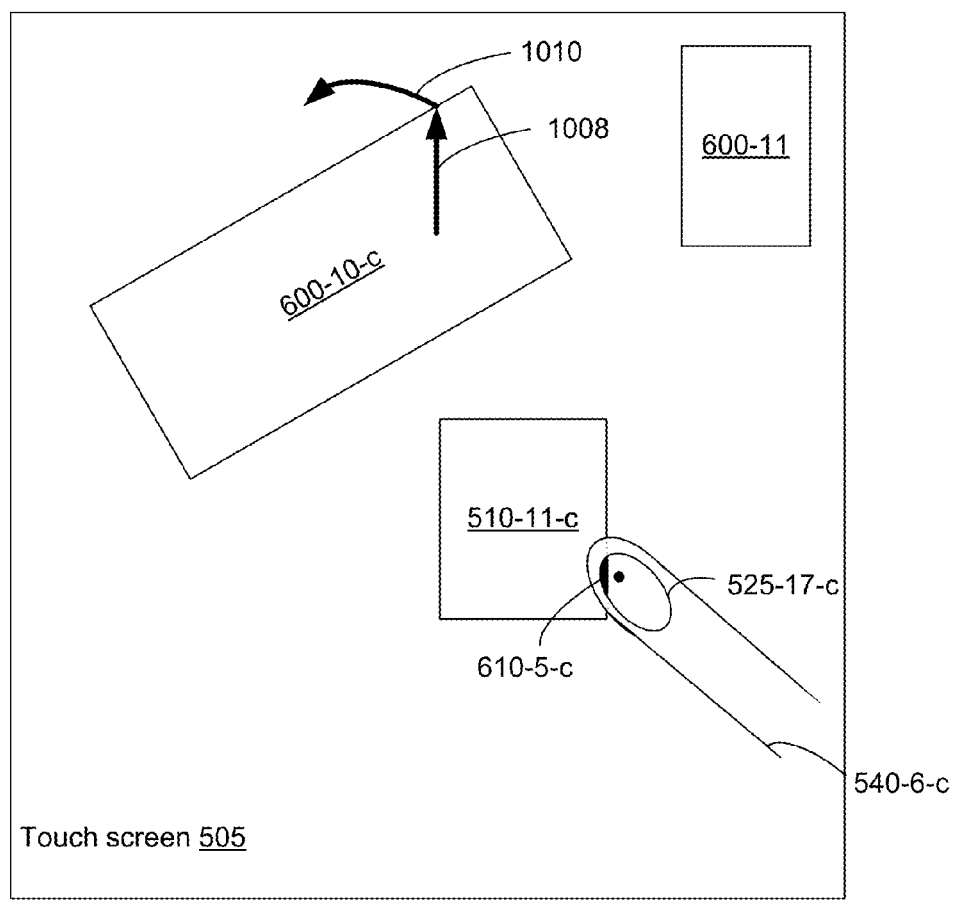

FIGS. 10A-10C illustrate moving an unconnected on-screen object in response to intersection (a virtual collision) with an on-screen object connected to a touch area.

Figure 11A:
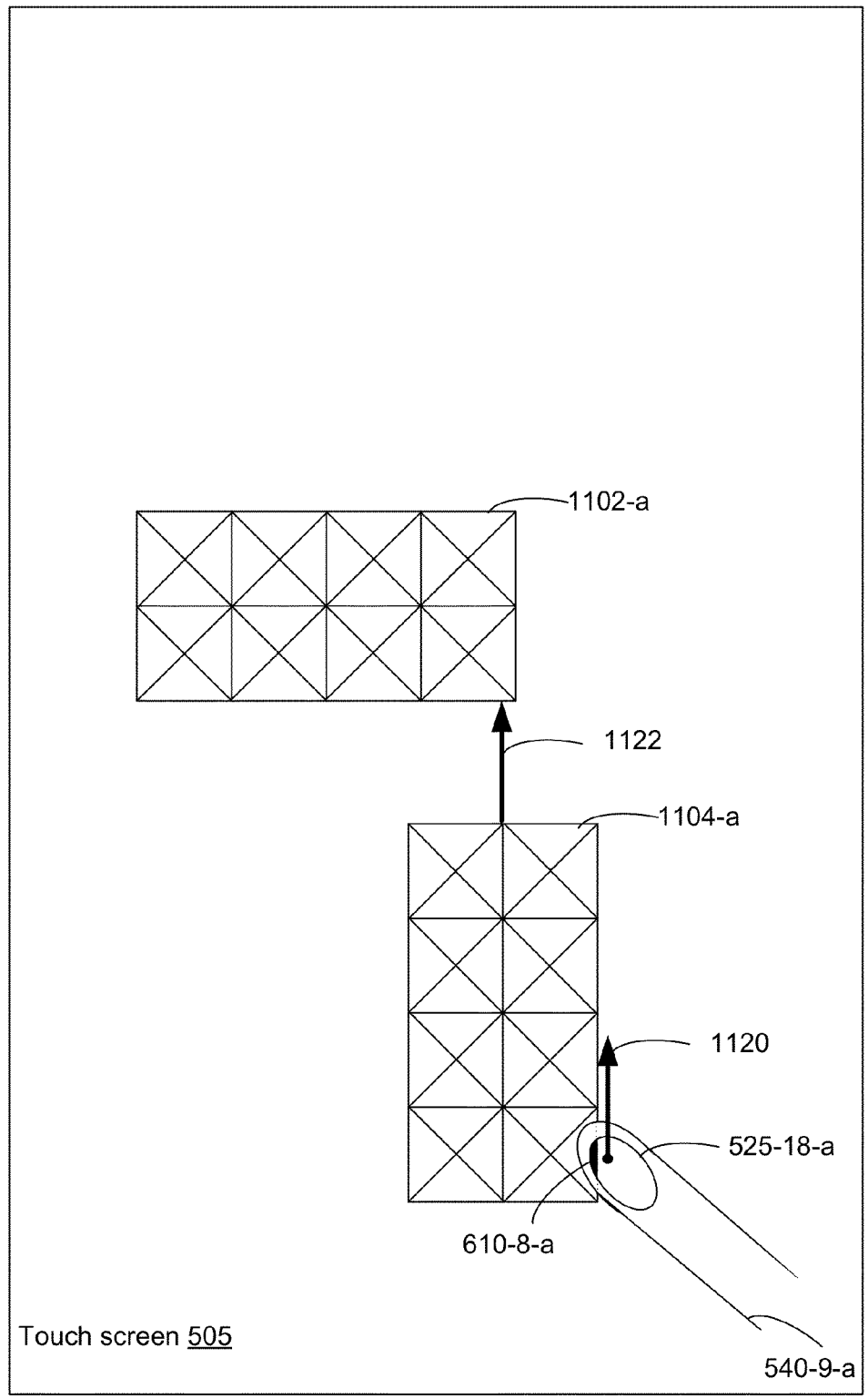
FIGS. 11A-11C illustrate moving an unconnected on-screen object in response to intersection with a connected on-screen object in a graphical user interface on a touch screen display, where both objects are modeled as a set of vertices, in accordance with some embodiments.
Figure 11B:
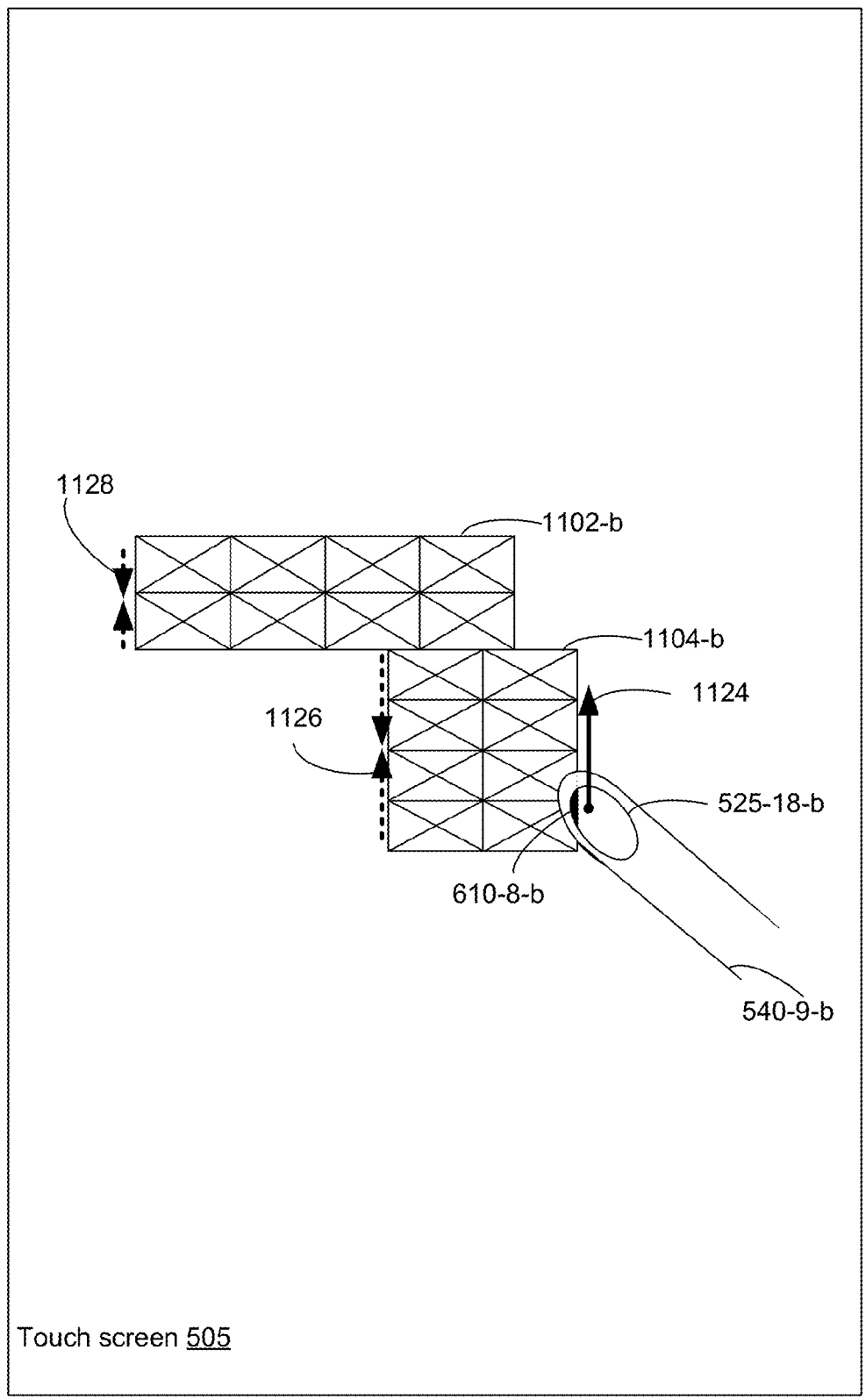
Figure 11C:
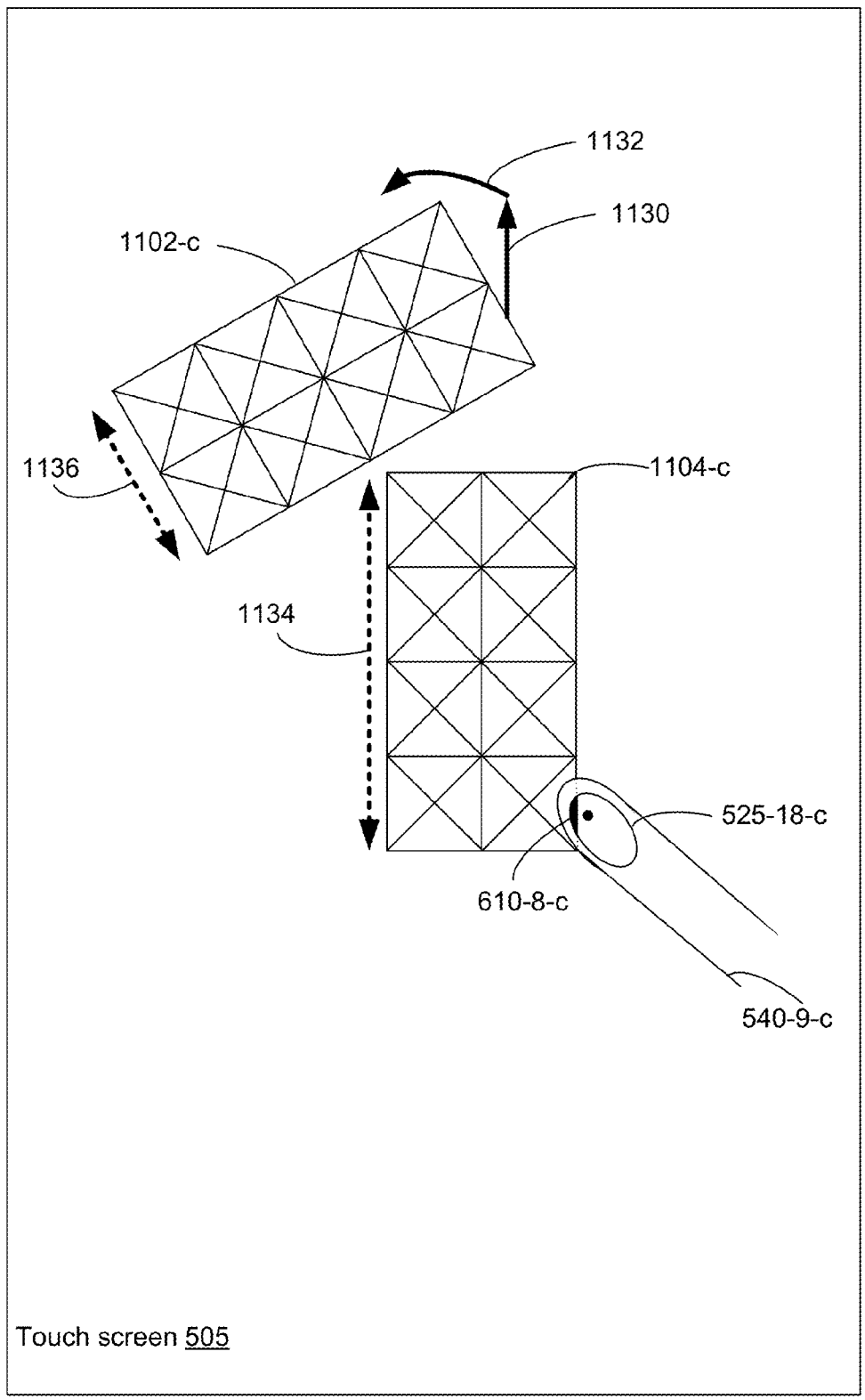

FIGS. 11A-11C illustrate moving an unconnected on-screen object in response to intersection with an on-screen object connected to a touch area. Both objects are modeled as a set of vertices and a rigid body simulation of the virtual collision is displayed.

Figure 12A:
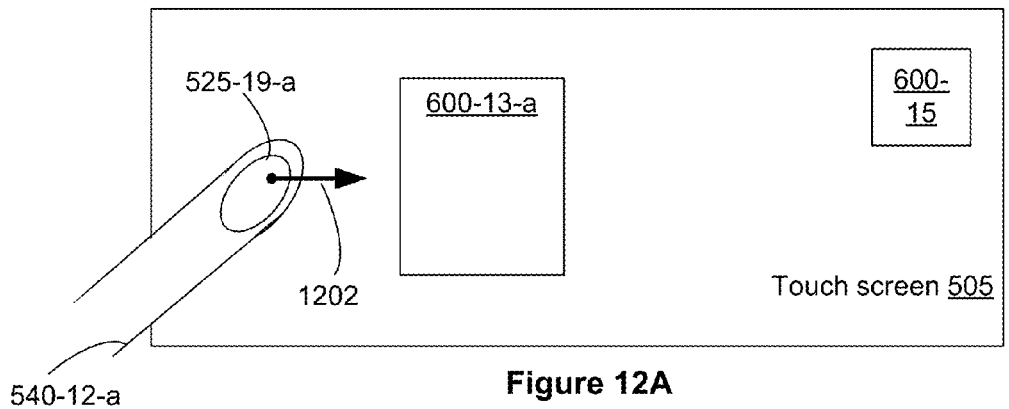
FIGS. 12A-12C illustrate moving an on-screen object in response to intersection with a touch area in a graphical user interface on a touch screen display in accordance with some embodiments.
Figure 12B:
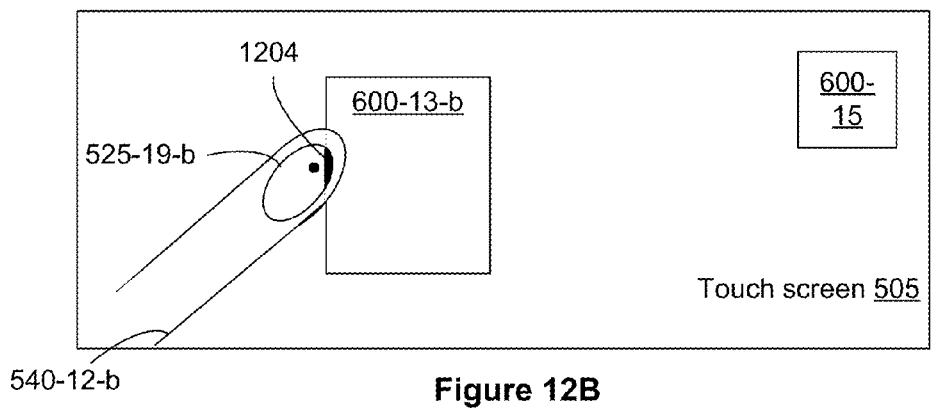
Figure 12C:
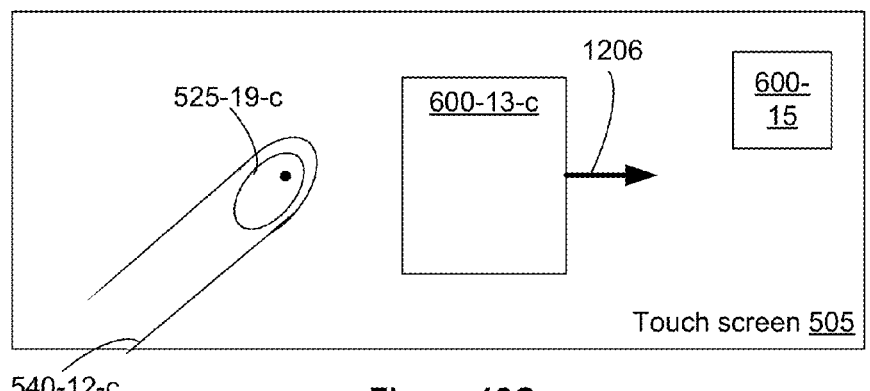

FIGS. 12A-12C illustrate moving an on-screen object in response to intersection (e.g., virtual nudging or bumping) with a touch area. The movement may include translation (1206, FIG. 12C) and/or rotation (not shown) of the nudged object.

Figure 13A:
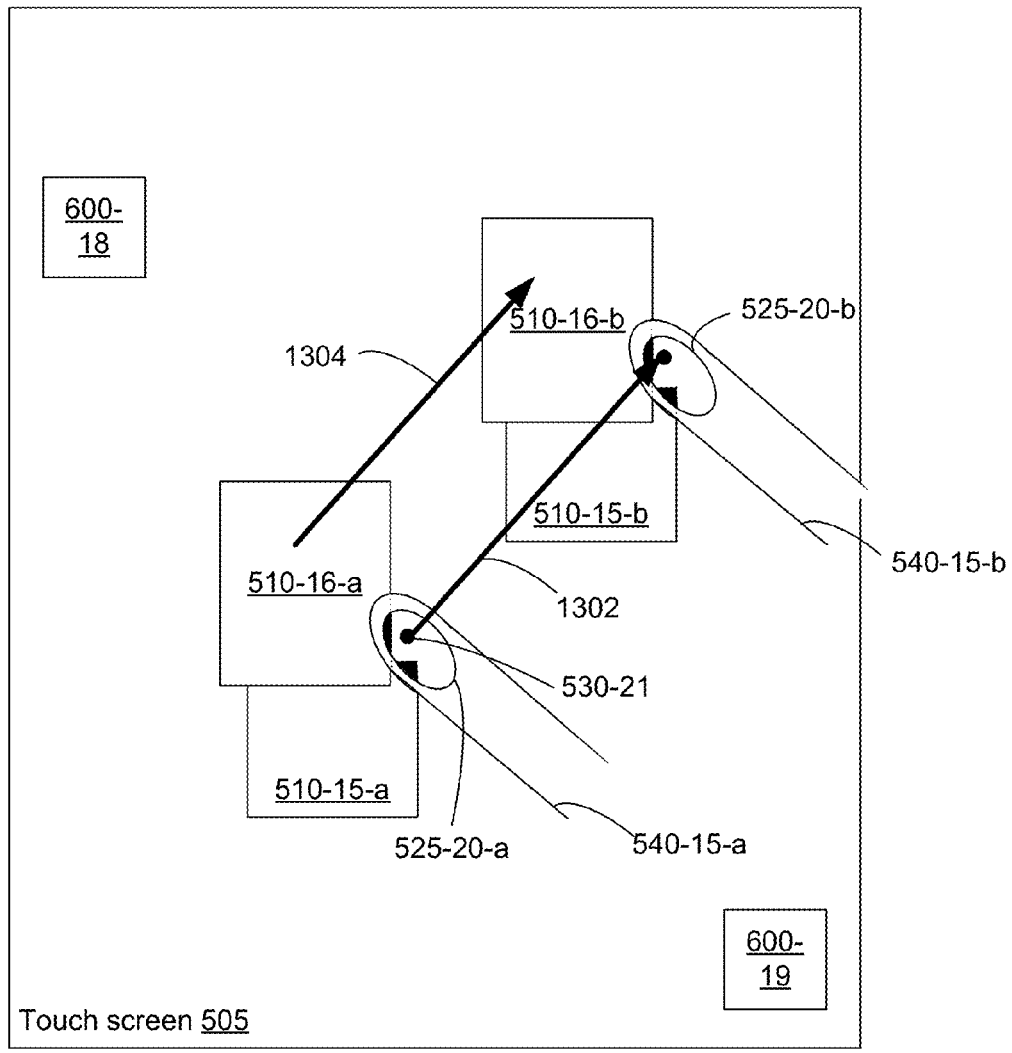
FIG. 13A illustrates translating multiple on-screen objects in a graphical user interface on a touch screen display in accordance with some embodiments.
Figure 13B:
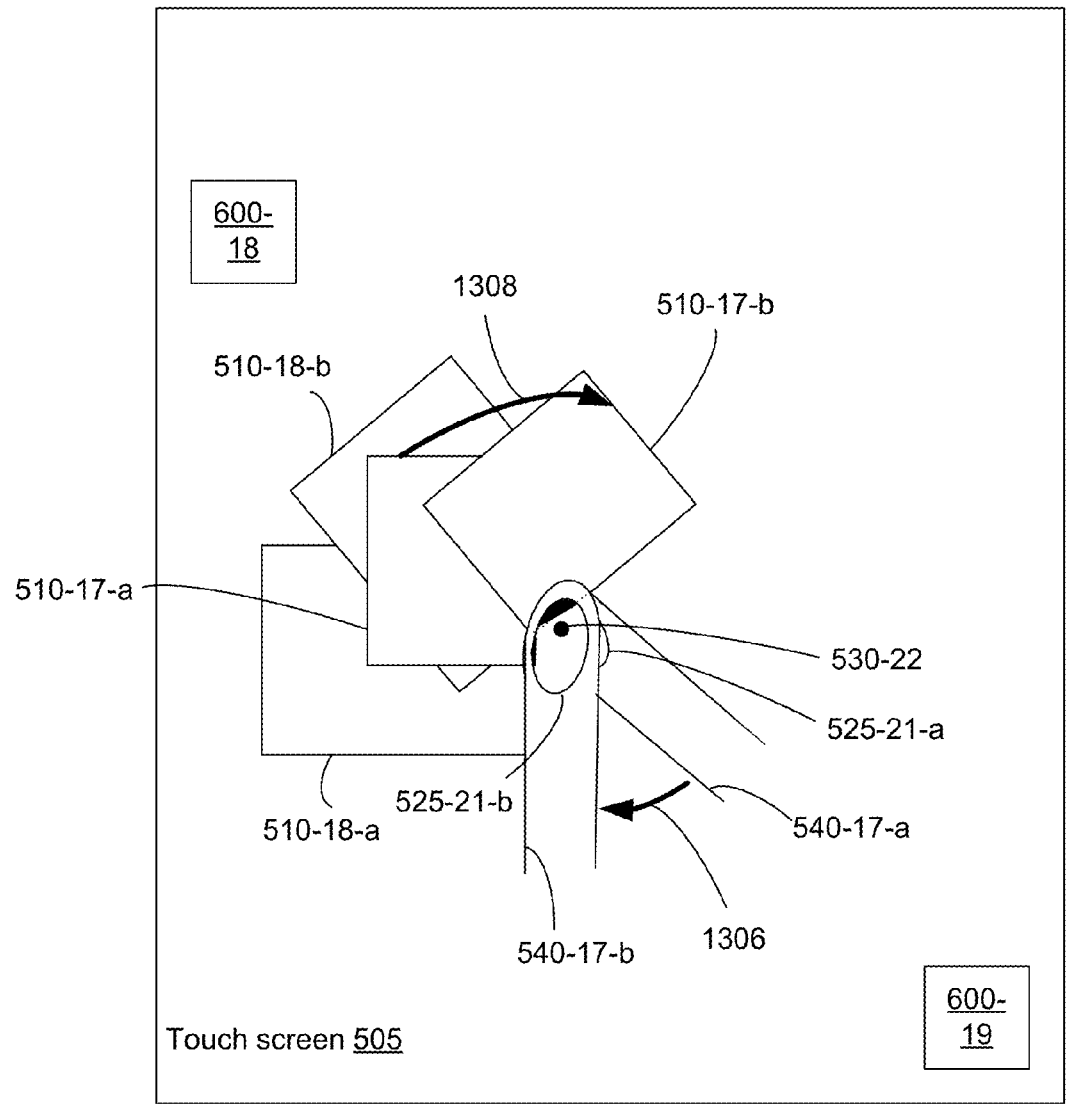
FIG. 13B illustrates rotating multiple on-screen objects in a graphical user interface on a touch screen display in accordance with some embodiments.
Figure 13C:
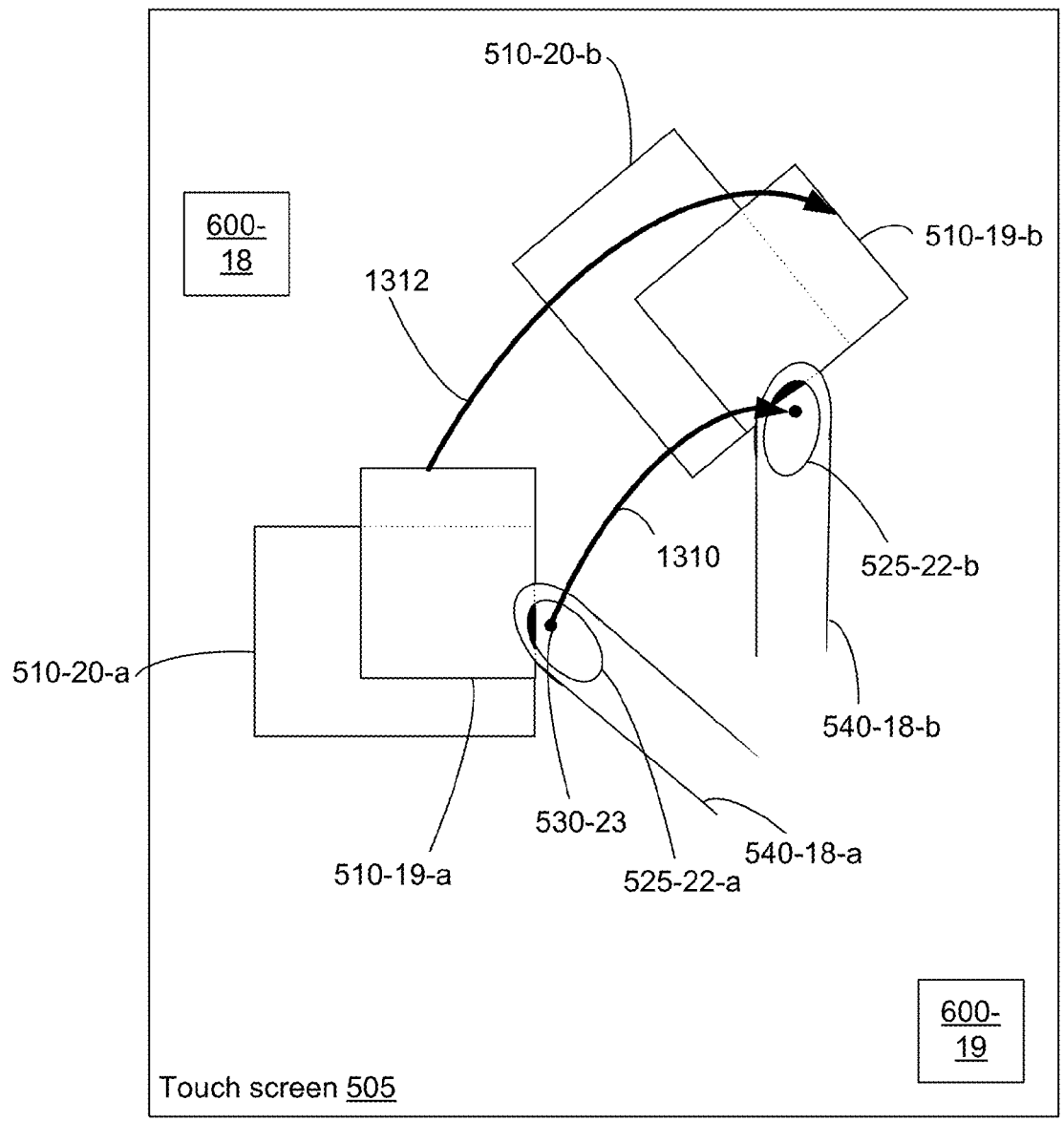
FIG. 13C illustrates simultaneously translating and rotating multiple on-screen objects in a graphical user interface on a touch screen display in accordance with some embodiments.
Figure 13D:
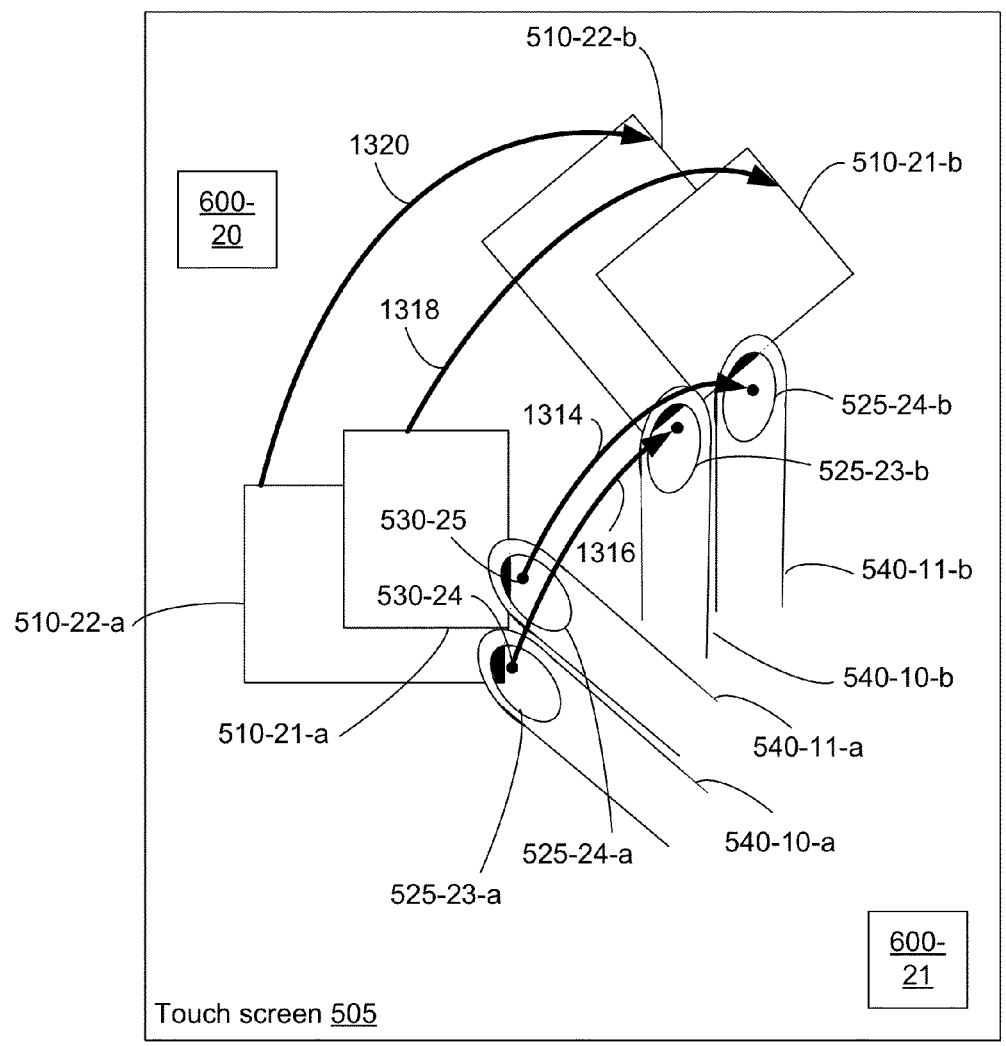
FIG. 13D illustrates simultaneously translating and rotating multiple on-screen objects in a graphical user interface on a touch screen display in accordance with some embodiments.

FIGS. 13A-13C illustrate moving multiple on-screen objects connected to a single finger touch area in accordance with movement of the touch area. Exemplary movements include translation (FIG. 13A); rotation (FIG. 13B); and simultaneous translation and rotation of the objects (FIG. 13C). FIG. 13D illustrates moving multiple on-screen objects, with each object connected to a single finger touch area, in accordance with movement of the touch areas.

Figure 14A:
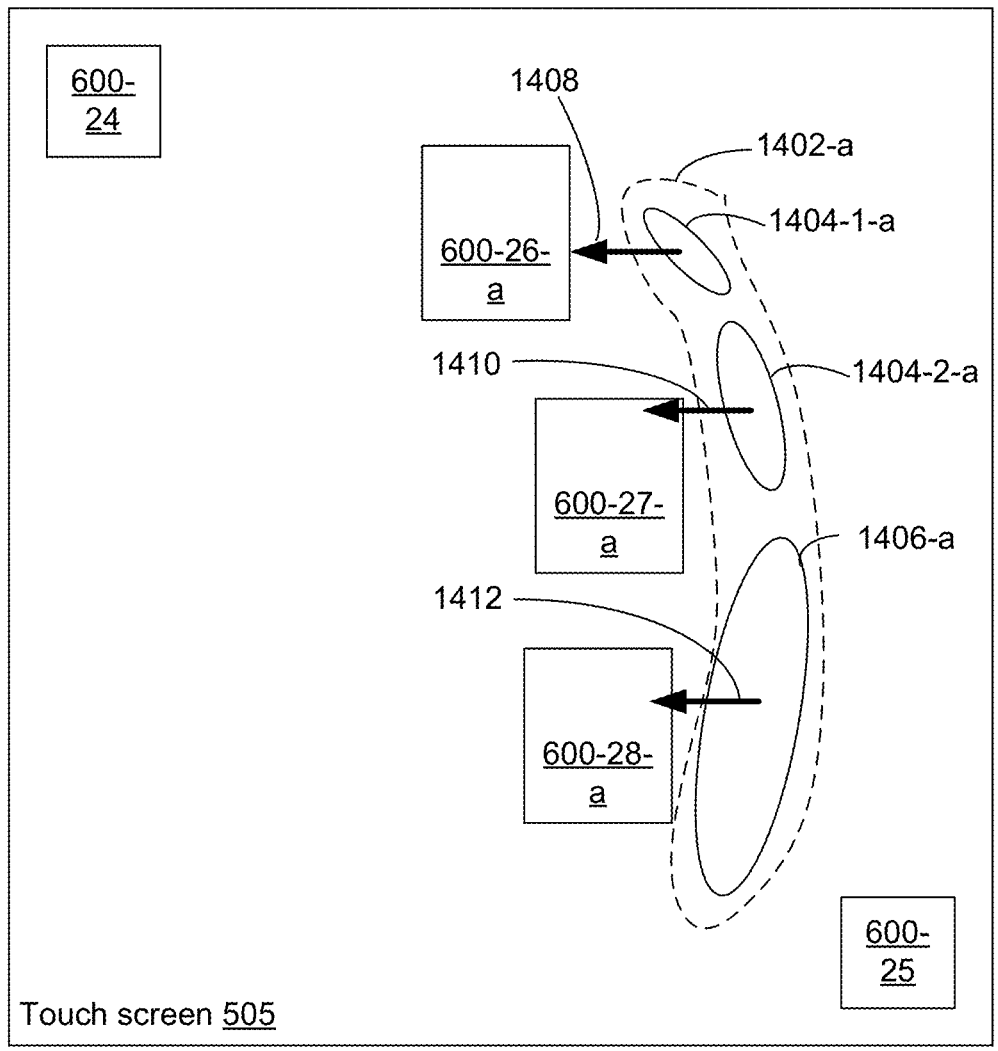
FIGS. 14A-14C illustrate moving on-screen objects in a graphical user interface on a touch screen display in accordance with some embodiments.
Figure 14B:
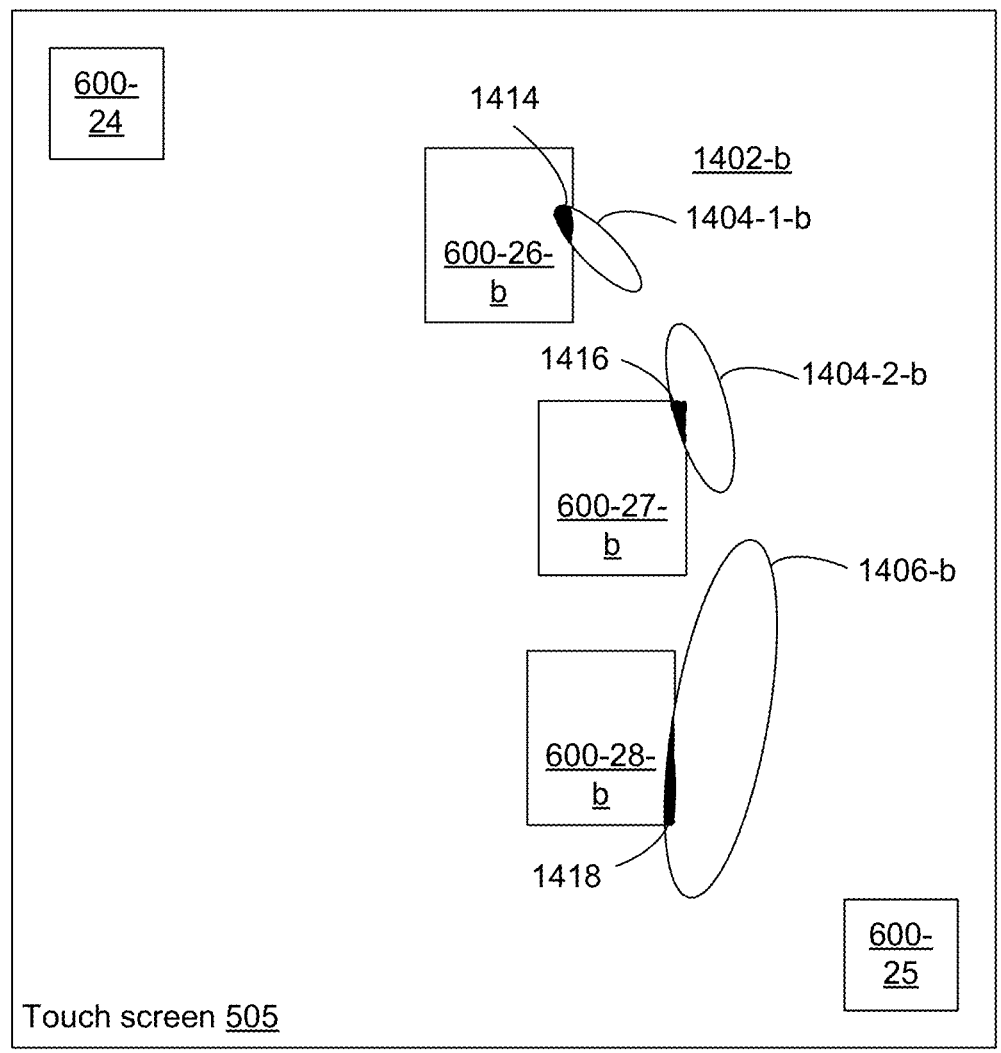
Figure 14C:
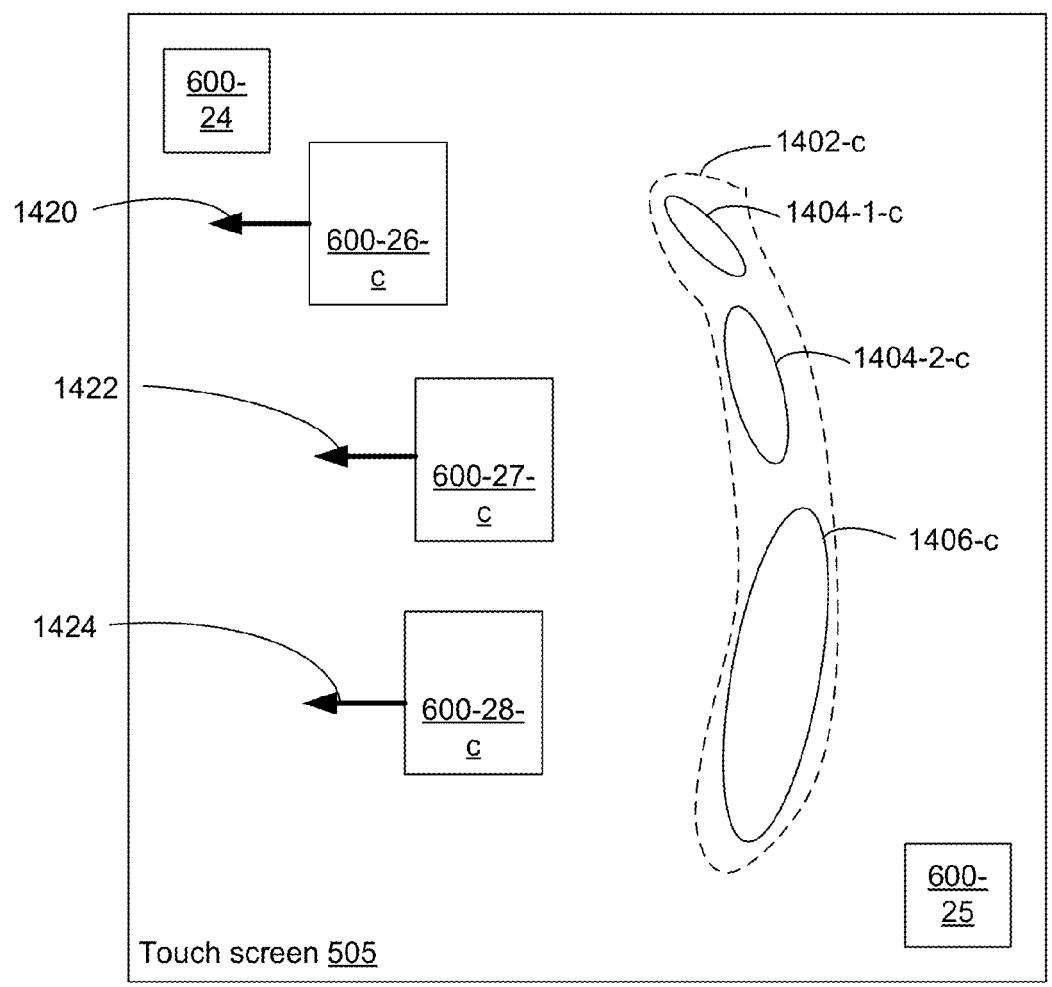

FIGS. 14A-14C illustrate moving on-screen objects in response to intersection (e.g., virtual nudging or bumping) with a touch area that corresponds to a hand edge. The movement may include translation (1420, 1422, and 1424, FIG. 12C) and/or rotation (not shown) of the nudged objects.

Figure 15A:
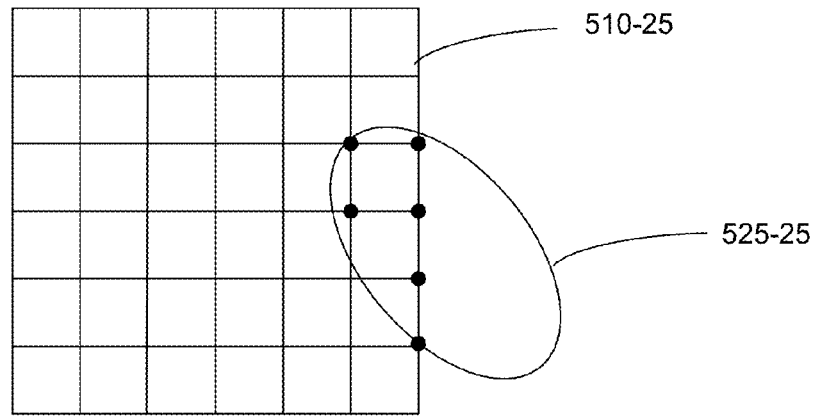
FIGS. 15A-15B illustrate a touch area overlapping with one or more vertices of an on-screen object in accordance with some embodiments.
Figure 15B:
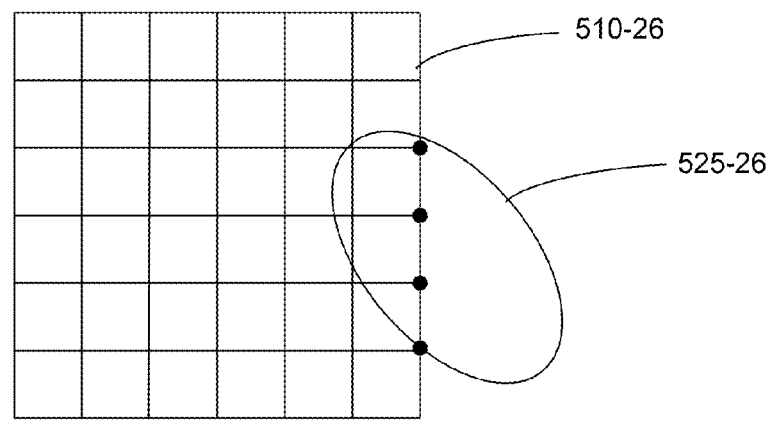
Figure 16A:
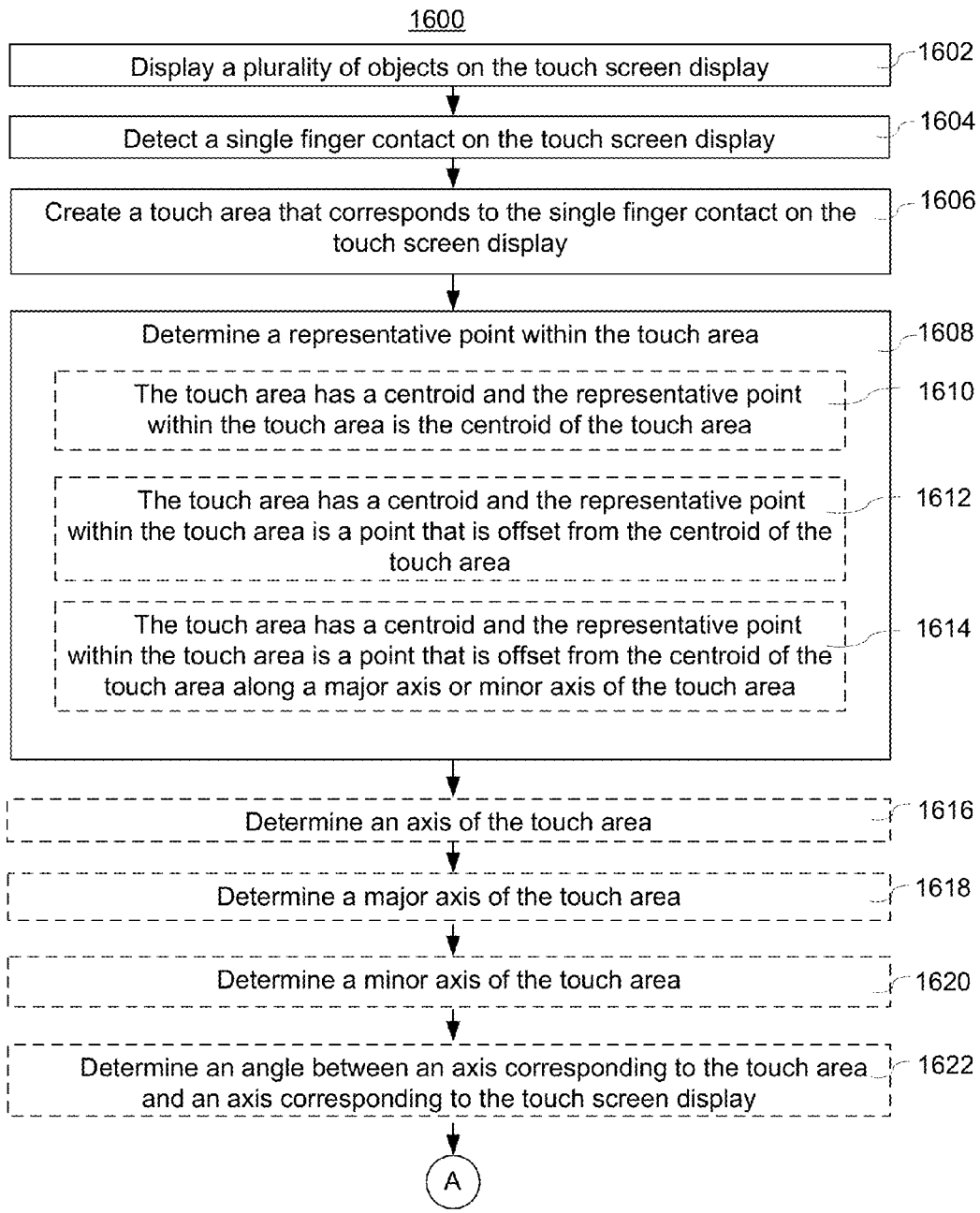
FIGS. 16A-16G are flow diagrams illustrating a method of moving an on-screen object with a single finger in accordance with some embodiments.
Figure 16B:
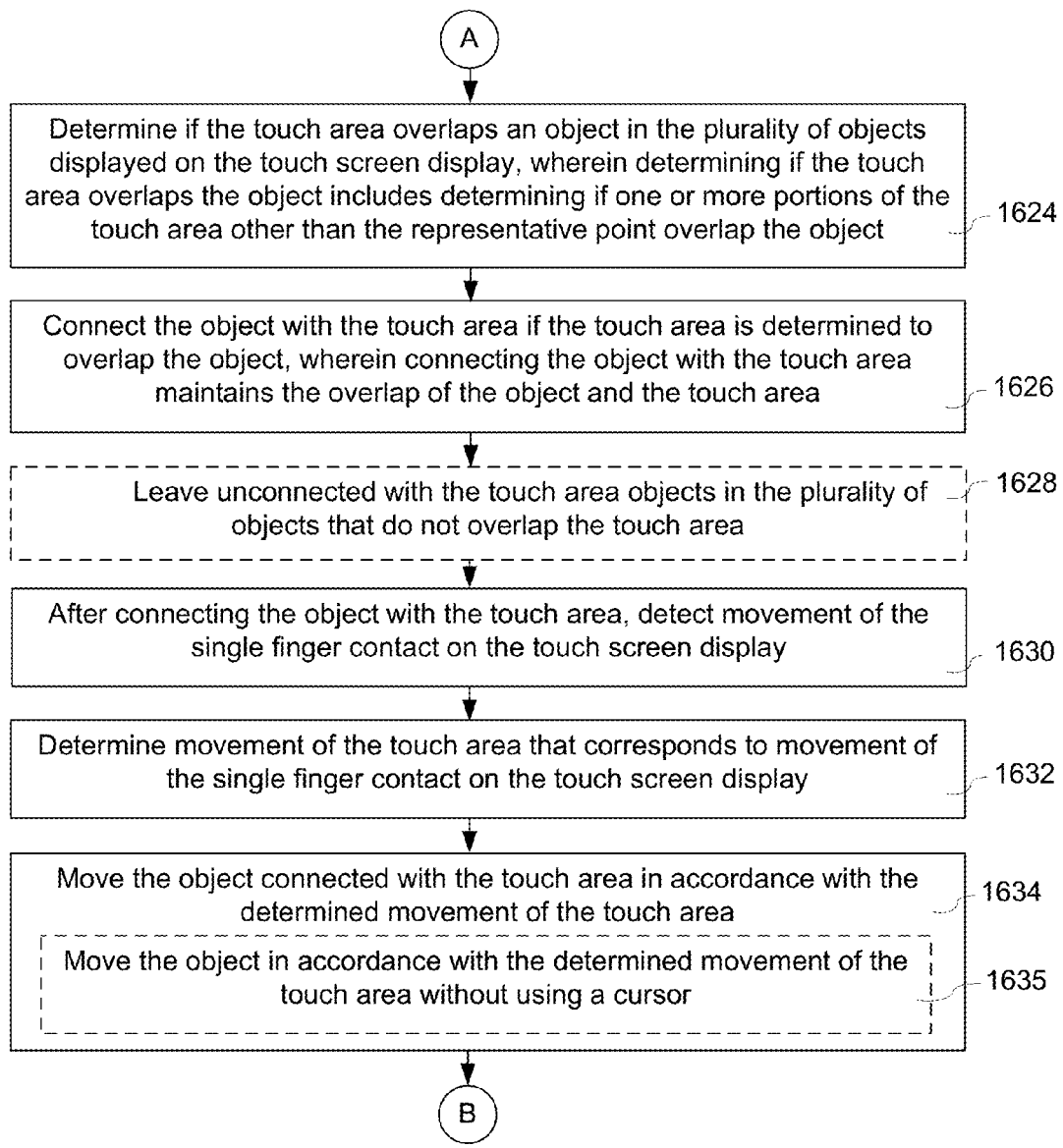
Figure 16C:
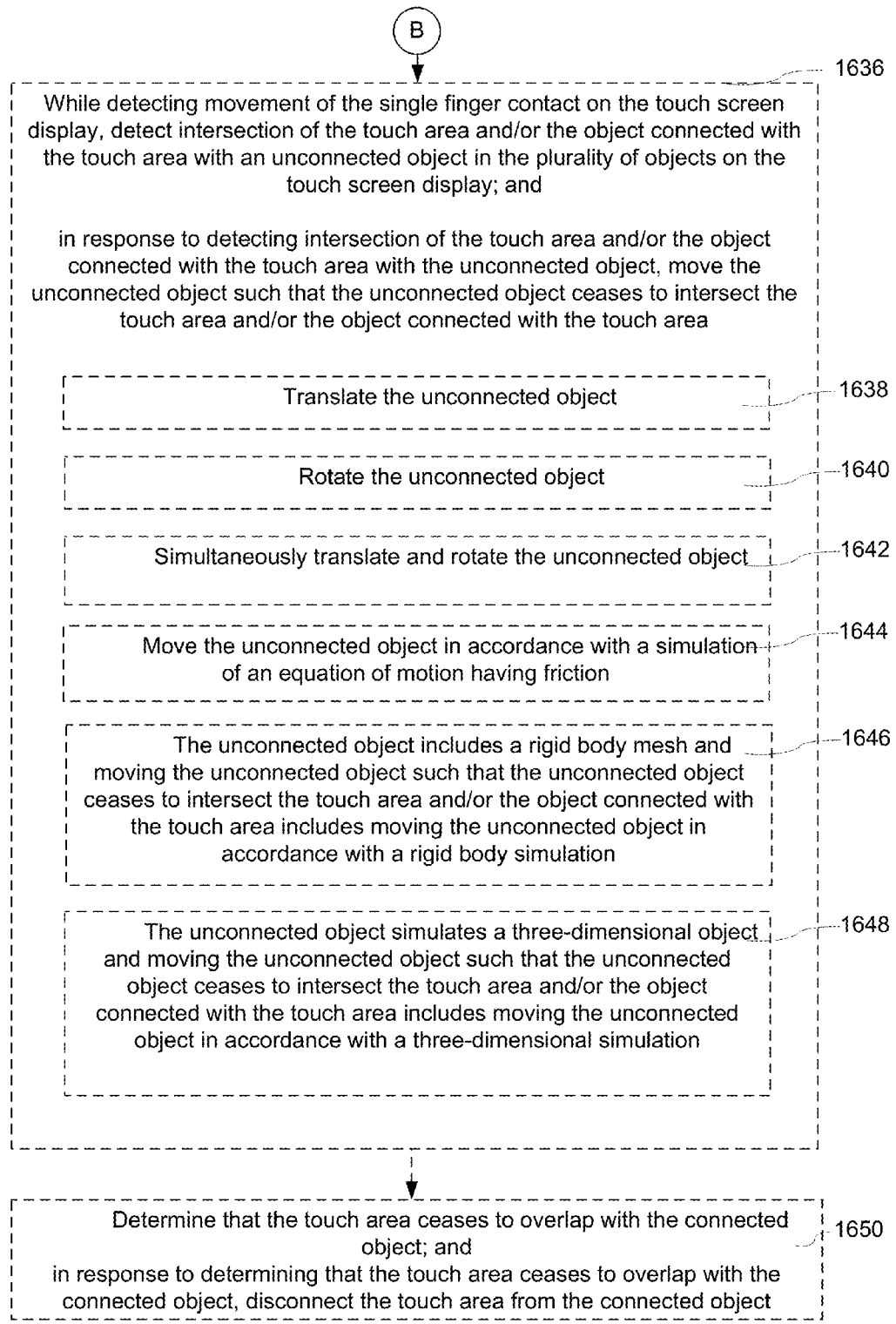
Figure 16D:
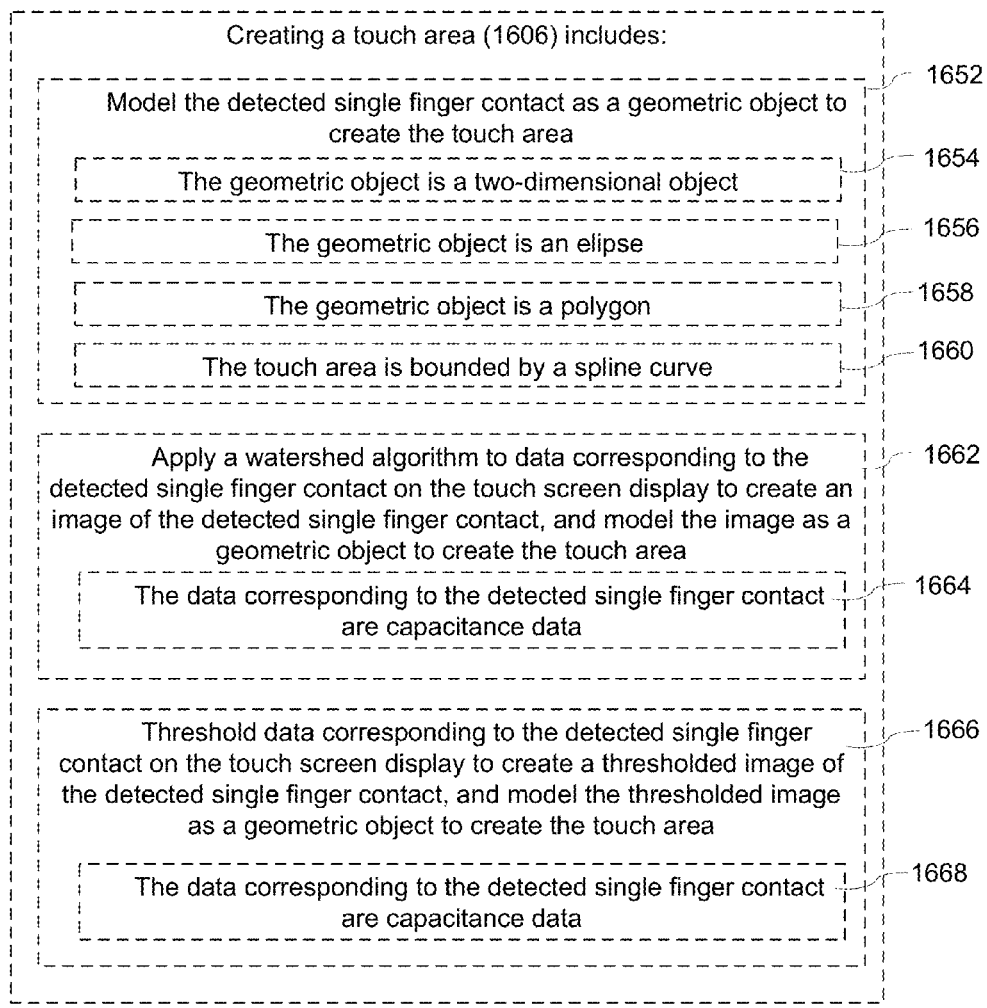
Figure 16E:
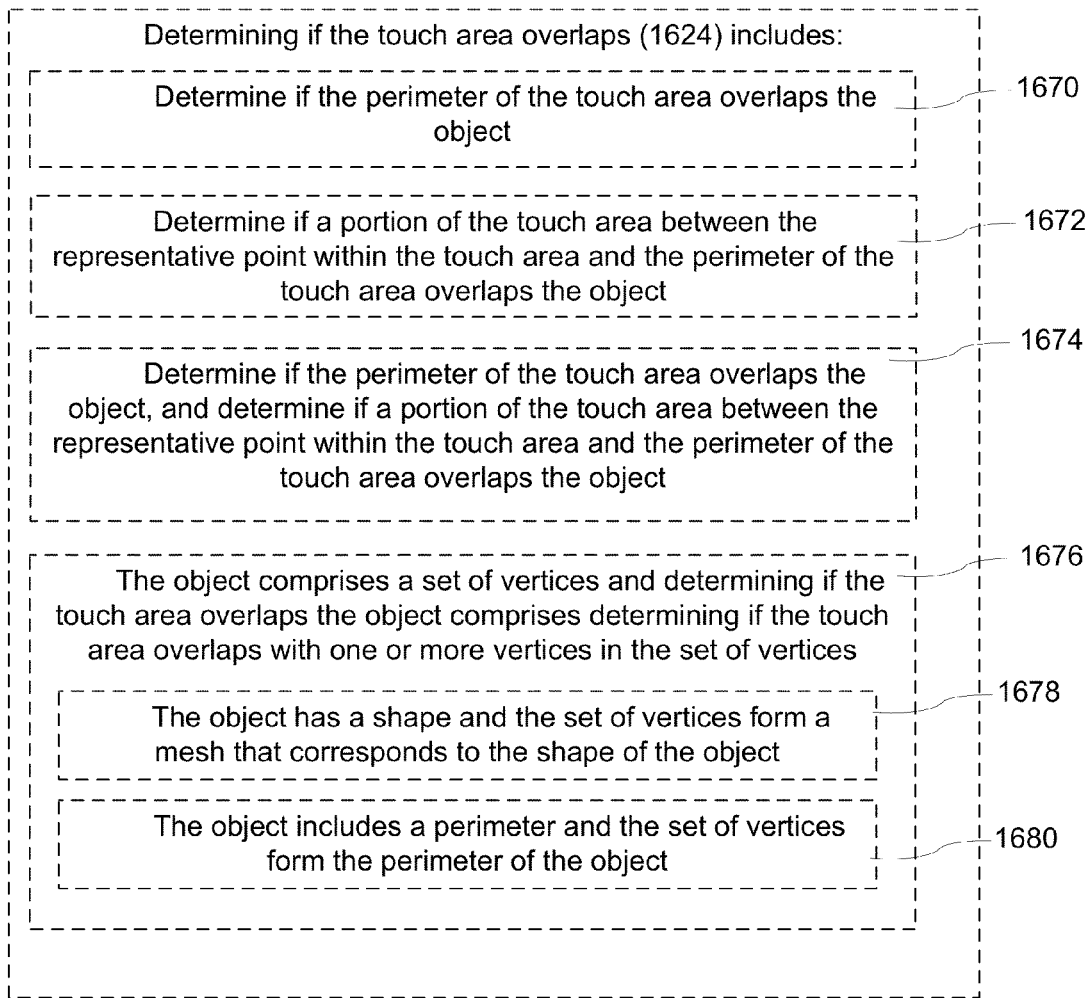
Figure 16F:
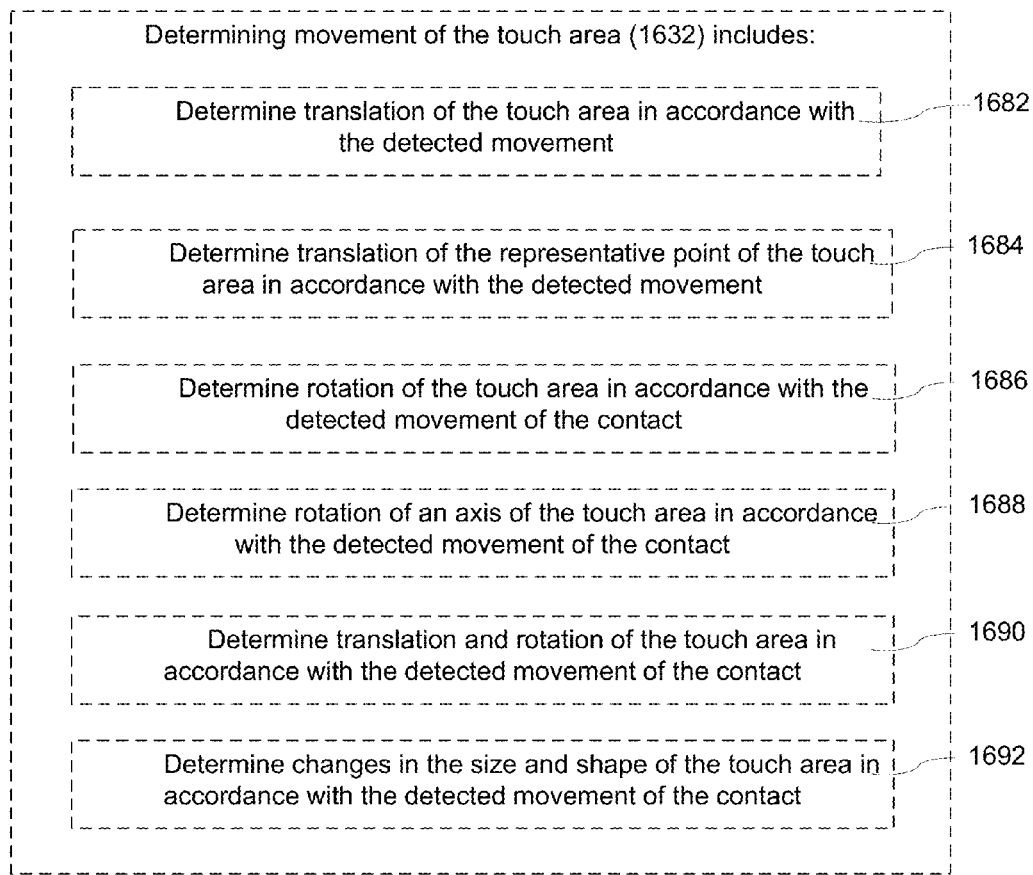
Figure 16G:
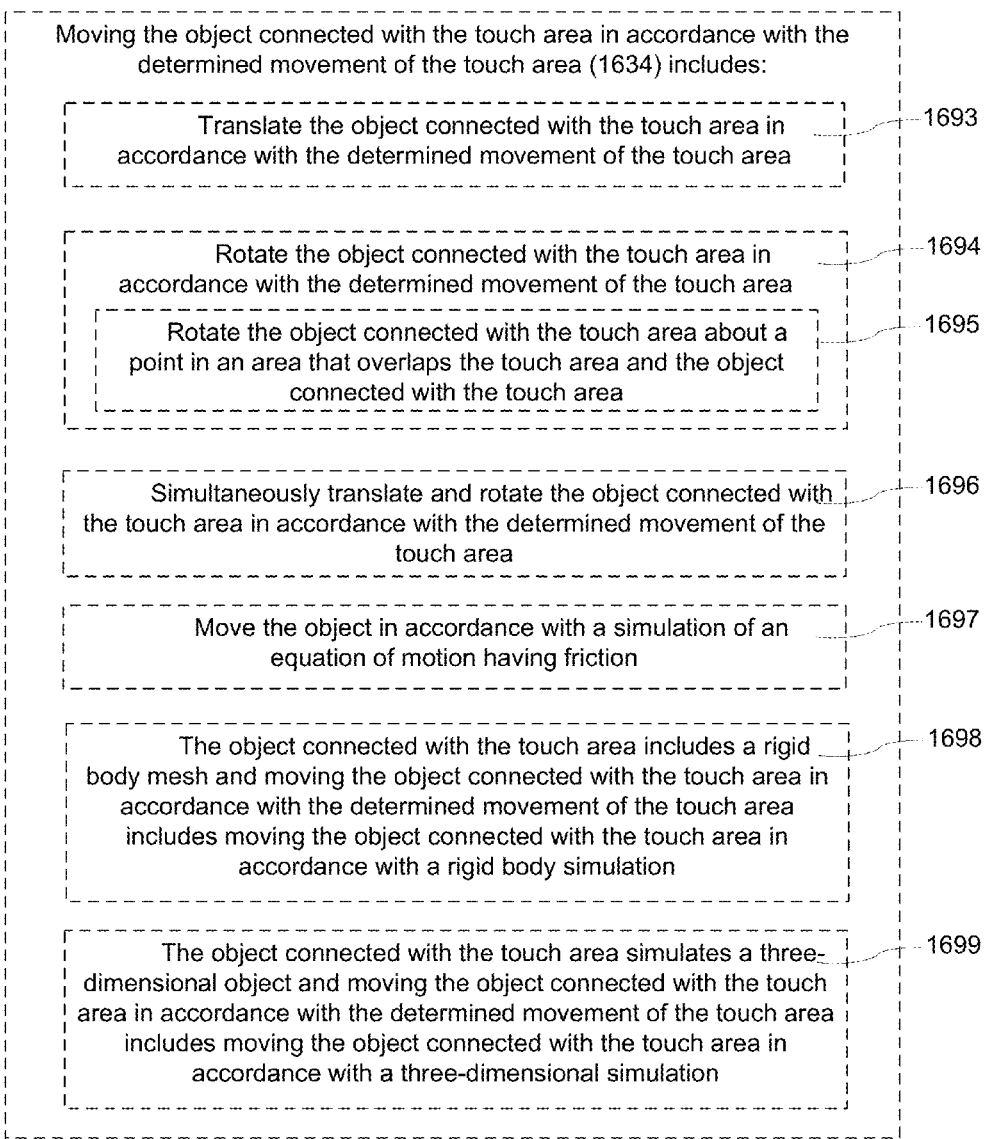

FIGS. 15A-15B illustrate a touch area overlapping with one or more vertices of an on-screen object in accordance with some embodiments. Touch area overlap may determined with vertices on the perimeter of the object (e.g., FIG. 15B) and/or with vertices in the interior of the object (e.g., FIG. 15A).

For ease of illustration, FIGS. 8A-8C, 10A-10C, 11A-11C, 12A-12C, 13A-13D, and 14A-14C show movements in fingers, touch areas, and objects between widely separated positions a and b. In practice, detecting finger contact movements and determining corresponding touch area and on-screen object movements are incremental determinations done in real time. Thus, object(s) connected to a touch area will appear to be attached to the finger contact as the finger moves on the touch screen display (e.g., from position a to position b).

FIGS. 5A-5F, 6A-6F, 7A-7E, 8A-8C, 9A-9B, 10A-10C, 11A-11C, 12A-12C, 13A-13D, 14A-14C, and 15A-15B illustrate exemplary user interfaces for moving on-screen objects in accordance with some embodiments. The user interfaces in these Figures are used to illustrate the processes described below with respect to FIGS. 16A-16G, 17, 18, 19, 20, 21A-21B, and 22.

FIGS. 16A-16G are flow diagrams illustrating a method of moving an on-screen object with a single finger in accordance with some embodiments. The method 1600 is performed at a computing device 300 with a touch screen display. In some embodiments, the method is performed at a portable multifunction device with a touch screen display (e.g., portable multifunction device 100). As described below, the method 1600 provides an intuitive interface for direct finger manipulation of on-screen objects with a single finger, without using a cursor to move the objects.

The device displays (1602) a plurality of objects on the touch screen display. For example, in FIG. 8A, objects 600-2, 600-3, and 510-7 are displayed on touch screen display 505. For ease of explanation, the objects in FIG. 8A (and other similar figures) are shown as simple rectangular on-screen objects. In practice, the objects are typically more complex and may include text, web pages, icons (including soft keys), digital images, videos, animations, and other two-dimensional and simulated three-dimensional objects.

The device detects (1604) a single finger contact on the touch screen display. For example, the device uses contact/motion module 130 (FIG. 1A) to detect finger contact 520-1 on touch screen display 505-1 (FIGS. 5A and 5B).

The device creates (1606, FIG. 16A) a touch area that corresponds to the single finger contact on the touch screen display. The touch area includes a perimeter (e.g., perimeter 550-2, FIG. 5C). For example, the device uses contact/motion module 130 (FIG. 1A) to create a touch area 525-1 that corresponds to single finger contact 520-1 (FIGS. 5A and 5B).

In some embodiments, the device models (1652, FIG. 16D) the detected single finger contact as a geometric object to create the touch area. For example, in FIG. 7A, the device uses contact/motion module 130 (FIG. 1A) to model finger contact 520-2 as touch area 525-8.

In some embodiments, the geometric object is a two-dimensional object (1654), such as the touch areas 525 shown in FIGS. 7A-7E. In some embodiments, the geometric object is an ellipse (1656). For example, in FIGS. 7A, 7D, and 7E, the touch areas 525 are modeled as ellipses. In some embodiments, the geometric object is a polygon (1658). For example, in FIG. 7B, the touch area 525-9 is modeled as a rectangle and in FIG. 7C the touch area 525-10 is modeled as an octagon. In some embodiments, the touch area is bounded by a spline curve (1660).

In some embodiments, the device applies (1662) a watershed algorithm to data corresponding to the detected single finger contact 520 on the touch screen display to create an image of the detected single finger contact, and models the image as a geometric object to create the touch area 525. In some embodiments, the data corresponding to the detected single finger contact are capacitance data (1664), such as capacitance data from a touch screen display that measures projected mutual capacitance data. Like the touch area 525, the image is typically not displayed.

In some embodiments, the device thresholds (1666) data corresponding to the detected single finger contact on the touch screen display to create a thresholded image of the detected single finger contact, and models the thresholded image as a geometric object to create the touch area. In some embodiments, the data corresponding to the detected single finger contact are capacitance data (1668, FIG. 16D), such as capacitance data from a touch screen display that measures projected mutual capacitance data. Like the touch area 525, the thresholded image is typically not displayed.

The device determines (1608, FIG. 16A) a representative point 530 within the touch area. For example, in FIG. 8A, the contact/motion module 130 determines representative point 530-9-*a* when the finger 540-2-*a* makes contact with the touch screen 505 at position a.

In some embodiments, the representative point within the touch area is the centroid of the touch area (1610), e.g., centroid 535 (FIG. 5A). In some embodiments, the representative point within the touch area is a point that is offset from the centroid of the touch area (1612). In some embodiments, the representative point within the touch area is a point that is offset from the centroid of the touch area along a major axis or minor axis of the touch area (1614). For example, in FIG. 7D, the representative point 530-8 within the touch area 525-11 is a point that is offset from the centroid 535-2 of the touch area along a major axis of the touch area ellipse. The representative point 530 may be offset from the centroid to compensate for parallax, persistent errors between desired and actual contact locations, or other finger placement errors.

In some embodiments, the device determines (1616) an axis of the touch area. In some embodiments, the device determines (1618) a major axis 720 of the touch area. In some embodiments, the device (1620) determines a minor axis 715 of the touch area. For example, in FIG. 7E, the contact/motion module 130 determines major axis 720-4 and/or minor axis 715-4 of touch area 525-12. In some embodiments, the device determines (1622) an angle between an axis corresponding to the touch area 525 and an axis corresponding to the touch screen display (e.g., an angle between a major or minor axis of the touch area and a vertical or horizontal axis of the touch screen display). For example, in FIG. 7E, the contact/motion module 130 may determine at least one of: (1) angle 730 between the major axis 720-4 of touch area 525-12 and a horizontal axis 755 of the touch screen display 505; (2) angle 735 between the major axis 720-4 of touch area 525-12 and a vertical axis 750 of the touch screen display 505; (3) angle 740 between the minor axis 715-4 of touch area 525-12 and a vertical axis 750 of the touch screen display 505; and (3) angle 745 between the minor axis 715-4 of touch area 525-12 and a horizontal axis 755 of the touch screen display 505. As explained below, in response to detecting changes in one or more of these angles, the device may make corresponding changes in the rotation of objects connected to the touch area 525.

The device determines (1624, FIG. 16B) if the touch area 525 overlaps an object in the plurality of objects displayed on the touch screen display. Determining if the touch area overlaps the object includes determining if one or more portions of the touch area 525 other than the representative point 530 overlap the object (i.e., determining if one or more portions of the touch area other than the representative point overlap the object is in addition to or in place of a determining if the representative point overlaps the object). This determination detects overlap with an object that would be missed if the overlap determination was just based on overlap between a representative point 530 of the touch area 525 (e.g., the centroid 535) and the object.

As noted above, FIGS. 6A-6C illustrate various degrees of overlap of the touch area 525 with an object displayed on the touch screen display in accordance with some embodiments. In FIG. 6A, there is no overlap between the touch area 525-2 and the object 600-1. In FIG. 6B, there is partial overlap between the touch area 525-3 and object 510-2, but the partial overlap (overlap portion 610-1 of touch area 525-3) does not include the representative point 530-3 of touch area 525-3. In FIG. 6C, there is complete overlap of the touch area 525-4 and the object 510-3.

In some embodiments, determining if the touch area overlaps the object includes determining (1670, FIG. 16E) if the perimeter of the touch area overlaps the object. For example, for the object 510-4 and touch area 525-5 shown in FIG. 6D, the contact/motion module 130 in conjunction with the graphics module 132 would determine that at least some of the bolded portion of perimeter 550-2 overlaps object 510-4.

In some embodiments, determining if the touch area overlaps the object includes determining (1672) if a portion of the touch area between the representative point within the touch area and the perimeter of the touch area overlaps the object. For example, for the object 510-5 and touch area 525-6 shown in FIG. 6E, the contact/motion module 130 in conjunction with the graphics module 132 would determine that at least some of the shaded portion 610-2 of touch area 525-6 overlaps object 510-5.

In some embodiments, determining if the touch area overlaps the object includes determining if the perimeter of the touch area overlaps the object, and determining if a portion of the touch area between the representative point within the touch area and the perimeter of the touch area overlaps the object (1674). For example, for the object 510-6 and touch area 525-7 shown in FIG. 6F, the contact/motion module 130 in conjunction with the graphics module 132 would determine that at least some of the bolded portion of perimeter 550-3 overlaps object 510-6 and at least some of the shaded portion 610-3 of touch area 525-7 overlaps object 510-6.

In some embodiments, the object comprises a set of vertices and determining if the touch area overlaps the object comprises determining (1676) if the touch area overlaps with one or more vertices in the set of vertices. In some embodiments, the object has a shape and the set of vertices form a mesh that corresponds to the shape of the object (1678). For example, in FIG. 15A, object 510-25 has a square shape, a set of vertices form a mesh that corresponds to the square shape, and the contact/motion module 130 in conjunction with the graphics module 132 would determine that touch area 525-25 overlaps with the vertices highlighted by black dots in FIG. 15A. In some embodiments, the object includes a perimeter and the set of vertices form the perimeter of the object (1680, FIG. 16E). For example, in FIG. 15B, object 510-26 has a perimeter, a set of vertices form a perimeter of the object, and the contact/motion module 130 in conjunction with the graphics module 132 would determine that touch area 525-26 overlaps with the vertices highlighted by black dots in FIG. 15B.

The device connects (1626, FIG. 16B) the object with the touch area if the touch area is determined to overlap the object. For example, in FIG. 8A, the contact/motion module 130 in conjunction with the graphics module 132 connect object 510-7 with touch area 525-13 because a portion 610-20 of touch area 525-13-*a* overlaps object 510-7 (even though portion 610-20 does not include the representative point 530-9-*a* of touch area 525-13*a*). Connecting the object with the touch area maintains the overlap of the object and the touch area. As used herein, "connecting the object with the touch area" means coordinating movement of the object and the touch area if the touch area is determined to overlap the object so as to maintain the overlap of the object and the touch area. As used herein, "maintaining the overlap" means maintaining at least some overlap, and does not require maintaining exactly the same overlap. The size and shape of the overlap may change, e.g., because the size and shape of the detected finger contact 520 and the corresponding touch area 525 may change somewhat during finger movement.

In some embodiments, the device leaves unconnected (1628) with the touch area objects in the plurality of objects that do not overlap the touch area. For example, in FIG. 8A, the device leaves objects 600-2 and 600-3 unconnected with touch area 525-13 because objects 6002- and 600-3 do not overlap touch area 525-13 when a finger contact is made at position a.

In some embodiments, creating (1606) the touch area 525, determining (1608) the representative point 530, determining (1624) if the touch area 525 overlaps the object, and connecting (1626) the object with the touch area are all done in response to detecting (1604) the single finger contact on the touch screen display.

After connecting the object with the touch area, the device detects (1630) movement of the single finger contact on the touch screen display. For example, in FIG. 8A, after connecting object 510-7 with touch area 525-13 at position a, the contact/motion module 130 detects movement of the single finger contact on the touch screen display to another position, position b.

The device determines (1632, FIG. 16B)) movement of the touch area that corresponds to movement of the single finger contact on the touch screen display. For example, in FIG. 8A, the contact/motion module 130 determines movement 804 of the touch area from position a (where touch area 525-13 is denoted 525-13-*a*) to position b (where touch area 525-13 is denoted 525-13-*b*), which corresponds to movement of the single finger contact on the touch screen display from position a to position b.

In some embodiments, determining movement of the touch area includes determining (1682, FIG. 16F) translation 804 of the touch area in accordance with the detected movement (e.g., from 525-13-*a* to 525-13-*b* in FIG. 8A).

In some embodiments, determining movement of the touch area includes determining (1684) translation 804 of the representative point of the touch area in accordance with the detected movement (e.g., from 530-9-*a* to 530-9-*b* in FIG. 8A).

In some embodiments, determining movement of the touch area includes determining (1686) rotation 808 of the touch area in accordance with the detected movement of the contact (e.g., from 525-14-*a* to 525-14-*b* in FIG. 8B).

In some embodiments, determining movement of the touch area includes determining (1688) rotation of an axis of the touch area (e.g., major axis 720 or minor axis 715) in accordance with the detected movement of the contact. For example, the contact/motion module 130 may determine rotation of major axis 720 or minor axis 715 relative to an axis of the touch screen by determining a change in angle 730, 735, 740, or 745 (FIG. 7E) in accordance with the detected movement of the contact.

In some embodiments, determining movement of the touch area includes determining (1690) translation and rotation 816 of the touch area in accordance with the detected movement of the contact (e.g., from 525-16-*a* to 525-16-*b* in FIG. 8C).

In some embodiments, determining movement of the touch area includes determining (1692, FIG. 16F) changes in the size and shape of the touch area 525 in accordance with the detected movement of the contact.

The device moves (1634, FIG. 16B) the object connected with the touch area in accordance with the determined movement of the touch area. For example, in conjunction with the contact/motion module 130, the graphics module 132 moves the object connected with the touch area 525 in accordance with the determined movement of the touch area. By using direct finger manipulation, the object is moved in accordance with the determined movement of the touch area without using a cursor (1635).

In some embodiments, moving the object connected with the touch area in accordance with the determined movement of the touch area includes translating (1693, FIG. 16G) the object connected with the touch area in accordance with the determined movement of the touch area. For example, in FIG. 8A, the graphics module 132 moves 806 connected object 510-7 from position a (where object 510-7 is denoted object 510-7-*a*) to position b (where object 510-7 is denoted 510-7-*b*), in accordance with the determined movement 804 of the touch area 525-13 from 525-13-*a* to 525-13-*b*. In FIG. 8A, object 510-7 will appear to be connected to the user's finger 540 during the translation.

In some embodiments, moving the object connected with the touch area in accordance with the determined movement of the touch area includes rotating (1694) the object connected with the touch area in accordance with the determined movement of the touch area. For example, in FIG. 8B, the graphics module 132 rotates 810 connected object 510-8 from position a (where object 510-8 is denoted object 510-8-*a*) to position b (where object 510-8 is denoted 510-8-*b*), in accordance with the determined movement 808 of the touch area 525-14 from 525-14-*a* to 525-14-*b*. In FIG. 8B, object 510-8 will appear to be connected to the user's finger 540 during the rotation.

In some embodiments, rotating the object connected with the touch area in accordance with the determined movement of the touch area includes rotating (1695) the object connected with the touch area about a point in an area that overlaps the touch area and the object connected with the touch area (e.g., about the centroid of the area that overlaps the touch area and the object connected with the touch area).

In some embodiments, moving the object connected with the touch area in accordance with the determined movement of the touch area includes simultaneously translating and rotating (1696) the object connected with the touch area in accordance with the determined movement of the touch area. For example, in FIG. 8C, the graphics module 132 simultaneously translates and rotates 818 connected object 510-10 from position a (where object 510-10 is denoted object 510-10-*a*) to position b (where object 510-10 is denoted 510-10-*b*), in accordance with the determined movement 816 of the touch area 525-16 from 525-16-*a* to 525-16-*b*. In FIG. 8C, object 510-10 will appear to be connected to the user's finger 540 during the simultaneous translation and rotation.

In some embodiments, moving the object connected with the touch area in accordance with the determined movement of the touch area includes moving (1697) the object in accordance with a simulation of an equation of motion having friction. For example, the object may be flung across the touch screen, bounce off a screen edge or another object, and gradually come to rest when the finger contact that corresponds to the touch area breaks contact with the touch screen.

In some embodiments, the object connected with the touch area includes a rigid body mesh (e.g., FIGS. 9A and 9B) and moving the object connected with the touch area in accordance with the determined movement of the touch area includes moving (1698) the object connected with the touch area in accordance with a rigid body simulation (e.g. FIGS. 11A-11C). In some embodiments, the rigidity of the mesh may be adjusted by a user.

In some embodiments, the object connected with the touch area simulates a three-dimensional object and moving the object connected with the touch area in accordance with the determined movement of the touch area includes moving (1699, FIG. 16G) the object connected with the touch area in accordance with a three-dimensional simulation. For example, the graphics module 132 may simulate translation and/or rotation of the three-dimensional object out of the plane of the touch screen display.

In some embodiments, while detecting movement of the single finger contact 520 on the touch screen display, the device detects intersection of the touch area 525 and/or the object 510 connected with the touch area with an unconnected object 600 in the plurality of objects on the touch screen display. In contrast to a "connected" object 510, an "unconnected" object 600 does not at least partially overlap with a touch area 525 that corresponds to a finger contact 520 when the finger initially makes contact with the touch screen display 505. Thus, the movement of an unconnected object 600 is not coordinated with the movement of the touch area 525 so as to maintain overlap of the unconnected object and the touch area. Instead, as described below with respect to FIGS. 12A-12C, an unconnected object 600 moves away from a touch area 525 when the touch area intersects the unconnected object 600. Similarly, as described below with respect to FIGS. 10A-10C and 11A-11C, an unconnected object 600 moves away from a connected object 510 (moving in concert with the touch area 525) when the connected object 510 intersects the unconnected object 600.

In response to detecting intersection of the touch area 525 and/or the object 510 connected with the touch area with the unconnected object 600, the device moves (1636, FIG. 16C) the unconnected object such that the unconnected object ceases to intersect the touch area and/or the object connected with the touch area.

For example, in FIG. 12A, the contact/motion module 130 detects movement 1202 of the single finger contact on the touch screen display. In FIG. 12B, the contact/motion module 130 detects intersection 1204 of touch area 525-19-b with an unconnected object 600-13-b in a plurality of objects (600-13 and 600-15) on the touch screen display 505. In FIG. 12C, in response to detecting the intersection 1204, the graphics module 132 in conjunction with the contact/motion module 130 moves the unconnected object 600-13-c such that the unconnected object ceases to intersect the touch area 525-19-c.

As another example, in FIG. 10A, the contact/motion module 130 detects movement 1002 of the single finger contact on the touch screen display (which results in corresponding movement 1004 of object 510-11, which is connected to touch area 525-17-a). In FIG. 10B, the graphics module 132 in conjunction with the contact/motion module 130 detects intersection 1006 of connected object 510-11-b with an unconnected object 600-10-b in a plurality of objects (600-10 and 600-11) on the touch screen display 505. In FIG. 10C, in response to detecting the intersection 1006, the graphics module 132 in conjunction with the contact/motion module 130 moves the unconnected object 600-10-c such that the unconnected object ceases to intersect the connected object 510-11-c.

In some embodiments, moving the unconnected object 600 such that the unconnected object ceases to intersect the touch area 525 and/or the object 510 connected with the touch area includes translating (1638) the unconnected object. For example, unconnected object 600-13-c is translated 1206 in FIG. 12C and unconnected object 600-10-c is translated 1008 in FIG. 10C.

In some embodiments, moving the unconnected object such that the unconnected object ceases to intersect the touch area and/or the object connected with the touch area includes rotating (1640) the unconnected object. For example, unconnected object 600-10-c is rotated 1010 in FIG. 10C.

In some embodiments, moving the unconnected object such that the unconnected object ceases to intersect the touch area and/or the object connected with the touch area includes simultaneously translating and rotating (1642) the unconnected object. For example, unconnected object 600-10-c is simultaneously translated 1008 and rotated 1010 in FIG. 10C.

In some embodiments, moving the unconnected object such that the unconnected object ceases to intersect the touch area and/or the object connected with the touch area includes moving unconnected the object in accordance with a simulation of an equation of motion having friction (1644). For example, the unconnected object may recoil from the intersection (a virtual collision) like a physical object, move across the touch screen, bounce off a screen edge or another object, and gradually come to rest in response to the intersection 1006.

In some embodiments, the unconnected object includes a rigid body mesh and moving the unconnected object such that the unconnected object ceases to intersect the touch area and/or the object connected with the touch area includes moving the unconnected object in accordance with a rigid body simulation (1646). In some embodiments, the rigidity of the mesh may be adjusted by a user.

For example, in FIGS. 11A-11C, both connected object 1104 and unconnected object 1102 include a rigid body mesh. These meshes are shown in FIGS. 11A-11C, but are typically not directly seen on touch screen display 505. In FIG. 11A, the contact/motion module 130 detects movement 1120 of the single finger contact on the touch screen display (which results in corresponding movement 1122 of object 1104-a, which is connected to touch area 525-18-a). In FIG. 11B, the graphics module 132 in conjunction with the contact/motion module 130 detects intersection of connected object 1104-b with an unconnected object 1102-b in a plurality of objects on the touch screen display 505. As part of a rigid body simulation of the intersection (collision), object 1104-b is momentarily compressed 1126 and object 1102-b is momentarily compressed 1128 in FIG. 11B. In FIG. 11C, in response to detecting the intersection, the graphics module 132 in conjunction with the contact/motion module 130 moves the unconnected object 1102-c such that the unconnected object ceases to intersect the connected object 1104-c. As part of the rigid body simulation, object 1104-c expands 1136 back to its original shape and object 1102-c expands 1134 back to its original shape, as shown in FIG. 11C.

In some embodiments, the unconnected object simulates a three-dimensional object and moving the unconnected object such that the unconnected object ceases to intersect the touch area and/or the object connected with the touch area includes moving the unconnected object in accordance with a three-dimensional simulation (1648). For example, the graphics module 132 may simulate translation and/or rotation of the three-dimensional unconnected object out of the plane of the touch screen display.

In some embodiments, the device determines that the touch area 525 ceases to overlap with the connected object 510. In some embodiments, the touch area ceases to overlap with the connected object because of a decrease in the size of the touch area (e.g., a stationary touch area reduces in size). In some embodiments, the touch area overlap ceases because the corresponding finger contact 520 with the touch screen display ceases, thereby eliminating the touch area. In response to determining that the touch area ceases to overlap with the connected object, the device disconnects (1650) the touch area from the connected object.

Note that details of the processes described above with respect to method 1600 (e.g., FIGS. 16D-16G) are also applicable in an analogous manner to methods 1700, 1800, 1900, 2000, and 2200 described below. For brevity, these details are not repeated below.

Figure 17:
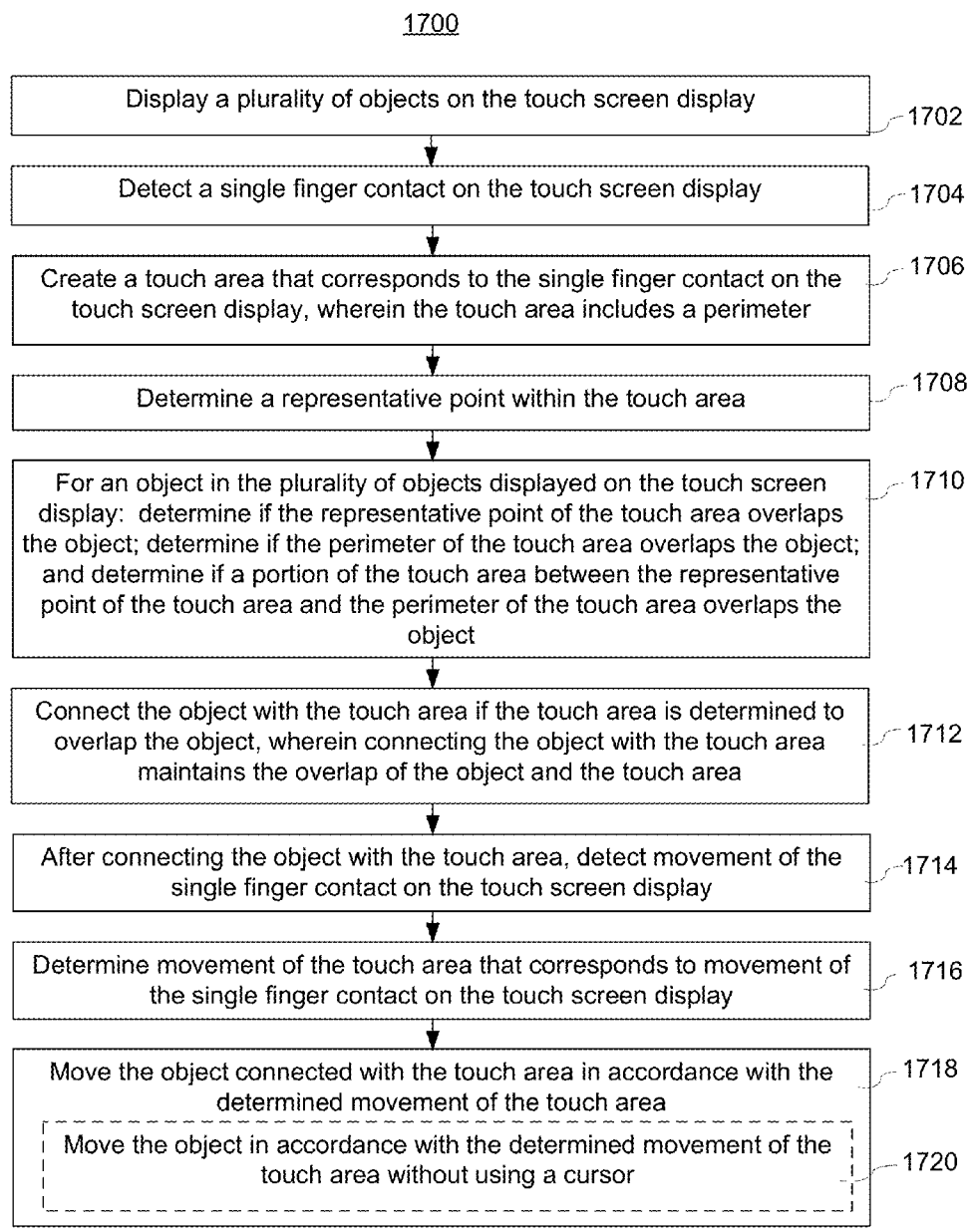
FIG. 17 is a flow diagram illustrating a method of moving an on-screen object with a single finger in accordance with some embodiments.

FIG. 17 is a flow diagram illustrating a method of moving an on-screen object with a single finger in accordance with some embodiments. The method 1700 is performed at a computing device 300 with a touch screen display. In some embodiments, the method is performed at a portable multifunction device with a touch screen display (e.g., portable multifunction device 100). As described below, the method 1700 provides an intuitive interface for direct finger manipulation of on-screen objects with a single finger, without using a cursor to move the objects.

The device displays (1702) a plurality of objects on the touch screen display (e.g., objects 600-2, 600-3, and 510-7, FIG. 8A).

The device detects (1704) a single finger contact on the touch screen display (e.g., contact 520-1, FIGS. 5A and 5B).

The device creates (1706) a touch area that corresponds to the single finger contact on the touch screen display (e.g., touch area 525-1 that corresponds to single finger contact 520-1, FIGS. 5A and 5B). The touch area includes a perimeter (e.g., perimeter 550-2, FIG. 5C).

The device determines (1708) a representative point within the touch area (e.g., point 530-9-a when the finger 540-2-a makes contact with the touch screen 505 at position a, FIG. 8A).

For an object in the plurality of objects displayed on the touch screen display, the device: determines if the representative point 530 of the touch area 525 overlaps the object; determines if the perimeter 550 of the touch area overlaps the object; and determines if a portion 610 of the touch area between the representative point of the touch area and the perimeter of the touch area overlaps the object (1710).

The device connects (1712) the object with the touch area if the touch area is determined to overlap the object (e.g., in FIG. 8A, object 510-7 is connected with touch area 525-13). Connecting the object with the touch area maintains the overlap of the object and the touch area.

In some embodiments, creating (1706) the touch area 525, determining (1708) the representative point 530, determining (1710) if the touch area 525 overlaps the object, and connecting (1712) the object with the touch area are all done in response to detecting (1704) the single finger contact on the touch screen display.

After connecting the object with the touch area, the device detects (1714) movement of the single finger contact on the touch screen display (e.g., from position a to position b in FIG. 8A).

The device determines (1716) movement of the touch area that corresponds to movement of the single finger contact on the touch screen display (e.g., movement 804 of the touch area 525-13 from position a to position b, FIG. 8A).

The device moves (1718) the object connected with the touch area in accordance with the determined movement of the touch area (e.g., move 806 connected object 510-7 from position a to position b, FIG. 8A). By using direct finger manipulation, the object is moved in accordance with the determined movement of the touch area without using a cursor (1720).

Figure 18:
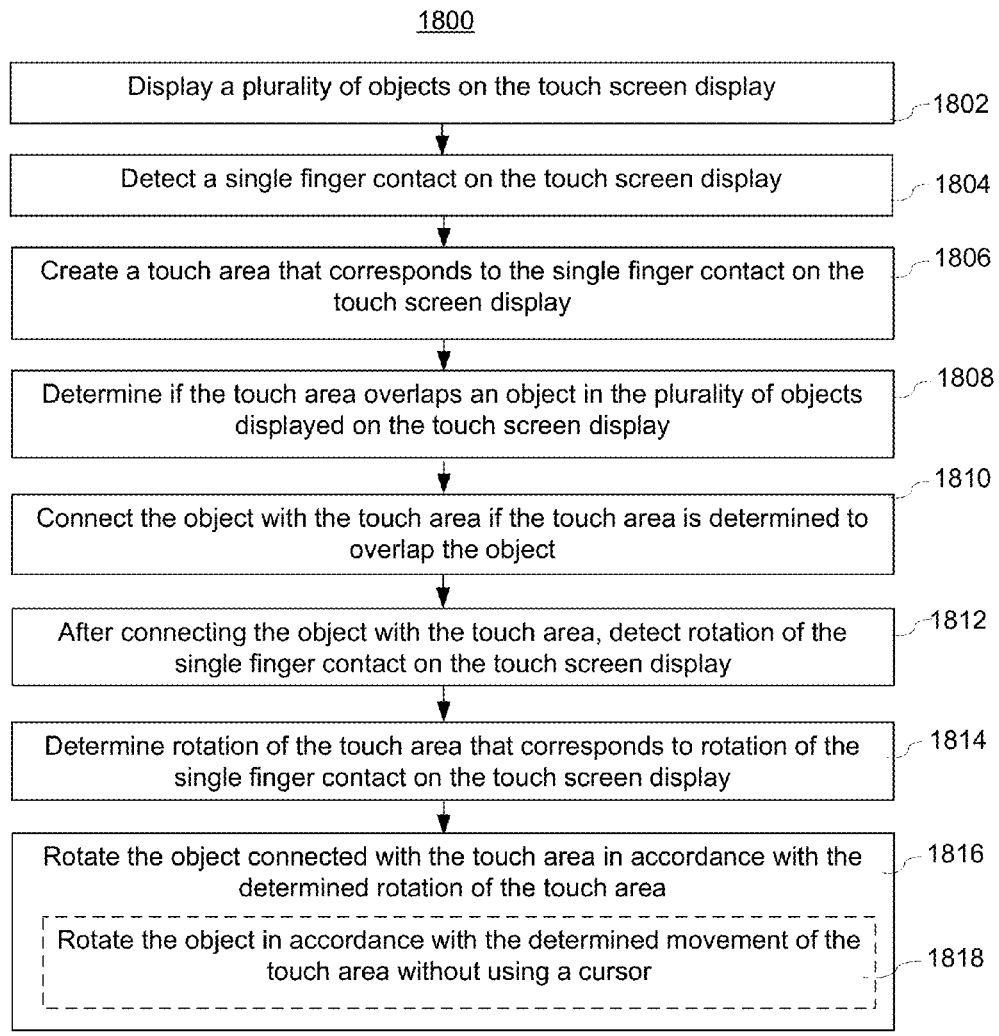
FIG. 18 is a flow diagram illustrating a method of rotating an on-screen object with a single finger in accordance with some embodiments.

FIG. 18 is a flow diagram illustrating a method of rotating an on-screen object with a single finger in accordance with some embodiments. The method 1800 is performed at a computing device 300 with a touch screen display. In some embodiments, the method is performed at a portable multifunction device with a touch screen display (e.g., portable multifunction device 100). As described below, the method 1800 provides an intuitive interface for rotating on-screen objects with a single finger, without using a cursor to rotate the objects.

The device displays (1802) a plurality of objects on the touch screen display (e.g., objects 600-2, 600-3, and 510-8, FIG. 8B).

The device detects (1804) a single finger contact on the touch screen display (e.g., contact 520-1, FIGS. 5A and 5B).

The device creates (1806) a touch area that corresponds to the single finger contact on the touch screen display (e.g., touch area 525-1 that corresponds to single finger contact 520-1, FIGS. 5A and 5B).

The device determines (1808) if the touch area (e.g., touch area 525-14-a, FIG. 8B) overlaps an object (e.g., object 510-8-a, FIG. 8B) in the plurality of objects displayed on the touch screen display.

The device connects (1810) the object with the touch area if the touch area is determined to overlap the object (e.g., in FIG. 8B, object 510-8 is connected with touch area 525-14).

In some embodiments, creating (1806) the touch area 525, determining (1808) if the touch area 525 overlaps the object, and connecting (1810) the object with the touch area are all done in response to detecting (1804) the single finger contact on the touch screen display.

After connecting the object with the touch area, the device detects (1812) rotation of the single finger contact on the touch screen display (e.g., from position a to position b in FIG. 8B).

The device determines (1814) rotation of the touch area that corresponds to rotation of the single finger contact on the touch screen display (e.g., rotation 808 of the touch area 525-14 from position a to position b, FIG. 8B).

The device rotates (1816) the object connected with the touch area in accordance with the determined rotation of the touch area (e.g., rotate 810 connected object 510-8 from position a to position b, FIG. 8B). By using direct finger manipulation, the object is rotated in accordance with the determined movement of the touch area without using a cursor (1818).

Figure 19:
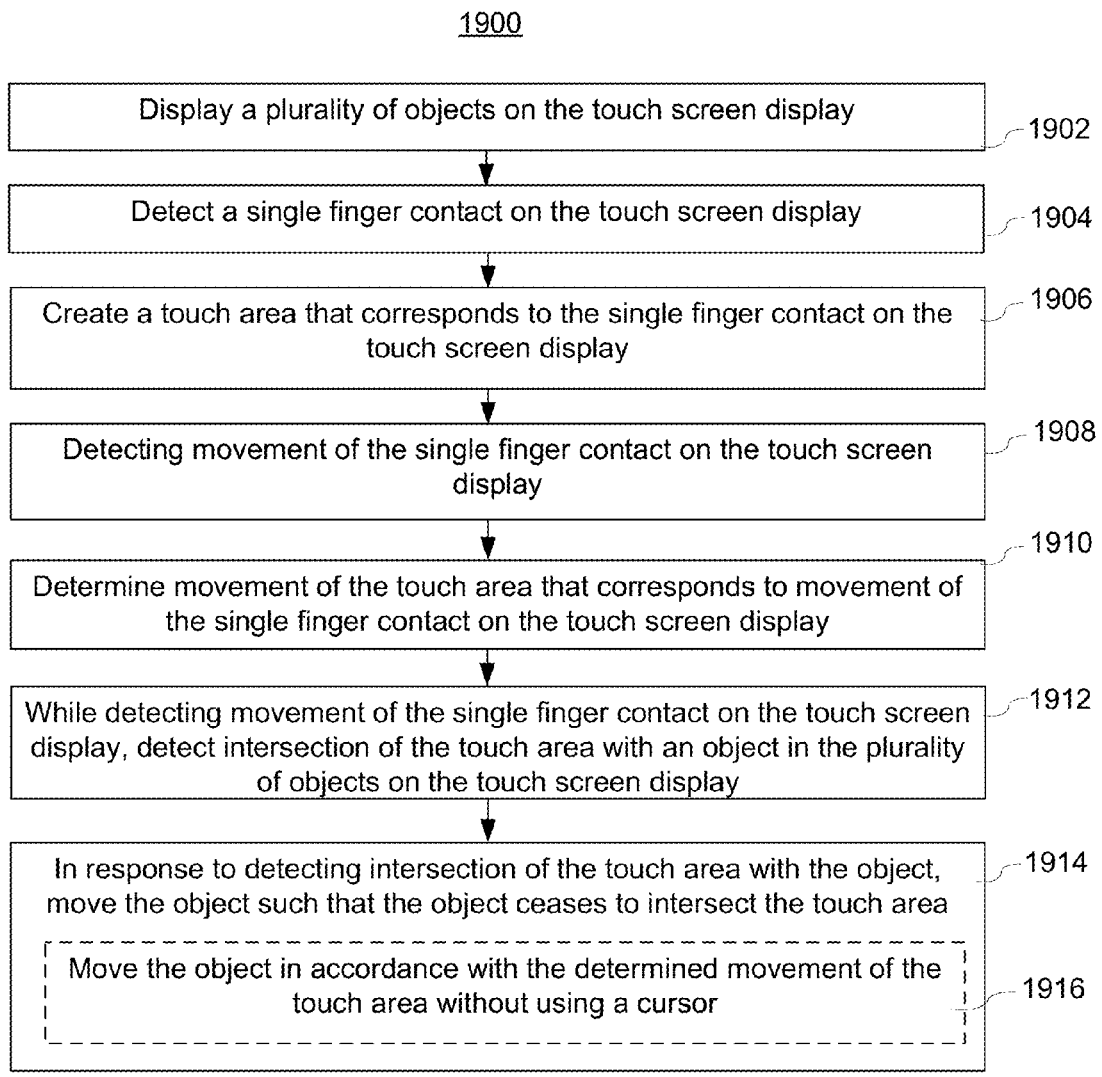
FIG. 19 is a flow diagram illustrating a method of moving an on-screen object with a single finger in accordance with some embodiments.

FIG. 19 is a flow diagram illustrating a method of moving an on-screen object with a single finger in accordance with some embodiments. The method 1900 is performed at a computing device 300 with a touch screen display. In some embodiments, the method is performed at a portable multifunction device with a touch screen display (e.g., portable multifunction device 100). As described below, the method 1900 provides an intuitive interface for nudging and otherwise moving on-screen objects with a single finger via direct finger manipulation, without using a cursor to move the objects.

The device displays (1902) a plurality of objects on the touch screen display (e.g., objects 600-13 and 600-15, FIG. 12A).

The device detects (1904) a single finger contact on the touch screen display (e.g., contact 520-1, FIGS. 5A and 5B).

The device creates (1906) a touch area that corresponds to the single finger contact on the touch screen display (e.g., touch area 525-1 that corresponds to single finger contact 520-1, FIGS. 5A and 5B). In some embodiments, creating (1906) the touch area 525 is done in response to detecting (1706) the single finger contact on the touch screen display.

The device detects (1908) movement of the single finger contact on the touch screen display (e.g., from position a in FIG. 12A to position b in FIG. 12B).

The device determines (1910) movement 1202 (FIG. 12A) of the touch area that corresponds to movement of the single finger contact on the touch screen display.

While detecting movement of the single finger contact on the touch screen display, the device detects (1912) intersection 1204 (FIG. 12B) of the touch area (e.g., touch area 525-19-b, FIG. 12B) with an object (e.g., object 600-13-b, FIG. 12B) in the plurality of objects on the touch screen display.

In response to detecting intersection of the touch area with the object, the device moves (1914) the object such that the object ceases to intersect the touch area. For example, in response to detecting intersection 1204 (FIG. 12B) of the touch area 525-19-b with the object 600-13-b, the device moves (1206) the object such that the object 600-13-c ceases to intersect the touch area 525-19-c (FIG. 12C). By using direct finger manipulation, the object is moved without using a cursor (1916).

Figure 20:
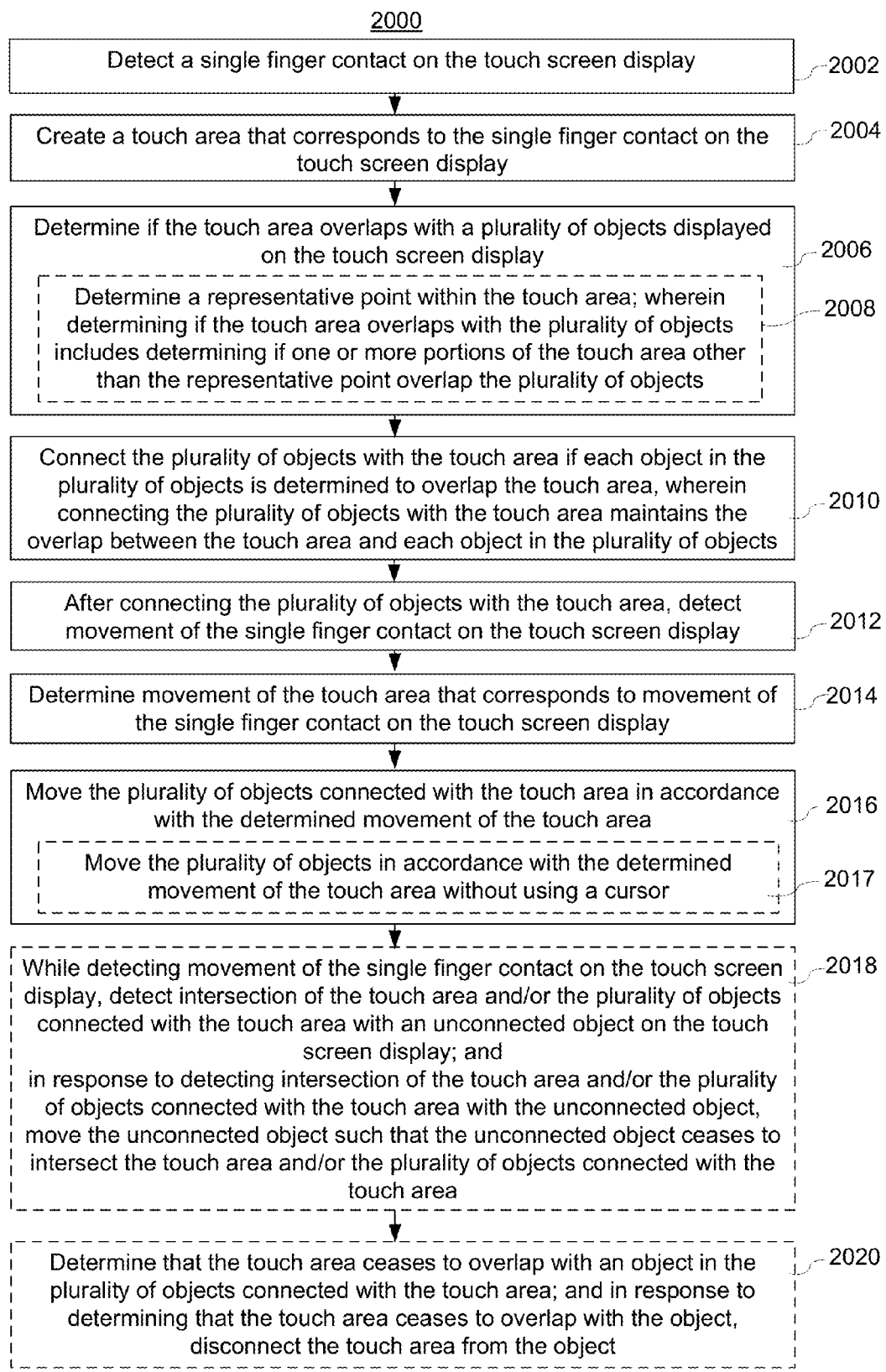
FIG. 20 is a flow diagram illustrating a method of moving a plurality of on-screen objects with a single finger in accordance with some embodiments.

FIG. 20 is a flow diagram illustrating a method of moving a plurality of on-screen objects with a single finger in accordance with some embodiments. The method 2000 is performed at a computing device 300 with a touch screen display. In some embodiments, the method is performed at a portable multifunction device with a touch screen display (e.g., portable multifunction device 100). As described below, the method 2000 provides an intuitive interface for direct finger manipulation of multiple on-screen objects with a single finger, without using a cursor to move the objects.

The device detects (2002) a single finger contact on the touch screen display (e.g., contact 520-1, FIGS. 5A and 5B).

The device creates (2004) a touch area that corresponds to the single finger contact on the touch screen display (e.g., touch area 525-1 that corresponds to single finger contact 520-1, FIGS. 5A and 5B). The touch area includes a perimeter (e.g., perimeter 550-2, FIG. 5C).

The device determines (2006) if the touch area (e.g., touch area 525-20-a, FIG. 13A; touch area 525-21-a, FIG. 13B; or touch area 525-22-a, FIG. 13C) overlaps with a plurality of objects (e.g., objects 510-15-a and 510-16-a, FIG. 13A; objects 510-17-a and 510-18-a, FIG. 13B; or objects 510-19-a and 510-20-a, FIG. 13C, respectively) displayed on the touch screen display.

In some embodiments, the device determines a representative point (e.g., point 530-21, FIG. 13A; point 530-22, FIG. 13B; or point 530-23, FIG. 13C, respectively) within the touch area and determines (2008) if one or more portions of the touch area other than the representative point overlap the plurality of objects.

The device connects (2010) the plurality of objects with the touch area if each object in the plurality of objects is determined to overlap the touch area (e.g., in FIG. 13A, objects 510-15 and 510-16 are connected with touch area 525-20; in FIG. 13B, objects 510-17 and 510-18 are connected with touch area 525-21; and, in FIG. 13C, objects 510-19 and 510-20 are connected with touch area 525-22, respectively). Connecting the plurality of objects with the touch area maintains the overlap between the touch area and each object in the plurality of objects.

In some embodiments, creating (2004) the touch area 525, determining (2008) the representative point 530, determining (2006) if the touch area 525 overlaps the plurality of objects, and connecting (1626) the objects with the touch area are all done in response to detecting (2002) the single finger contact on the touch screen display.

After connecting the plurality of objects with the touch area, the device detects (2012) movement of the single finger contact on the touch screen display (e.g., from position a to position b in FIG. 13A; from position a to position b in FIG. 13B; or from position a to position b in FIG. 13C).

The device determines (2014) movement of the touch area that corresponds to movement of the single finger contact on the touch screen display (e.g., movement 1302 of the touch area 525-20 from position a to position b, FIG. 13A; movement 1306 of the touch area 525-21 from position a to position b, FIG. 13B; or movement 1310 of the touch area 525-22 from position a to position b, FIG. 13C, respectively).

The device moves (2016) the plurality of objects connected with the touch area in accordance with the determined movement of the touch area (e.g., translate 1304 connected objects 510-15 and 510-16 from position a to position b, FIG. 13A; rotate 1308 connected objects 510-17 and 510-18 from position a to position b, FIG. 13B; or simultaneously translate and rotate 1312 connected objects 510-19 and 510-20 from position a to position b, FIG. 13C, respectively). By using direct finger manipulation, the plurality of objects are moved in accordance with the determined movement of the touch area without using a cursor (2017).

In some embodiments, while detecting movement of the single finger contact on the touch screen display, the device detects intersection of the touch area and/or the plurality of objects connected with the touch area with an unconnected object on the touch screen display. In response to detecting intersection of the touch area and/or the plurality of objects connected with the touch area with the unconnected object, the device moves (2018) the unconnected object such that the unconnected object ceases to intersect the touch area and/or the plurality of objects connected with the touch area.

In some embodiments, the device determines that the touch area ceases to overlap with an object in the plurality of objects connected with the touch area. In response to determining that the touch area ceases to overlap with the object, the device disconnects (2020) the touch area from the object.

Figure 21A:
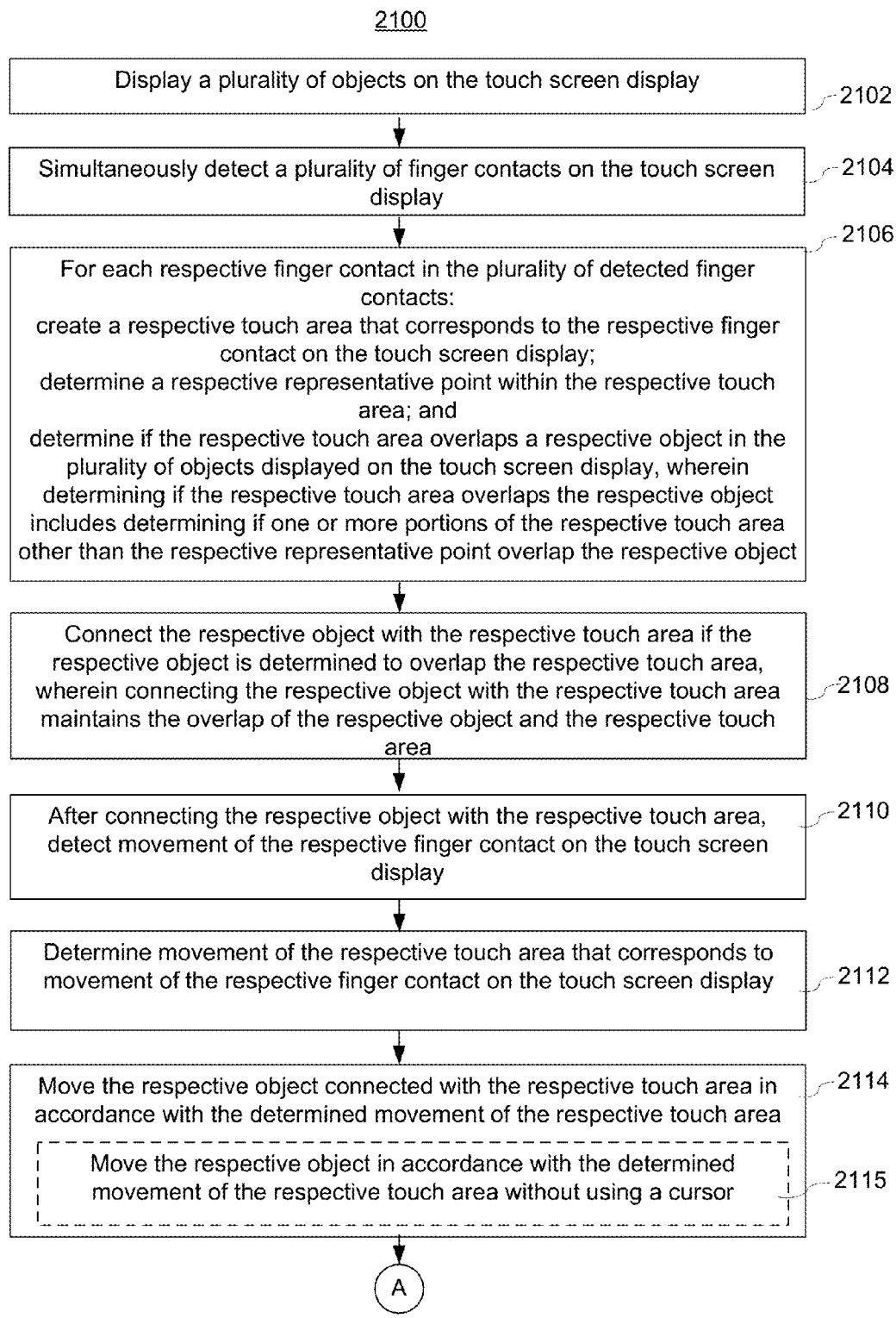
FIGS. 21A-21B are flow diagrams illustrating a method of simultaneously moving multiple on-screen objects with multiple fingers in accordance with some embodiments.
Figure 21B:
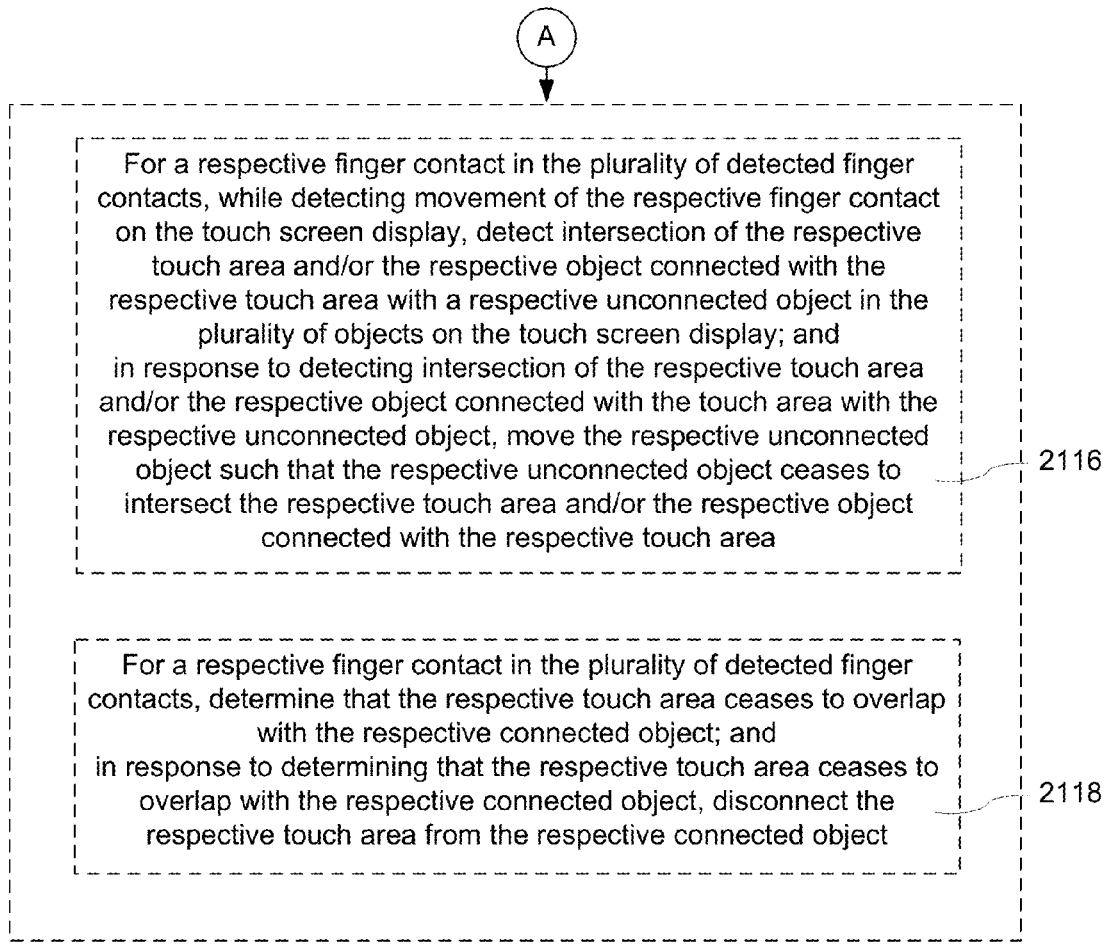

FIGS. 21A-21B are flow diagrams illustrating a method of simultaneously moving multiple on-screen objects with multiple fingers in accordance with some embodiments. The method 2100 is performed at a computing device 300 with a touch screen display. In some embodiments, the method is performed at a portable multifunction device with a touch screen display (e.g., portable multifunction device 100). As described below, the method 2100 provides an intuitive interface for direct finger manipulation of multiple on-screen objects with multiple fingers, without using a cursor to move the objects.

The device displays (2102) a plurality of objects on the touch screen display (e.g., objects 510-21, 510-22, 600-20 and 600-21, FIG. 13D).

The device simultaneously detects (2104) a plurality of finger contacts on the touch screen display (e.g., contacts by fingers 540-10-a and 540-11-a in FIG. 13D, with each contact analogous to contact 520-1 in FIGS. 5A and 5B).

For each respective finger contact in the plurality of detected finger contacts, the device: creates a respective touch area that corresponds to the respective finger contact on the touch screen display (e.g., touch area 525-23-a for the contact by finger 540-10-a and touch area 525-24-a for the contact by finger 540-11-a in FIG. 13D), wherein the respective touch area includes a perimeter; determines a respective representative point within the respective touch area (e.g., point 530-24 in touch area 525-23-a and point 530-25 in touch area 525-24-a in FIG. 13D); and determines if the respective touch area overlaps a respective object in the plurality of objects displayed on the touch screen display (2106). Determining if the respective touch area overlaps the respective object includes determining if one or more portions of the respective touch area other than the respective representative point (e.g., points 530-24 and 530-25) overlap the respective object.

The device connects (2108) the respective object with the respective touch area if the respective object is determined to overlap the respective touch area (e.g., in FIG. 13D, object 510-22 is connected with touch area 525-23 and object 510-21 is connected with touch area 525-24). Connecting the respective object with the respective touch area maintains the overlap of the respective object and the respective touch area.

In some embodiments, creating (2106) a respective touch area 525, determining a respective representative point 530, determining if the touch area 525 overlaps a respective object, and connecting (2108) the respective object with the respective touch area are all done in response to detecting (2104) the respective finger contact on the touch screen display.

After connecting the respective object with the respective touch area, the device detects (2110) movement of the respective finger contact on the touch screen display (e.g., from respective position a to respective position b in FIG. 13D).

The device determines (2112) movement of the respective touch area that corresponds to movement of the respective finger contact on the touch screen display (e.g., movement 1314 of the touch area 525-24 from position a to position b, FIG. 13D, and movement 1316 of the touch area 525-23 from position a to position b, FIG. 13D).

The device moves (2114) the respective object connected with the respective touch area in accordance with the determined movement of the respective touch area (e.g., simultaneously translate and rotate 1318 connected object 510-21 from position a to position b, FIG. 13D and simultaneously translate and rotate 1320 connected object 510-22 from position a to position b, FIG. 13D). By using direct finger manipulation, the respective object is moved in accordance with the determined movement of the respective touch area without using a cursor (2115).

In some embodiments, for a respective finger contact in the plurality of detected finger contacts: while detecting movement of the respective finger contact on the touch screen display, the device detects intersection of the respective touch area and/or the respective object connected with the respective touch area with a respective unconnected object in the plurality of objects on the touch screen display. In response to detecting intersection of the respective touch area and/or the respective object connected with the touch area with the respective unconnected object, the device moves (2116) the respective unconnected object such that the respective unconnected object ceases to intersect the respective touch area and/or the respective object connected with the respective touch area.

In some embodiments, for a respective finger contact in the plurality of detected finger contacts: the device determines that the respective touch area ceases to overlap with the respective connected object. In response to determining that the respective touch area ceases to overlap with the respective connected object, the device disconnects (2118) the respective touch area from the respective connected object.

Figure 22:
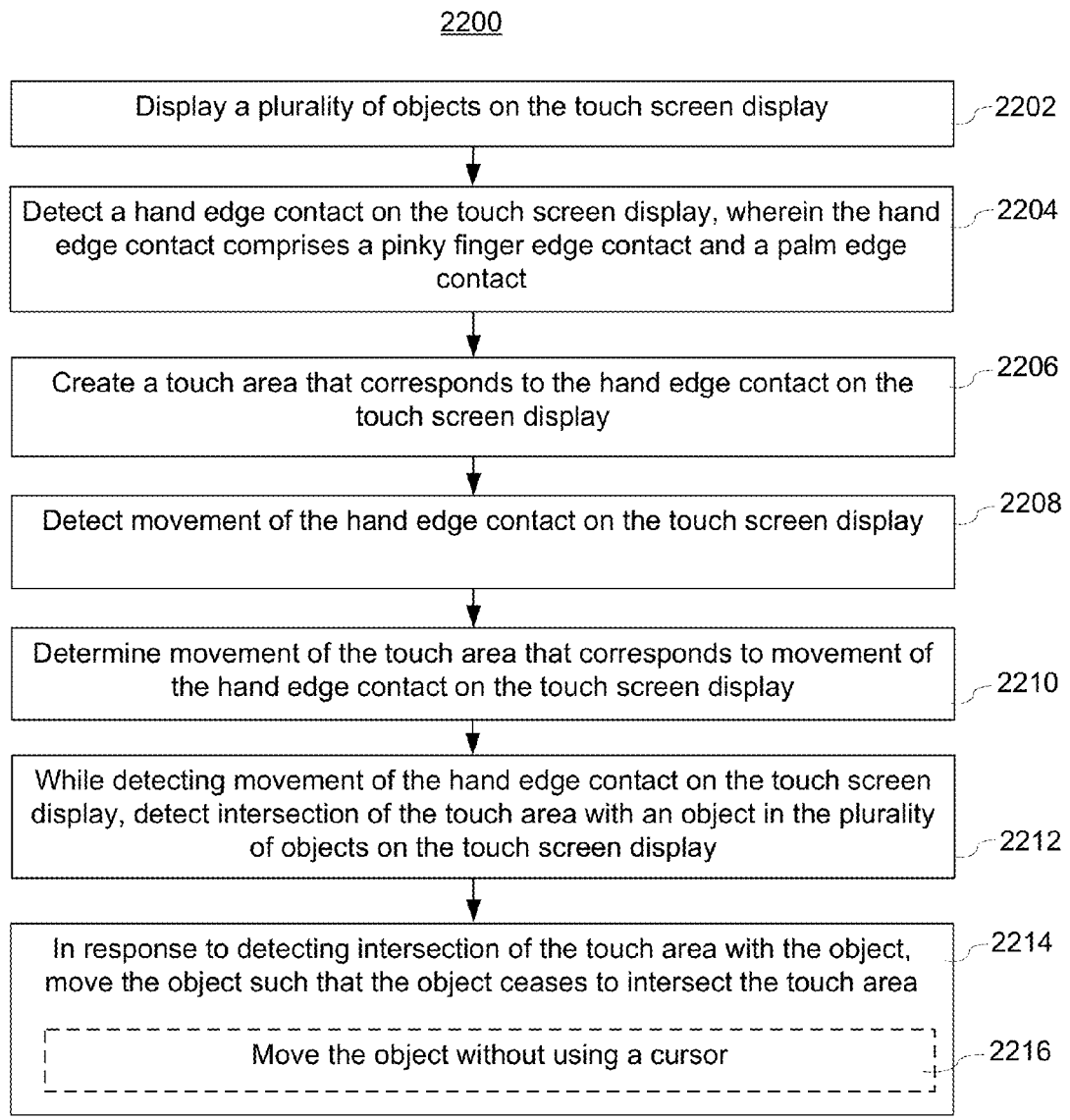
FIG. 22 is a flow diagram illustrating a method of moving an object with a hand edge contact in accordance with some embodiments.

FIG. 22 is a flow diagram illustrating a method of moving an object with a hand edge contact in accordance with some embodiments. The method 2200 is performed at a computing device 300 with a touch screen display. In some embodiments, the method is performed at a portable multifunction device with a touch screen display (e.g., portable multifunction device 100). As described below, the method 2200 provides an intuitive interface for direct manipulation of on-screen objects with a hand edge, without using a cursor to move the object.

The device displays (2202) a plurality of objects on the touch screen display (e.g., objects 600-24-600-28, FIG. 14A).

The device detects (2204) a hand edge contact on the touch screen display. The hand edge contact comprises a pinky finger edge contact and a palm edge contact.

The device creates (2206) a touch area that corresponds to the hand edge contact on the touch screen display. For example, in FIG. 14A, touch area 1402-*a* includes touch area 1404-1-*a* that corresponds to a first portion of the pinky finger edge contact, touch area 1404-2-*a* that corresponds to a second portion of the pinky finger edge contact, and touch area 1406-*a* that corresponds to the palm edge contact. In some embodiments, creating (2206) the touch area 1402 is done in response to detecting (2204) the hand edge contact on the touch screen display.

The device detects (2208) movement of the hand edge contact on the touch screen display.

The device determines (2210) movement of the touch area that corresponds to movement of the hand edge contact on the touch screen display (e.g., movements 1408, 1410, and 1412 of the component touch areas in touch area 1402, FIG. 14A).

While detecting movement of the hand edge contact on the touch screen display, the device detects (2212) intersection of the touch area with an object in the plurality of objects on the touch screen display (e.g., intersection 1414 with object 600-26-*b*, intersection 1416 with object 600-27-*b*, and intersection 1418 with object 600-27-*b*, FIG. 14B).

In response to detecting intersection of the touch area with the object, the device moves (2214) the object such that the object ceases to intersect the touch area. For example, in response to detecting intersection 1414 (FIG. 14B) of the touch area 1404-1-*b* with the object 600-26-*b*, the device moves (1420) the object such that the object 600-26-*c* ceases to intersect the touch area 1404-1-*c* (FIG. 14C). Similarly, in response to detecting intersection 1416 (FIG. 14B) of the touch area 1404-2-*b* with the object 600-27-*b*, the device moves (1422) the object such that the object 600-27-*c* ceases to intersect the touch area 1404-2-*c* (FIG. 14C). Similarly, in response to detecting intersection 1418 (FIG. 14B) of the touch area 1406-*b* with the object 600-28-*b*, the device moves (1424) the object such that the object 600-28-*c* ceases to intersect the touch area 1406-*c* (FIG. 14C). By using direct manipulation, the object is moved without using a cursor (2216).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a computing device with a touch screen display:
        displaying a plurality of objects on the touch screen display;
        simultaneously detecting a plurality of finger contacts on the touch screen display; and
        while the plurality of finger contacts are concurrently maintained on the touch screen display, performing respective operations for each respective finger contact in the plurality of detected finger contacts, the respective operations comprising:
        creating a respective touch area that corresponds to the respective finger contact on the touch screen display;

determining a respective representative point within the respective touch area;

determining if the respective touch area overlaps a respective object in the plurality of objects displayed on the touch screen display, wherein determining if the respective touch area overlaps the respective object includes determining if one or more portions of the respective touch area other than the respective representative point overlap the respective object;

connecting the respective object with the respective touch area if the respective object is determined to overlap the respective touch area, wherein connecting the respective object with the respective touch area maintains the overlap of the respective object and the respective touch area;

after connecting the respective object with the respective touch area, detecting movement of the respective finger contact on the touch screen display;

determining movement of the respective touch area that corresponds to movement of the respective finger contact on the touch screen display; and moving the respective object connected with the respective touch area in accordance with the determined movement of the respective touch area.

2. The method of claim 1, including:

for a respective finger contact in the plurality of detected finger contacts:

while detecting movement of the respective finger contact on the touch screen display, detecting intersection of the respective touch area and/or the respective object connected with the respective touch area with a respective unconnected object in the plurality of objects on the touch screen display; and in response to detecting intersection of the respective touch area and/or the respective object connected with the touch area with the respective unconnected object, moving the respective unconnected object such that the respective unconnected object ceases to intersect the respective touch area and/or the respective object connected with the respective touch area.

3. The method of claim 1, including:

for a respective finger contact in the plurality of detected finger contacts:

determining that the respective touch area ceases to overlap with the respective connected object; and in response to determining that the respective touch area ceases to overlap with the respective connected object, disconnecting the respective touch area from the respective connected object.

4. The method of claim 1, wherein the respective object is moved in accordance with the determined movement of the respective touch area without using a cursor.

5. A computing device, comprising:

a touch screen display;

one or more processors;

memory; and one or more programs, wherein the one or more programs are stored in the memory and configured to be executed by the one or more processors, the one or more programs including instructions for:

displaying a plurality of objects on the touch screen display;

simultaneously detecting a plurality of finger contacts on the touch screen display;

while the plurality of finger contacts are concurrently maintained on the touch screen display, performing respective operations for each respective finger contact in the plurality of detected finger contacts, the respective operations comprising:

creating a respective touch area that corresponds to the respective finger contact on the touch screen display;

determining a respective representative point within the respective touch area;

determining if the respective touch area overlaps a respective object in the plurality of objects displayed on the touch screen display, wherein determining if the respective touch area overlaps the respective object includes determining if one or more portions of the respective touch area other than the respective representative point overlap the respective object;

connecting the respective object with the respective touch area if the respective object is determined to overlap the respective touch area, wherein connecting the respective object with the respective touch area maintains the overlap of the respective object and the respective touch area;

after connecting the respective object with the respective touch area, detecting movement of the respective finger contact on the touch screen display;

determining movement of the respective touch area that corresponds to movement of the respective finger contact on the touch screen display; and moving the respective object connected with the respective touch area in accordance with the determined movement of the respective touch area.

6. The device of claim 5, including instructions for:

for a respective finger contact in the plurality of detected finger contacts:

while detecting movement of the respective finger contact on the touch screen display, detecting intersection of the respective touch area and/or the respective object connected with the respective touch area with a respective unconnected object in the plurality of objects on the touch screen display; and in response to detecting intersection of the respective touch area and/or the respective object connected with the touch area with the respective unconnected object, moving the respective unconnected object such that the respective unconnected object ceases to intersect the respective touch area and/or the respective object connected with the respective touch area.

7. The device of claim 5, including instructions for:

for a respective finger contact in the plurality of detected finger contacts:

determining that the respective touch area ceases to overlap with the respective connected object; and in response to determining that the respective touch area ceases to overlap with the respective connected object, disconnecting the respective touch area from the respective connected object.

8. The device of claim 5, wherein the respective object is moved in accordance with the determined movement of the respective touch area without using a cursor.

9. A non-transitory computer readable storage medium having stored therein instructions, which when executed by a computing device with a touch screen display, cause the device to:

display a plurality of objects on the touch screen display;

simultaneously detect a plurality of finger contacts on the touch screen display;

while the plurality of finger contacts are concurrently maintained on the touch screen display, perform respective operations for each respective finger contact in the plurality of detected finger contacts, the respective operations comprising:
- create a respective touch area that corresponds to the respective finger contact on the touch screen display;
- determine a respective representative point within the respective touch area;
- determine if the respective touch area overlaps a respective object in the plurality of objects displayed on the touch screen display, wherein determining if the respective touch area overlaps the respective object includes determining if one or more portions of the respective touch area other than the respective representative point overlap the respective object;
- connect the respective object with the respective touch area if the respective object is determined to overlap the respective touch area, wherein connecting the respective object with the respective touch area maintains the overlap of the respective object and the respective touch area;
- after connecting the respective object with the respective touch area, detect movement of the respective finger contact on the touch screen display;
- determine movement of the respective touch area that corresponds to movement of the respective finger contact on the touch screen display; and
- move the respective object connected with the respective touch area in accordance with the determined movement of the respective touch area.

10. The computer readable storage medium of claim 9, including instructions which cause the device to:
for a respective finger contact in the plurality of detected finger contacts:
- while detecting movement of the respective finger contact on the touch screen display, detect intersection of the respective touch area and/or the respective object connected with the respective touch area with a respective unconnected object in the plurality of objects on the touch screen display; and
- in response to detecting intersection of the respective touch area and/or the respective object connected with the touch area with the respective unconnected object, move the respective unconnected object such that the respective unconnected object ceases to intersect the respective touch area and/or the respective object connected with the respective touch area.

11. The computer readable storage medium of claim 9, including instructions which cause the device to:
for a respective finger contact in the plurality of detected finger contacts:
- determine that the respective touch area ceases to overlap with the respective connected object; and
- in response to determining that the respective touch area ceases to overlap with the respective connected object, disconnect the respective touch area from the respective connected object.

12. The computer readable storage medium of claim 9, wherein the respective object is moved in accordance with the determined movement of the respective touch area without using a cursor.

13. A graphical user interface on a computing device with a touch screen display, comprising:
a plurality of objects;
wherein:
the plurality of objects are displayed on the touch screen display;
a plurality of finger contacts on the touch screen display are simultaneously detected; and
while the plurality of finger contacts are concurrently maintained on the touch screen display, respective operations are performed for each respective finger contact in the plurality of detected finger contacts, wherein during performance of the respective operations:
- a respective touch area is created that corresponds to the respective finger contact on the touch screen display;
- a respective representative point within the respective touch area is determined;
- whether the respective touch area overlaps a respective object in the plurality of objects displayed on the touch screen display is determined, wherein the determination includes determining if one or more portions of the respective touch area other than the respective representative point overlap the respective object;
- the respective object is connected with the respective touch area if the respective object is determined to overlap the respective touch area, wherein connecting the respective object with the respective touch area maintains the overlap of the respective object and the respective touch area;
- after connecting the respective object with the respective touch area, movement of the respective finger contact is detected on the touch screen display;
- movement of the respective touch area is determined that corresponds to movement of the respective finger contact on the touch screen display; and
- the respective object connected with the respective touch area is moved in accordance with the determined movement of the respective touch area.

14. The graphical user interface of claim 13, wherein:
for a respective finger contact in the plurality of detected finger contacts:
- while detecting movement of the respective finger contact on the touch screen display, intersection is detected of the respective touch area and/or the respective object connected with the respective touch area with a respective unconnected object in the plurality of objects on the touch screen display; and
- in response to detecting intersection of the respective touch area and/or the respective object connected with the touch area with the respective unconnected object, the respective unconnected object is moved such that the respective unconnected object ceases to intersect the respective touch area and/or the respective object connected with the respective touch area.

15. The graphical user interface of claim 13, wherein:
for a respective finger contact in the plurality of detected finger contacts:
- the respective touch area is determined to cease to overlap with the respective connected object; and
- in response to determining that the respective touch area ceases to overlap with the respective connected object, the respective touch area is disconnected from the respective connected object.

16. The graphical user interface of claim 13, wherein the respective object is moved in accordance with the determined movement of the respective touch area without using a cursor.

* * * * *